United States Patent
Potter et al.

(10) Patent No.: US 10,540,723 B1
(45) Date of Patent: Jan. 21, 2020

(54) METHODS OF PROVIDING INSURANCE SAVINGS BASED UPON TELEMATICS AND USAGE-BASED INSURANCE

(71) Applicant: STATE FARM MUTUAL AUTOMOBILE INSURANCE COMPANY, Bloomington, IL (US)

(72) Inventors: Thomas Michael Potter, Normal, IL (US); Mark E. Clauss, Bloomington, IL (US); Dustin Ryan Carter, Normal, IL (US); Douglas Albert Graff, Mountain View, MO (US); Megan Michal Baumann, Bloomington, IL (US); Atlanta Bonnom, Bloomington, IL (US); Craig Cope, Bloomington, IL (US); Jennifer Luella Lawyer, Bloomington, IL (US); Curtis Simpson, Bloomington, IL (US); Nathan W. Baumann, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 649 days.

(21) Appl. No.: 14/798,626

(22) Filed: Jul. 14, 2015

Related U.S. Application Data

(60) Provisional application No. 62/145,033, filed on Apr. 9, 2015, provisional application No. 62/145,232, filed
(Continued)

(51) Int. Cl.
*G06Q 40/00* (2012.01)
*G06Q 40/08* (2012.01)
*B60W 40/09* (2012.01)

(52) U.S. Cl.
CPC ............ *G06Q 40/08* (2013.01); *B60W 40/09* (2013.01)

(58) Field of Classification Search
CPC .............................. G06Q 40/08; B60W 40/09
See application file for complete search history.

(56) References Cited

U.S. PATENT DOCUMENTS

| 4,218,763 A | 8/1980 | Kelley et al. |
| 4,386,376 A | 5/1983 | Takimoto et al. |

(Continued)

FOREIGN PATENT DOCUMENTS

| DE | 102010001006 A1 | 7/2011 |
| DE | 102015208358 A1 | 11/2015 |

(Continued)

OTHER PUBLICATIONS

"Linking Driving Behavior to Automobile Accidents and Insurance Rates: An Analysis of Five Billion Miles Driven", Progressive Insurance brochure (Jul. 2012).

(Continued)

*Primary Examiner* — Rajesh Khattar

(57) ABSTRACT

A system and method may collect telematics and/or other data, and apply the data to insurance-based applications. From the data, an insurance provider may determine accurate vehicle usage information, including information regarding who is using a vehicle and under what conditions. An insurance provider may likewise determine risk levels or a risk profile for an insured driver (or other drivers), which may be used to adjust automobile or other insurance policies. The insurance provider may also use the data collected to adjust behavior based insurance using incentives, recommendations, or other means. For customers that opt-in to the data collection program offered, the present embodiments present the opportunity to demonstrate a low or moderate (Continued)

risk lifestyle and the chance for insurance-related savings based upon that low or moderate risk.

20 Claims, 8 Drawing Sheets

Related U.S. Application Data on Apr. 9, 2015, provisional application No. 62/145,234, filed on Apr. 9, 2015, provisional application No. 62/145,032, filed on Apr. 9, 2015, provisional application No. 62/145,027, filed on Apr. 9, 2015, provisional application No. 62/145,022, filed on Apr. 9, 2015, provisional application No. 62/145,028, filed on Apr. 9, 2015, provisional application No. 62/145,145, filed on Apr. 9, 2015, provisional application No. 62/145,029, filed on Apr. 9, 2015, provisional application No. 62/145,228, filed on Apr. 9, 2015, provisional application No. 62/145,024, filed on Apr. 9, 2015, provisional application No. 62/040,735, filed on Aug. 22, 2014, provisional application No. 62/027,021, filed on Jul. 21, 2014.

(56) References Cited

U.S. PATENT DOCUMENTS

| | | |
|---|---|---|
| 4,565,997 A | 1/1986 | Seko et al. |
| 4,833,469 A | 5/1989 | David |
| 5,214,582 A | 5/1993 | Gray |
| 5,220,919 A | 6/1993 | Phillips et al. |
| 5,363,298 A | 11/1994 | Survanshi et al. |
| 5,367,456 A | 11/1994 | Summerville et al. |
| 5,368,484 A | 11/1994 | Copperman et al. |
| 5,436,839 A | 7/1995 | Dausch et al. |
| 5,453,939 A | 9/1995 | Hoffman et al. |
| 5,488,353 A | 1/1996 | Kawakami et al. |
| 5,499,182 A | 3/1996 | Ousborne |
| 5,515,026 A | 5/1996 | Ewert |
| 5,574,641 A | 11/1996 | Kawakami et al. |
| 5,626,362 A | 5/1997 | Mottola |
| 5,689,241 A | 11/1997 | Clarke, Sr. et al. |
| 5,797,134 A | 8/1998 | McMillan et al. |
| 5,825,283 A * | 10/1998 | Camhi ............... B60R 25/102 340/438 |
| 5,835,008 A | 11/1998 | Colemere, Jr. |
| 5,978,720 A | 11/1999 | Hieronymus et al. |
| 5,983,161 A | 11/1999 | Lemelson et al. |
| 6,031,354 A | 2/2000 | Wiley et al. |
| 6,064,970 A | 5/2000 | McMillan et al. |
| 6,067,488 A | 5/2000 | Tano |
| 6,141,611 A | 10/2000 | Mackey et al. |
| 6,151,539 A | 11/2000 | Bergholz et al. |
| 6,215,200 B1 | 4/2001 | Genzel |
| 6,246,933 B1 | 6/2001 | Bague |
| 6,253,129 B1 | 6/2001 | Jenkins et al. |
| 6,285,931 B1 | 9/2001 | Hattori et al. |
| 6,298,290 B1 | 10/2001 | Abe et al. |
| 6,313,749 B1 | 11/2001 | Horne et al. |
| 6,353,396 B1 | 3/2002 | Atlas |
| 6,400,835 B1 | 6/2002 | Lemelson et al. |
| 6,473,000 B2 | 10/2002 | Secreet et al. |
| 6,477,117 B1 | 11/2002 | Narayanaswami et al. |
| 6,553,354 B1 | 4/2003 | Hausner et al. |
| 6,556,905 B1 | 4/2003 | Mittelsteadt et al. |
| 6,570,609 B1 | 5/2003 | Heien |
| 6,579,233 B2 | 6/2003 | Hursh |
| 6,661,345 B1 | 12/2003 | Bevan et al. |
| 6,704,434 B1 | 3/2004 | Sakoh et al. |
| 6,765,495 B1 | 7/2004 | Dunning et al. |
| 6,795,759 B2 | 9/2004 | Doyle |
| 6,832,141 B2 | 12/2004 | Skeen et al. |
| 6,889,137 B1 | 5/2005 | Rychlak |
| 6,909,947 B2 | 6/2005 | Douros et al. |
| 6,925,425 B2 | 8/2005 | Remboski et al. |
| 6,931,309 B2 | 8/2005 | Phelan et al. |
| 6,934,365 B2 | 8/2005 | Suganuma et al. |
| 6,944,536 B2 | 9/2005 | Singleton |
| 6,956,470 B1 | 10/2005 | Heise et al. |
| 6,974,414 B2 | 12/2005 | Victor |
| 6,989,737 B2 | 1/2006 | Yasui |
| 7,027,621 B1 | 4/2006 | Prokoski |
| 7,054,723 B2 | 5/2006 | Seto et al. |
| 7,056,265 B1 | 6/2006 | Shea |
| 7,138,922 B2 | 11/2006 | Strumolo et al. |
| 7,149,533 B2 | 12/2006 | Laird et al. |
| 7,200,207 B2 | 4/2007 | Meer et al. |
| 7,253,724 B2 | 8/2007 | Prakah-Asante et al. |
| 7,254,482 B2 | 8/2007 | Kawasaki et al. |
| 7,290,275 B2 | 10/2007 | Baudoin et al. |
| 7,302,344 B2 | 11/2007 | Olney et al. |
| 7,315,233 B2 | 1/2008 | Yuhara |
| 7,330,124 B2 | 2/2008 | Ota |
| 7,348,882 B2 | 3/2008 | Adamczyk et al. |
| 7,349,860 B1 | 3/2008 | Wallach et al. |
| 7,356,392 B2 | 4/2008 | Hubbard et al. |
| 7,386,376 B2 | 6/2008 | Basir et al. |
| 7,391,784 B1 | 6/2008 | Renkel |
| 7,423,540 B2 | 9/2008 | Kisacanin |
| 7,424,414 B2 | 9/2008 | Craft |
| 7,480,501 B2 | 1/2009 | Petite |
| 7,499,774 B2 | 3/2009 | Barrett et al. |
| 7,565,230 B2 | 7/2009 | Gardner et al. |
| 7,609,150 B2 | 10/2009 | Wheatley et al. |
| 7,639,148 B2 | 12/2009 | Victor |
| 7,692,552 B2 | 4/2010 | Harrington et al. |
| 7,719,431 B2 | 5/2010 | Bolourchi |
| 7,783,426 B2 | 8/2010 | Kato et al. |
| 7,783,505 B2 | 8/2010 | Roschelle et al. |
| 7,791,503 B2 | 9/2010 | Breed et al. |
| 7,792,328 B2 | 9/2010 | Albertson et al. |
| 7,797,107 B2 | 9/2010 | Shiller |
| 7,812,712 B2 | 10/2010 | White et al. |
| 7,813,888 B2 | 10/2010 | Vian et al. |
| 7,835,834 B2 | 11/2010 | Smith et al. |
| 7,865,378 B2 | 1/2011 | Gay |
| 7,870,010 B2 | 1/2011 | Joao |
| 7,877,275 B2 | 1/2011 | Ball |
| 7,881,914 B2 | 2/2011 | Trotta et al. |
| 7,881,951 B2 | 2/2011 | Roschelle et al. |
| 7,890,355 B2 | 2/2011 | Gay et al. |
| 7,904,219 B1 | 3/2011 | Lowrey et al. |
| 7,912,740 B2 | 3/2011 | Vahidi et al. |
| 7,973,674 B2 | 7/2011 | Bell et al. |
| 7,979,172 B2 | 7/2011 | Breed |
| 7,979,173 B2 | 7/2011 | Breed |
| 7,987,103 B2 | 7/2011 | Gay et al. |
| 7,991,629 B2 | 8/2011 | Gay et al. |
| 8,005,467 B2 | 8/2011 | Gerlach et al. |
| 8,009,051 B2 | 8/2011 | Omi |
| 8,010,283 B2 | 8/2011 | Yoshida et al. |
| 8,016,595 B2 | 9/2011 | Aoki et al. |
| 8,027,853 B1 | 9/2011 | Kazenas |
| 8,035,508 B2 | 10/2011 | Breed |
| 8,040,247 B2 | 10/2011 | Gunaratne |
| 8,068,983 B2 | 11/2011 | Vian et al. |
| 8,078,334 B2 | 12/2011 | Goodrich |
| 8,090,598 B2 | 1/2012 | Bauer et al. |
| 8,095,394 B2 | 1/2012 | Nowak et al. |
| 8,102,901 B2 * | 1/2012 | Aissi ............... H04W 88/02 375/219 |
| 8,108,655 B2 | 1/2012 | Abernathy et al. |
| 8,117,049 B2 | 2/2012 | Berkobin et al. |
| 8,123,686 B2 | 2/2012 | Fennell et al. |
| 8,139,109 B2 | 3/2012 | Schmiedel et al. |
| 8,140,249 B2 | 3/2012 | Hessling et al. |
| 8,140,358 B1 | 3/2012 | Ling et al. |
| 8,140,359 B2 | 3/2012 | Daniel |
| 8,164,432 B2 | 4/2012 | Broggi et al. |
| 8,180,522 B2 | 5/2012 | Tuff |
| 8,180,655 B1 | 5/2012 | Hopkins, III |
| 8,185,380 B2 | 5/2012 | Kameyama |

(56) References Cited

U.S. PATENT DOCUMENTS

| | | |
|---|---|---|
| 8,188,887 B2 | 5/2012 | Catten et al. |
| 8,190,323 B2 | 5/2012 | Maeda et al. |
| 8,204,766 B2 | 6/2012 | Bush |
| 8,255,243 B2 | 8/2012 | Raines et al. |
| 8,255,244 B2 | 8/2012 | Raines et al. |
| 8,260,489 B2 | 9/2012 | Nielsen et al. |
| 8,260,639 B1 | 9/2012 | Medina, III et al. |
| 8,265,861 B2 | 9/2012 | Ikeda et al. |
| 8,275,417 B2 | 9/2012 | Flynn |
| 8,280,752 B1 | 10/2012 | Cripe et al. |
| 8,311,858 B2 | 11/2012 | Everett et al. |
| 8,314,708 B2 | 11/2012 | Gunderson et al. |
| 8,332,242 B1 | 12/2012 | Medina, III |
| 8,340,893 B2 | 12/2012 | Yamaguchi et al. |
| 8,340,902 B1 | 12/2012 | Chiang |
| 8,344,849 B2 | 1/2013 | Larsson et al. |
| 8,352,118 B1 | 1/2013 | Mittelsteadt et al. |
| 8,355,837 B2 | 1/2013 | Avery et al. |
| 8,364,391 B2 | 1/2013 | Nagase et al. |
| 8,384,534 B2 | 2/2013 | James et al. |
| 8,386,168 B2 | 2/2013 | Hao |
| 8,423,239 B2 | 4/2013 | Blumer et al. |
| 8,437,966 B2 | 5/2013 | Connolly et al. |
| 8,447,231 B2 | 5/2013 | Bai et al. |
| 8,451,105 B2 | 5/2013 | McNay |
| 8,457,880 B1 | 6/2013 | Malalur et al. |
| 8,473,143 B2 | 6/2013 | Stark et al. |
| 8,487,775 B2 | 7/2013 | Victor et al. |
| 8,510,196 B1 | 8/2013 | Brandmaier et al. |
| 8,520,695 B1 | 8/2013 | Rubin et al. |
| 8,554,468 B1 | 10/2013 | Bullock |
| 8,554,587 B1 | 10/2013 | Nowak et al. |
| 8,566,126 B1 | 10/2013 | Hopkins, III |
| 8,595,034 B2 | 11/2013 | Bauer et al. |
| 8,595,037 B1 | 11/2013 | Hyde et al. |
| 8,605,947 B2 | 12/2013 | Zhang et al. |
| 8,606,512 B1 | 12/2013 | Bogovich et al. |
| 8,618,922 B2 | 12/2013 | Debouk et al. |
| 8,634,980 B1 | 1/2014 | Urmson et al. |
| 8,645,014 B1 | 2/2014 | Kozlowski et al. |
| 8,645,029 B2 | 2/2014 | Kim et al. |
| 8,660,734 B2 | 2/2014 | Zhu et al. |
| 8,698,639 B2 | 4/2014 | Fung et al. |
| 8,700,251 B1 | 4/2014 | Zhu et al. |
| 8,712,893 B1 | 4/2014 | Brandmaier et al. |
| 8,725,311 B1 | 5/2014 | Breed |
| 8,725,472 B2 | 5/2014 | Hagelin et al. |
| 8,731,977 B1 | 5/2014 | Hardin et al. |
| 8,738,523 B1 | 5/2014 | Sanchez et al. |
| 8,742,936 B2 | 6/2014 | Galley et al. |
| 8,781,442 B1 | 7/2014 | Link, II |
| 8,781,669 B1 | 7/2014 | Teller et al. |
| 8,788,299 B1 | 7/2014 | Medina, III |
| 8,799,034 B1 | 8/2014 | Brandmaier et al. |
| 8,816,836 B2 | 8/2014 | Lee et al. |
| 8,818,608 B2 | 8/2014 | Cullinane et al. |
| 8,825,258 B2 | 9/2014 | Cullinane et al. |
| 8,849,558 B2 | 9/2014 | Morotomi et al. |
| 8,868,288 B2 | 10/2014 | Plante et al. |
| 8,874,301 B1 | 10/2014 | Rao et al. |
| 8,874,305 B2 | 10/2014 | Dolgov et al. |
| 8,876,535 B2 | 11/2014 | Fields et al. |
| 8,880,291 B2 | 11/2014 | Hampiholi |
| 8,902,054 B2 | 12/2014 | Morris |
| 8,909,428 B1 | 12/2014 | Lombrozo |
| 8,917,182 B2 | 12/2014 | Chang et al. |
| 8,928,495 B2 | 1/2015 | Hassib et al. |
| 8,935,036 B1 | 1/2015 | Christensen et al. |
| 8,954,205 B2 | 2/2015 | Sagar et al. |
| 8,954,217 B1 | 2/2015 | Montemerlo et al. |
| 8,954,226 B1 | 2/2015 | Binion et al. |
| 8,954,340 B2 | 2/2015 | Sanchez et al. |
| 8,965,677 B2 | 2/2015 | Breed et al. |
| 8,972,100 B2 | 3/2015 | Mullen et al. |
| 8,981,942 B2 | 3/2015 | He et al. |
| 8,989,959 B2 | 3/2015 | Plante et al. |
| 8,996,228 B1 | 3/2015 | Ferguson et al. |
| 8,996,240 B2 | 3/2015 | Plante |
| 9,008,952 B2 | 4/2015 | Caskey et al. |
| 9,019,092 B1 | 4/2015 | Brandmaier et al. |
| 9,020,876 B2 | 4/2015 | Rakshit |
| 9,049,584 B2 | 6/2015 | Hatton |
| 9,053,588 B1 | 6/2015 | Briggs et al. |
| 9,056,395 B1 | 6/2015 | Ferguson et al. |
| 9,056,616 B1 | 6/2015 | Fields et al. |
| 9,063,543 B2 | 6/2015 | An et al. |
| 9,070,243 B1 | 6/2015 | Kozlowski et al. |
| 9,075,413 B2 | 7/2015 | Cullinane et al. |
| 9,079,587 B1 | 7/2015 | Rupp et al. |
| 9,081,650 B1 | 7/2015 | Brinkmann et al. |
| 9,098,080 B2 | 8/2015 | Norris et al. |
| 9,123,250 B2 | 9/2015 | Duncan et al. |
| 9,135,803 B1 | 9/2015 | Fields et al. |
| 9,141,582 B1 | 9/2015 | Brinkmann et al. |
| 9,141,995 B1 | 9/2015 | Brinkmann et al. |
| 9,141,996 B2 | 9/2015 | Christensen et al. |
| 9,144,389 B2 | 9/2015 | Srinivasan et al. |
| 9,147,219 B2 | 9/2015 | Binion et al. |
| 9,147,353 B1 | 9/2015 | Slusar |
| 9,164,507 B2 | 10/2015 | Cheatham, III et al. |
| 9,177,475 B2 | 11/2015 | Sellschopp |
| 9,180,888 B1 | 11/2015 | Fields et al. |
| 9,182,942 B2 | 11/2015 | Kelly et al. |
| 9,188,985 B1 | 11/2015 | Hobbs et al. |
| 9,194,168 B1 | 11/2015 | Lu et al. |
| 9,205,805 B2 | 12/2015 | Cudak et al. |
| 9,205,842 B1 | 12/2015 | Fields et al. |
| 9,221,396 B1 | 12/2015 | Zhu et al. |
| 9,224,293 B2 | 12/2015 | Taylor |
| 9,229,905 B1 | 1/2016 | Penilla et al. |
| 9,230,441 B2 | 1/2016 | Sung et al. |
| 9,235,211 B2 | 1/2016 | Davidsson et al. |
| 9,262,787 B2 | 2/2016 | Binion et al. |
| 9,274,525 B1 | 3/2016 | Ferguson et al. |
| 9,275,417 B2 | 3/2016 | Binion et al. |
| 9,275,552 B1 | 3/2016 | Fields et al. |
| 9,279,697 B1 | 3/2016 | Fields et al. |
| 9,282,430 B1 | 3/2016 | Brandmaier et al. |
| 9,282,447 B2 | 3/2016 | Gianakis |
| 9,283,847 B2 | 3/2016 | Riley, Sr. et al. |
| 9,299,108 B2 | 3/2016 | Diana et al. |
| 9,308,891 B2 | 4/2016 | Cudak et al. |
| 9,311,271 B2 | 4/2016 | Wright |
| 9,317,983 B2 | 4/2016 | Ricci |
| 9,342,074 B2 | 5/2016 | Dolgov et al. |
| 9,342,993 B1 | 5/2016 | Fields et al. |
| 9,352,709 B2 | 5/2016 | Brenneis et al. |
| 9,352,752 B2 | 5/2016 | Cullinane et al. |
| 9,355,423 B1 | 5/2016 | Slusar |
| 9,361,599 B1 | 6/2016 | Biemer et al. |
| 9,361,650 B2 | 6/2016 | Binion et al. |
| 9,371,072 B1 | 6/2016 | Sisbot |
| 9,373,203 B1 | 6/2016 | Fields et al. |
| 9,376,090 B2 | 6/2016 | Gennermann |
| 9,377,315 B2 | 6/2016 | Grover et al. |
| 9,381,916 B1 | 7/2016 | Zhu et al. |
| 9,384,491 B1 | 7/2016 | Briggs et al. |
| 9,384,674 B2 | 7/2016 | Nepomuceno |
| 9,390,451 B1 | 7/2016 | Slusar |
| 9,390,452 B1 | 7/2016 | Biemer et al. |
| 9,390,567 B2 | 7/2016 | Kim et al. |
| 9,399,445 B2 | 7/2016 | Abou Mahmoud et al. |
| 9,406,177 B2 | 8/2016 | Attard et al. |
| 9,421,972 B2 | 8/2016 | Davidsson et al. |
| 9,424,607 B2 | 8/2016 | Bowers et al. |
| 9,429,943 B2 | 8/2016 | Wilson et al. |
| 9,430,944 B2 | 8/2016 | Grimm et al. |
| 9,440,657 B1 | 9/2016 | Fields et al. |
| 9,443,152 B2 | 9/2016 | Atsmon et al. |
| 9,454,786 B1 | 9/2016 | Srey et al. |
| 9,457,754 B1 | 10/2016 | Christensen et al. |
| 9,466,214 B2 | 10/2016 | Fuehrer |
| 9,477,990 B1 | 10/2016 | Binion et al. |
| 9,478,150 B1 | 10/2016 | Fields et al. |

(56) References Cited

U.S. PATENT DOCUMENTS

| | | | |
|---|---|---|---|
| 9,489,635 B1 | 11/2016 | Zhu | |
| 9,505,494 B1 * | 11/2016 | Marlow | B64C 39/024 |
| 9,511,765 B2 | 12/2016 | Obradovich | |
| 9,511,767 B1 | 12/2016 | Okumura et al. | |
| 9,511,779 B2 | 12/2016 | Cullinane et al. | |
| 9,524,648 B1 | 12/2016 | Gopalakrishnan et al. | |
| 9,529,361 B2 | 12/2016 | You et al. | |
| 9,530,333 B1 | 12/2016 | Fields et al. | |
| 9,542,846 B2 | 1/2017 | Zeng et al. | |
| 9,558,667 B2 | 1/2017 | Bowers et al. | |
| 9,566,959 B2 | 2/2017 | Breuer et al. | |
| 9,567,007 B2 | 2/2017 | Cudak et al. | |
| 9,583,017 B2 | 2/2017 | Nepomuceno | |
| 9,586,591 B1 | 3/2017 | Fields et al. | |
| 9,587,952 B1 | 3/2017 | Slusar | |
| 9,594,373 B2 | 3/2017 | Solyom et al. | |
| 9,601,027 B2 | 3/2017 | Nepomuceno | |
| 9,604,652 B2 | 3/2017 | Strauss | |
| 9,633,318 B2 | 4/2017 | Plante | |
| 9,646,428 B1 * | 5/2017 | Konrardy | G07C 5/08 |
| 9,646,433 B1 | 5/2017 | Sanchez et al. | |
| 9,656,606 B1 * | 5/2017 | Vose | B60Q 9/008 |
| 9,665,101 B1 | 5/2017 | Templeton | |
| 9,697,733 B1 | 7/2017 | Penilla et al. | |
| 9,707,942 B2 | 7/2017 | Cheatham, III et al. | |
| 9,715,711 B1 * | 7/2017 | Konrardy | G06Q 40/08 |
| 9,720,419 B2 | 8/2017 | O'Neill et al. | |
| 9,727,920 B1 | 8/2017 | Healy et al. | |
| 9,734,685 B2 | 8/2017 | Fields et al. | |
| 9,754,325 B1 | 9/2017 | Konrardy et al. | |
| 9,754,424 B2 | 9/2017 | Ling et al. | |
| 9,761,139 B2 | 9/2017 | Acker, Jr. et al. | |
| 9,767,516 B1 | 9/2017 | Konrardy et al. | |
| 9,773,281 B1 | 9/2017 | Hanson | |
| 9,783,159 B1 | 10/2017 | Potter et al. | |
| 9,786,154 B1 | 10/2017 | Potter et al. | |
| 9,792,656 B1 | 10/2017 | Konrardy et al. | |
| 9,797,881 B2 | 10/2017 | Biondo et al. | |
| 9,805,423 B1 | 10/2017 | Konrardy et al. | |
| 9,805,601 B1 | 10/2017 | Fields et al. | |
| 9,816,827 B1 | 11/2017 | Slusar | |
| 9,847,033 B1 | 12/2017 | Carmack et al. | |
| 9,852,475 B1 | 12/2017 | Konrardy et al. | |
| 9,858,621 B1 | 1/2018 | Konrardy et al. | |
| 9,868,394 B1 | 1/2018 | Fields et al. | |
| 9,870,649 B1 | 1/2018 | Fields et al. | |
| 9,878,617 B2 | 1/2018 | Mochizuki | |
| 9,884,611 B2 | 2/2018 | Abou Mahmoud et al. | |
| 9,892,567 B2 | 2/2018 | Binion et al. | |
| 9,896,062 B1 | 2/2018 | Potter et al. | |
| 9,904,928 B1 | 2/2018 | Leise | |
| 9,908,530 B1 | 3/2018 | Fields et al. | |
| 9,934,667 B1 | 4/2018 | Fields et al. | |
| 9,939,279 B2 | 4/2018 | Pan et al. | |
| 9,940,676 B1 | 4/2018 | Biemer | |
| 9,940,834 B1 | 4/2018 | Konrardy et al. | |
| 9,944,282 B1 | 4/2018 | Fields et al. | |
| 9,946,531 B1 | 4/2018 | Fields et al. | |
| 9,972,054 B1 | 5/2018 | Konrardy et al. | |
| 10,007,263 B1 | 6/2018 | Fields et al. | |
| 10,017,153 B1 | 7/2018 | Potter et al. | |
| 10,019,901 B1 | 7/2018 | Fields et al. | |
| 10,026,237 B1 | 7/2018 | Fields et al. | |
| 10,042,359 B1 | 8/2018 | Konrardy et al. | |
| 10,043,323 B1 | 8/2018 | Konrardy et al. | |
| 10,065,517 B1 | 9/2018 | Konrardy et al. | |
| 10,102,587 B1 | 10/2018 | Potter et al. | |
| 2001/0005217 A1 | 6/2001 | Hamilton et al. | |
| 2002/0016655 A1 | 2/2002 | Joao | |
| 2002/0049535 A1 | 4/2002 | Rigo et al. | |
| 2002/0111725 A1 | 8/2002 | Burge | |
| 2002/0116228 A1 | 8/2002 | Bauer et al. | |
| 2002/0128751 A1 | 9/2002 | Engstrom et al. | |
| 2002/0128882 A1 | 9/2002 | Nakagawa et al. | |
| 2002/0135618 A1 | 9/2002 | Maes et al. | |
| 2002/0146667 A1 | 10/2002 | Dowdell et al. | |
| 2003/0028298 A1 | 2/2003 | Macky et al. | |
| 2003/0046003 A1 | 3/2003 | Smith et al. | |
| 2003/0061160 A1 | 3/2003 | Asahina | |
| 2003/0112133 A1 | 6/2003 | Webb et al. | |
| 2003/0120576 A1 | 6/2003 | Duckworth | |
| 2003/0139948 A1 | 7/2003 | Strech | |
| 2003/0146850 A1 | 8/2003 | Fallenstein | |
| 2003/0182042 A1 | 9/2003 | Watson et al. | |
| 2003/0182183 A1 | 9/2003 | Pribe | |
| 2003/0200123 A1 | 10/2003 | Burge et al. | |
| 2004/0005927 A1 | 1/2004 | Bonilla et al. | |
| 2004/0017106 A1 | 1/2004 | Aizawa et al. | |
| 2004/0019539 A1 | 1/2004 | Raman et al. | |
| 2004/0039503 A1 | 2/2004 | Doyle | |
| 2004/0054452 A1 | 3/2004 | Bjorkman | |
| 2004/0077285 A1 | 4/2004 | Bonilla et al. | |
| 2004/0085198 A1 | 5/2004 | Saito et al. | |
| 2004/0085211 A1 | 5/2004 | Gotfried | |
| 2004/0090334 A1 | 5/2004 | Zhang et al. | |
| 2004/0111301 A1 | 6/2004 | Wahlbin et al. | |
| 2004/0122639 A1 | 6/2004 | Qiu | |
| 2004/0139034 A1 | 7/2004 | Farmer | |
| 2004/0153362 A1 | 8/2004 | Bauer et al. | |
| 2004/0158476 A1 | 8/2004 | Blessinger et al. | |
| 2004/0169034 A1 | 9/2004 | Park | |
| 2004/0198441 A1 | 10/2004 | Cooper et al. | |
| 2004/0204837 A1 | 10/2004 | Singleton | |
| 2004/0226043 A1 | 11/2004 | Mettu et al. | |
| 2004/0252027 A1 | 12/2004 | Torkkola et al. | |
| 2004/0260579 A1 | 12/2004 | Tremiti | |
| 2005/0007438 A1 | 1/2005 | Busch et al. | |
| 2005/0059151 A1 | 3/2005 | Bosch | |
| 2005/0065678 A1 | 3/2005 | Smith et al. | |
| 2005/0071052 A1 | 3/2005 | Coletrane et al. | |
| 2005/0071202 A1 | 3/2005 | Kendrick | |
| 2005/0073438 A1 | 4/2005 | Rodgers et al. | |
| 2005/0075782 A1 | 4/2005 | Torgunrud | |
| 2005/0080519 A1 | 4/2005 | Oesterling et al. | |
| 2005/0088291 A1 | 4/2005 | Blanco et al. | |
| 2005/0088521 A1 | 4/2005 | Blanco et al. | |
| 2005/0093684 A1 | 5/2005 | Cunnien | |
| 2005/0107673 A1 | 5/2005 | Ball | |
| 2005/0108065 A1 | 5/2005 | Dorfstatter | |
| 2005/0108910 A1 | 5/2005 | Esparza et al. | |
| 2005/0131597 A1 | 6/2005 | Raz et al. | |
| 2005/0134443 A1 | 6/2005 | Hottebart et al. | |
| 2005/0154513 A1 | 7/2005 | Matsunaga et al. | |
| 2005/0216136 A1 | 9/2005 | Lengning et al. | |
| 2005/0227712 A1 | 10/2005 | Estevez et al. | |
| 2005/0228763 A1 | 10/2005 | Lewis et al. | |
| 2005/0237784 A1 | 10/2005 | Kang | |
| 2005/0246256 A1 | 11/2005 | Gastineau et al. | |
| 2005/0259151 A1 | 11/2005 | Hamilton et al. | |
| 2005/0267784 A1 | 12/2005 | Slen et al. | |
| 2006/0010665 A1 | 1/2006 | Watzl | |
| 2006/0031103 A1 | 2/2006 | Henry | |
| 2006/0052909 A1 | 3/2006 | Cherouny | |
| 2006/0052929 A1 | 3/2006 | Bastian et al. | |
| 2006/0053038 A1 | 3/2006 | Warren et al. | |
| 2006/0055565 A1 | 3/2006 | Kawamata et al. | |
| 2006/0079280 A1 | 4/2006 | LaPerch | |
| 2006/0089763 A1 | 4/2006 | Barrett et al. | |
| 2006/0092043 A1 | 5/2006 | Lagassey | |
| 2006/0095302 A1 | 5/2006 | Vahidi et al. | |
| 2006/0106650 A1 * | 5/2006 | Bush | G06Q 20/10 705/4 |
| 2006/0136291 A1 | 6/2006 | Morita et al. | |
| 2006/0149461 A1 | 7/2006 | Rowley et al. | |
| 2006/0155616 A1 | 7/2006 | Moore et al. | |
| 2006/0184295 A1 | 8/2006 | Hawkins et al. | |
| 2006/0212195 A1 | 9/2006 | Veith et al. | |
| 2006/0220905 A1 | 10/2006 | Hovestadt | |
| 2006/0229777 A1 | 10/2006 | Hudson et al. | |
| 2006/0232430 A1 | 10/2006 | Takaoka et al. | |
| 2006/0244746 A1 | 11/2006 | England et al. | |
| 2006/0294514 A1 | 12/2006 | Bauchot et al. | |
| 2007/0001831 A1 | 1/2007 | Raz et al. | |
| 2007/0027726 A1 | 2/2007 | Warren et al. | |

(56) References Cited

U.S. PATENT DOCUMENTS

| | | |
|---|---|---|
| 2007/0048707 A1 | 3/2007 | Caamano et al. |
| 2007/0055422 A1 | 3/2007 | Anzai et al. |
| 2007/0080816 A1 | 4/2007 | Haque et al. |
| 2007/0088469 A1 | 4/2007 | Schmiedel et al. |
| 2007/0093947 A1 | 4/2007 | Gould et al. |
| 2007/0122771 A1 | 5/2007 | Maeda et al. |
| 2007/0124599 A1 | 5/2007 | Morita et al. |
| 2007/0132773 A1 | 6/2007 | Plante |
| 2007/0149208 A1 | 6/2007 | Syrbe et al. |
| 2007/0159344 A1 | 7/2007 | Kisacanin |
| 2007/0208498 A1 | 9/2007 | Barker et al. |
| 2007/0219720 A1 | 9/2007 | Trepagnier et al. |
| 2007/0249372 A1 | 10/2007 | Gao et al. |
| 2007/0263628 A1 | 11/2007 | Axelsson et al. |
| 2007/0265540 A1 | 11/2007 | Fuwamoto et al. |
| 2007/0282489 A1 | 12/2007 | Boss et al. |
| 2007/0282638 A1 | 12/2007 | Surovy |
| 2007/0291130 A1 | 12/2007 | Broggi et al. |
| 2007/0299700 A1 | 12/2007 | Gay et al. |
| 2008/0007451 A1 | 1/2008 | De Maagt et al. |
| 2008/0027761 A1 | 1/2008 | Bracha |
| 2008/0033684 A1 | 2/2008 | Vian et al. |
| 2008/0052134 A1 | 2/2008 | Nowak et al. |
| 2008/0061953 A1 | 3/2008 | Bhogal et al. |
| 2008/0064014 A1 | 3/2008 | Wojtczak et al. |
| 2008/0065427 A1 | 3/2008 | Helitzer et al. |
| 2008/0077383 A1 | 3/2008 | Hagelin et al. |
| 2008/0082372 A1 | 4/2008 | Burch |
| 2008/0084473 A1 | 4/2008 | Romanowich |
| 2008/0106390 A1 | 5/2008 | White |
| 2008/0111666 A1 | 5/2008 | Plante et al. |
| 2008/0114502 A1 | 5/2008 | Breed et al. |
| 2008/0114530 A1 | 5/2008 | Petrisor et al. |
| 2008/0126137 A1 | 5/2008 | Kidd et al. |
| 2008/0143497 A1 | 6/2008 | Wasson et al. |
| 2008/0147266 A1 | 6/2008 | Plante et al. |
| 2008/0147267 A1 | 6/2008 | Plante et al. |
| 2008/0161989 A1 | 7/2008 | Breed |
| 2008/0180237 A1 | 7/2008 | Fayyad et al. |
| 2008/0189142 A1 | 8/2008 | Brown et al. |
| 2008/0195457 A1 | 8/2008 | Sherman et al. |
| 2008/0204256 A1 | 8/2008 | Omi |
| 2008/0243558 A1 | 10/2008 | Gupte |
| 2008/0255887 A1 | 10/2008 | Gruter |
| 2008/0255888 A1 | 10/2008 | Berkobin et al. |
| 2008/0258881 A1 | 10/2008 | Akhan |
| 2008/0258890 A1 | 10/2008 | Follmer et al. |
| 2008/0291008 A1 | 11/2008 | Jeon |
| 2008/0294690 A1 | 11/2008 | McClellan et al. |
| 2008/0297488 A1 | 12/2008 | Operowsky et al. |
| 2008/0300733 A1 | 12/2008 | Rasshofer et al. |
| 2008/0306996 A1 | 12/2008 | McClellan et al. |
| 2008/0319665 A1 | 12/2008 | Berkobin et al. |
| 2009/0005979 A1 | 1/2009 | Nakao et al. |
| 2009/0015684 A1 | 1/2009 | Ooga et al. |
| 2009/0027188 A1 | 1/2009 | Saban |
| 2009/0040060 A1 | 2/2009 | Anbuhl et al. |
| 2009/0063030 A1 | 3/2009 | Howarter et al. |
| 2009/0063174 A1 | 3/2009 | Fricke |
| 2009/0069953 A1 | 3/2009 | Hale et al. |
| 2009/0079839 A1 | 3/2009 | Fischer et al. |
| 2009/0081923 A1 | 3/2009 | Dooley et al. |
| 2009/0085770 A1 | 4/2009 | Mergen |
| 2009/0115638 A1 | 5/2009 | Shankwitz et al. |
| 2009/0132294 A1 | 5/2009 | Haines |
| 2009/0207005 A1 | 8/2009 | Habetha et al. |
| 2009/0210257 A1 | 8/2009 | Chalfant et al. |
| 2009/0247113 A1 | 10/2009 | Sennett et al. |
| 2009/0254240 A1 | 10/2009 | Olsen, III et al. |
| 2009/0267801 A1 | 10/2009 | Kawai et al. |
| 2009/0300065 A1 | 12/2009 | Birchall |
| 2009/0303026 A1 | 12/2009 | Broggi et al. |
| 2009/0313566 A1 | 12/2009 | Vian et al. |
| 2010/0004995 A1 | 1/2010 | Hickman |
| 2010/0005649 A1 | 1/2010 | Kim et al. |
| 2010/0013130 A1 | 1/2010 | Ramirez et al. |
| 2010/0014570 A1 | 1/2010 | Dupis et al. |
| 2010/0015706 A1 | 1/2010 | Quay et al. |
| 2010/0030540 A1 | 2/2010 | Choi et al. |
| 2010/0030586 A1 | 2/2010 | Taylor et al. |
| 2010/0042318 A1 | 2/2010 | Kaplan et al. |
| 2010/0043524 A1 | 2/2010 | Takata |
| 2010/0055649 A1 | 3/2010 | Takahashi et al. |
| 2010/0076646 A1 | 3/2010 | Basir et al. |
| 2010/0082244 A1 | 4/2010 | Yamaguchi et al. |
| 2010/0085171 A1 | 4/2010 | Do |
| 2010/0106346 A1 | 4/2010 | Badli et al. |
| 2010/0106356 A1 | 4/2010 | Trepagnier et al. |
| 2010/0128127 A1 | 5/2010 | Ciolli |
| 2010/0131300 A1 | 5/2010 | Collopy et al. |
| 2010/0131302 A1 | 5/2010 | Collopy et al. |
| 2010/0131304 A1* | 5/2010 | Collopy ............ G06Q 30/0224 705/4 |
| 2010/0131307 A1 | 5/2010 | Collopy et al. |
| 2010/0142477 A1 | 6/2010 | Yokota |
| 2010/0143872 A1 | 6/2010 | Lankteee |
| 2010/0145700 A1* | 6/2010 | Kennewick ....... G06F 17/30654 704/257 |
| 2010/0157061 A1* | 6/2010 | Katsman ................ G07C 5/008 348/149 |
| 2010/0157255 A1 | 6/2010 | Togino |
| 2010/0205012 A1 | 8/2010 | McClellan |
| 2010/0214087 A1 | 8/2010 | Nakagoshi et al. |
| 2010/0219944 A1 | 9/2010 | McCormick et al. |
| 2010/0253541 A1 | 10/2010 | Seder et al. |
| 2010/0256836 A1 | 10/2010 | Mudalige |
| 2010/0286845 A1 | 11/2010 | Rekow et al. |
| 2010/0293033 A1 | 11/2010 | Hall et al. |
| 2010/0299021 A1 | 11/2010 | Jalili |
| 2010/0332131 A1 | 12/2010 | Horvitz et al. |
| 2011/0009093 A1 | 1/2011 | Self et al. |
| 2011/0043350 A1 | 2/2011 | Ben David |
| 2011/0043377 A1 | 2/2011 | McGrath et al. |
| 2011/0054767 A1 | 3/2011 | Schafer et al. |
| 2011/0060496 A1 | 3/2011 | Nielsen et al. |
| 2011/0066310 A1 | 3/2011 | Sakai et al. |
| 2011/0077809 A1 | 3/2011 | Leary |
| 2011/0087505 A1 | 4/2011 | Terlep |
| 2011/0090075 A1 | 4/2011 | Armitage et al. |
| 2011/0090093 A1 | 4/2011 | Grimm et al. |
| 2011/0093134 A1 | 4/2011 | Emanuel et al. |
| 2011/0093350 A1 | 4/2011 | Laumeyer et al. |
| 2011/0106370 A1 | 5/2011 | Duddle et al. |
| 2011/0109462 A1 | 5/2011 | Deng et al. |
| 2011/0118907 A1 | 5/2011 | Elkins |
| 2011/0128161 A1 | 6/2011 | Bae et al. |
| 2011/0133954 A1 | 6/2011 | Ooshima et al. |
| 2011/0137684 A1 | 6/2011 | Peak et al. |
| 2011/0140919 A1 | 6/2011 | Hara et al. |
| 2011/0140968 A1 | 6/2011 | Bai et al. |
| 2011/0144854 A1 | 6/2011 | Cramer et al. |
| 2011/0153367 A1 | 6/2011 | Amigo et al. |
| 2011/0161116 A1 | 6/2011 | Peak et al. |
| 2011/0161119 A1 | 6/2011 | Collins |
| 2011/0169625 A1 | 7/2011 | James et al. |
| 2011/0184605 A1 | 7/2011 | Neff |
| 2011/0187559 A1 | 8/2011 | Applebaum |
| 2011/0190972 A1 | 8/2011 | Timmons et al. |
| 2011/0196571 A1 | 8/2011 | Foladare et al. |
| 2011/0202305 A1 | 8/2011 | Willis et al. |
| 2011/0238997 A1* | 9/2011 | Bellur ................ H04L 63/1458 713/176 |
| 2011/0241862 A1 | 10/2011 | Debouk et al. |
| 2011/0246244 A1 | 10/2011 | O'Rourke |
| 2011/0251751 A1 | 10/2011 | Knight |
| 2011/0288770 A1 | 11/2011 | Greasby |
| 2011/0295446 A1 | 12/2011 | Basir et al. |
| 2011/0295546 A1 | 12/2011 | Khazanov |
| 2011/0301839 A1 | 12/2011 | Pudar et al. |
| 2011/0304465 A1 | 12/2011 | Boult et al. |
| 2011/0307188 A1 | 12/2011 | Peng et al. |
| 2011/0307336 A1 | 12/2011 | Smirnov et al. |
| 2012/0004933 A1 | 1/2012 | Foladare et al. |
| 2012/0007224 A1 | 1/2012 | Hasebe et al. |

(56) References Cited

U.S. PATENT DOCUMENTS

| | | |
|---|---|---|
| 2012/0010185 A1 | 1/2012 | Stenkamp et al. |
| 2012/0010906 A1 | 1/2012 | Foladare et al. |
| 2012/0013582 A1 | 1/2012 | Inoue et al. |
| 2012/0019001 A1 | 1/2012 | Hede et al. |
| 2012/0025969 A1 | 2/2012 | Dozza |
| 2012/0028680 A1 | 2/2012 | Breed |
| 2012/0053824 A1 | 3/2012 | Nam et al. |
| 2012/0056758 A1 | 3/2012 | Kuhlman et al. |
| 2012/0059227 A1 | 3/2012 | Friedlander et al. |
| 2012/0066007 A1 | 3/2012 | Ferrick et al. |
| 2012/0071151 A1 | 3/2012 | Abramson et al. |
| 2012/0072214 A1 | 3/2012 | Cox et al. |
| 2012/0072243 A1 | 3/2012 | Collins et al. |
| 2012/0072244 A1* | 3/2012 | Collins .................. G06Q 10/10 705/4 |
| 2012/0081221 A1 | 4/2012 | Doerr et al. |
| 2012/0083668 A1 | 4/2012 | Pradeep et al. |
| 2012/0083960 A1 | 4/2012 | Zhu et al. |
| 2012/0083964 A1 | 4/2012 | Montemerlo et al. |
| 2012/0083974 A1 | 4/2012 | Sandblom |
| 2012/0092157 A1 | 4/2012 | Tran |
| 2012/0101855 A1* | 4/2012 | Collins .................. G06Q 40/08 705/4 |
| 2012/0108909 A1 | 5/2012 | Slobounov et al. |
| 2012/0109407 A1 | 5/2012 | Yousefi et al. |
| 2012/0109692 A1 | 5/2012 | Collins et al. |
| 2012/0116548 A1 | 5/2012 | Goree et al. |
| 2012/0123806 A1 | 5/2012 | Schumann, Jr. et al. |
| 2012/0129545 A1 | 5/2012 | Hodis et al. |
| 2012/0135382 A1 | 5/2012 | Winston et al. |
| 2012/0143391 A1 | 6/2012 | Gee |
| 2012/0143630 A1 | 6/2012 | Hertenstein |
| 2012/0146766 A1 | 6/2012 | Geisler et al. |
| 2012/0172055 A1 | 7/2012 | Edge |
| 2012/0185204 A1 | 7/2012 | Jallon et al. |
| 2012/0188100 A1 | 7/2012 | Min et al. |
| 2012/0190001 A1 | 7/2012 | Knight et al. |
| 2012/0191343 A1 | 7/2012 | Haleem |
| 2012/0197669 A1 | 8/2012 | Kote et al. |
| 2012/0200427 A1 | 8/2012 | Kamata |
| 2012/0209634 A1 | 8/2012 | Ling et al. |
| 2012/0209692 A1 | 8/2012 | Bennett et al. |
| 2012/0215375 A1 | 8/2012 | Chang |
| 2012/0221168 A1 | 8/2012 | Zeng et al. |
| 2012/0235865 A1 | 9/2012 | Nath et al. |
| 2012/0239242 A1 | 9/2012 | Uehara |
| 2012/0239281 A1 | 9/2012 | Hinz |
| 2012/0239471 A1 | 9/2012 | Grimm et al. |
| 2012/0239822 A1 | 9/2012 | Poulson et al. |
| 2012/0246733 A1 | 9/2012 | Schafer et al. |
| 2012/0256769 A1 | 10/2012 | Satpathy |
| 2012/0258702 A1 | 10/2012 | Matsuyama |
| 2012/0277950 A1 | 11/2012 | Plante et al. |
| 2012/0284747 A1 | 11/2012 | Joao |
| 2012/0289819 A1 | 11/2012 | Snow |
| 2012/0303222 A1 | 11/2012 | Cooprider et al. |
| 2012/0303392 A1 | 11/2012 | Depura et al. |
| 2012/0306663 A1 | 12/2012 | Mudalige |
| 2012/0315848 A1* | 12/2012 | Smith ..................... H04B 5/02 455/41.1 |
| 2012/0316406 A1 | 12/2012 | Rahman et al. |
| 2013/0006674 A1 | 1/2013 | Bowne et al. |
| 2013/0006675 A1 | 1/2013 | Bowne et al. |
| 2013/0017846 A1 | 1/2013 | Schoppe |
| 2013/0018677 A1 | 1/2013 | Chevrette |
| 2013/0030275 A1 | 1/2013 | Seymour et al. |
| 2013/0030606 A1 | 1/2013 | Mudalige et al. |
| 2013/0030642 A1 | 1/2013 | Bradley et al. |
| 2013/0038437 A1 | 2/2013 | Talati et al. |
| 2013/0044008 A1 | 2/2013 | Gafford et al. |
| 2013/0046562 A1 | 2/2013 | Taylor et al. |
| 2013/0057671 A1 | 3/2013 | Levin et al. |
| 2013/0066751 A1 | 3/2013 | Glazer et al. |
| 2013/0073115 A1 | 3/2013 | Levin et al. |
| 2013/0073318 A1* | 3/2013 | Feldman ................ G06Q 40/08 705/4 |
| 2013/0073321 A1 | 3/2013 | Hofmann et al. |
| 2013/0093886 A1 | 4/2013 | Rothschild |
| 2013/0116855 A1 | 5/2013 | Nielsen et al. |
| 2013/0131907 A1 | 5/2013 | Green et al. |
| 2013/0144459 A1 | 6/2013 | Ricci |
| 2013/0144657 A1 | 6/2013 | Ricci |
| 2013/0151027 A1 | 6/2013 | Petrucci et al. |
| 2013/0151202 A1 | 6/2013 | Denny et al. |
| 2013/0164715 A1 | 6/2013 | Hunt et al. |
| 2013/0179198 A1 | 7/2013 | Bowne et al. |
| 2013/0189649 A1 | 7/2013 | Mannino |
| 2013/0190966 A1 | 7/2013 | Collins et al. |
| 2013/0209968 A1 | 8/2013 | Miller et al. |
| 2013/0218603 A1 | 8/2013 | Hagelstein et al. |
| 2013/0218604 A1 | 8/2013 | Hagelstein et al. |
| 2013/0226391 A1 | 8/2013 | Nordbruch et al. |
| 2013/0227409 A1 | 8/2013 | Das et al. |
| 2013/0231824 A1 | 9/2013 | Wilson et al. |
| 2013/0237194 A1 | 9/2013 | Davis |
| 2013/0245881 A1 | 9/2013 | Scarbrough |
| 2013/0257626 A1 | 10/2013 | Masli et al. |
| 2013/0267194 A1 | 10/2013 | Breed |
| 2013/0278442 A1 | 10/2013 | Rubin et al. |
| 2013/0289819 A1 | 10/2013 | Hassib et al. |
| 2013/0290037 A1 | 10/2013 | Hu et al. |
| 2013/0297418 A1 | 11/2013 | Collopy et al. |
| 2013/0302758 A1* | 11/2013 | Wright .................. G07C 5/008 434/65 |
| 2013/0304513 A1 | 11/2013 | Hyde et al. |
| 2013/0304514 A1 | 11/2013 | Hyde et al. |
| 2013/0307786 A1 | 11/2013 | Heubel |
| 2013/0317665 A1* | 11/2013 | Fernandes ............ G08G 5/0039 701/1 |
| 2013/0317693 A1 | 11/2013 | Jefferies et al. |
| 2013/0317711 A1 | 11/2013 | Plante |
| 2013/0317786 A1 | 11/2013 | Kuhn |
| 2013/0317865 A1 | 11/2013 | Tofte et al. |
| 2013/0332402 A1 | 12/2013 | Rakshit |
| 2013/0339062 A1 | 12/2013 | Brewer et al. |
| 2014/0002651 A1 | 1/2014 | Plante |
| 2014/0004734 A1 | 1/2014 | Hoang |
| 2014/0009307 A1 | 1/2014 | Bowers et al. |
| 2014/0011647 A1 | 1/2014 | Lalaoua |
| 2014/0012492 A1 | 1/2014 | Bowers et al. |
| 2014/0013965 A1 | 1/2014 | Perez |
| 2014/0019170 A1 | 1/2014 | Coleman et al. |
| 2014/0027790 A1 | 1/2014 | Lin et al. |
| 2014/0030073 A1 | 1/2014 | Lacy et al. |
| 2014/0039934 A1 | 2/2014 | Rivera |
| 2014/0047347 A1 | 2/2014 | Mohn et al. |
| 2014/0047371 A1 | 2/2014 | Palmer et al. |
| 2014/0052323 A1 | 2/2014 | Reichel et al. |
| 2014/0052336 A1 | 2/2014 | Moshchuk et al. |
| 2014/0058761 A1 | 2/2014 | Freiberger et al. |
| 2014/0059066 A1 | 2/2014 | Koloskov |
| 2014/0063064 A1 | 3/2014 | Seo et al. |
| 2014/0070980 A1 | 3/2014 | Park |
| 2014/0080100 A1 | 3/2014 | Phelan et al. |
| 2014/0095214 A1 | 4/2014 | Mathe et al. |
| 2014/0099607 A1 | 4/2014 | Armitage et al. |
| 2014/0100892 A1 | 4/2014 | Collopy et al. |
| 2014/0104405 A1 | 4/2014 | Weidl et al. |
| 2014/0106782 A1 | 4/2014 | Chitre et al. |
| 2014/0108198 A1 | 4/2014 | Jariyasunant et al. |
| 2014/0111647 A1 | 4/2014 | Atsmon et al. |
| 2014/0114691 A1 | 4/2014 | Pearce |
| 2014/0125474 A1 | 5/2014 | Gunaratne |
| 2014/0129053 A1 | 5/2014 | Kleve et al. |
| 2014/0129139 A1 | 5/2014 | Ellison et al. |
| 2014/0129301 A1 | 5/2014 | Van Wiemeersch et al. |
| 2014/0130035 A1 | 5/2014 | Desai et al. |
| 2014/0135598 A1 | 5/2014 | Weidl et al. |
| 2014/0139655 A1* | 5/2014 | Mimar ................... G08B 21/06 348/77 |
| 2014/0148988 A1 | 5/2014 | Lathrop et al. |
| 2014/0149148 A1 | 5/2014 | Luciani |
| 2014/0156133 A1 | 6/2014 | Cullinane et al. |

(56) References Cited

U.S. PATENT DOCUMENTS

| | | |
|---|---|---|
| 2014/0156134 A1 | 6/2014 | Cullinane et al. |
| 2014/0156176 A1 | 6/2014 | Caskey et al. |
| 2014/0167967 A1 | 6/2014 | He et al. |
| 2014/0168399 A1 | 6/2014 | Plummer et al. |
| 2014/0172467 A1 | 6/2014 | He et al. |
| 2014/0172727 A1 | 6/2014 | Abhyanker et al. |
| 2014/0180727 A1* | 6/2014 | Freiberger ............ G07C 5/008 705/4 |
| 2014/0188322 A1 | 7/2014 | Oh et al. |
| 2014/0191858 A1 | 7/2014 | Morgan et al. |
| 2014/0218187 A1 | 8/2014 | Chun et al. |
| 2014/0218520 A1 | 8/2014 | Teich et al. |
| 2014/0221781 A1 | 8/2014 | Schrauf et al. |
| 2014/0236638 A1 | 8/2014 | Pallesen et al. |
| 2014/0240132 A1 | 8/2014 | Bychkov |
| 2014/0244096 A1 | 8/2014 | An et al. |
| 2014/0253376 A1 | 9/2014 | Large et al. |
| 2014/0257866 A1 | 9/2014 | Gay et al. |
| 2014/0257869 A1 | 9/2014 | Binion et al. |
| 2014/0266655 A1 | 9/2014 | Palan |
| 2014/0272810 A1 | 9/2014 | Fields et al. |
| 2014/0272811 A1 | 9/2014 | Palan |
| 2014/0277902 A1* | 9/2014 | Koch .................... G07C 5/008 701/29.1 |
| 2014/0277916 A1 | 9/2014 | Mullen et al. |
| 2014/0278569 A1 | 9/2014 | Sanchez et al. |
| 2014/0278571 A1 | 9/2014 | Mullen et al. |
| 2014/0278586 A1 | 9/2014 | Sanchez et al. |
| 2014/0278840 A1 | 9/2014 | Scofield et al. |
| 2014/0279707 A1 | 9/2014 | Joshua et al. |
| 2014/0300739 A1* | 10/2014 | Mimar .................. H04N 7/188 348/148 |
| 2014/0301218 A1 | 10/2014 | Luo et al. |
| 2014/0303827 A1 | 10/2014 | Dolgov et al. |
| 2014/0306799 A1 | 10/2014 | Ricci |
| 2014/0309864 A1 | 10/2014 | Ricci |
| 2014/0310186 A1 | 10/2014 | Ricci |
| 2014/0330478 A1 | 11/2014 | Cullinane et al. |
| 2014/0335902 A1 | 11/2014 | Guba et al. |
| 2014/0337930 A1 | 11/2014 | Hoyos et al. |
| 2014/0350970 A1 | 11/2014 | Schumann, Jr. et al. |
| 2014/0358324 A1 | 12/2014 | Sagar et al. |
| 2014/0376410 A1 | 12/2014 | Ros et al. |
| 2014/0378082 A1 | 12/2014 | Ros et al. |
| 2014/0379385 A1 | 12/2014 | Duncan et al. |
| 2015/0006278 A1 | 1/2015 | Di Censo et al. |
| 2015/0019266 A1 | 1/2015 | Stempora |
| 2015/0024705 A1 | 1/2015 | Rashidi |
| 2015/0025917 A1 | 1/2015 | Stempora |
| 2015/0032581 A1 | 1/2015 | Blackhurst et al. |
| 2015/0035685 A1 | 2/2015 | Strickland et al. |
| 2015/0039348 A1 | 2/2015 | Miller et al. |
| 2015/0039350 A1 | 2/2015 | Martin et al. |
| 2015/0039397 A1 | 2/2015 | Fuchs |
| 2015/0045983 A1 | 2/2015 | Fraser et al. |
| 2015/0051752 A1 | 2/2015 | Paszkowicz |
| 2015/0051787 A1 | 2/2015 | Doughty et al. |
| 2015/0058046 A1 | 2/2015 | Huynh et al. |
| 2015/0066284 A1 | 3/2015 | Yopp |
| 2015/0070160 A1 | 3/2015 | Davidsson et al. |
| 2015/0070265 A1 | 3/2015 | Cruz-Hernandez et al. |
| 2015/0073645 A1 | 3/2015 | Davidsson et al. |
| 2015/0088334 A1 | 3/2015 | Bowers et al. |
| 2015/0088358 A1 | 3/2015 | Yopp |
| 2015/0088360 A1 | 3/2015 | Bonnet et al. |
| 2015/0088373 A1 | 3/2015 | Wilkins |
| 2015/0088550 A1 | 3/2015 | Bowers et al. |
| 2015/0095132 A1 | 4/2015 | Van Heerden et al. |
| 2015/0100189 A1 | 4/2015 | Tellis et al. |
| 2015/0100190 A1 | 4/2015 | Yopp |
| 2015/0100191 A1 | 4/2015 | Yopp |
| 2015/0100353 A1 | 4/2015 | Hughes et al. |
| 2015/0112504 A1 | 4/2015 | Binion et al. |
| 2015/0112543 A1 | 4/2015 | Binion et al. |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0113521 A1 | 4/2015 | Suzuki et al. |
| 2015/0120331 A1 | 4/2015 | Russo et al. |
| 2015/0127570 A1 | 5/2015 | Doughty et al. |
| 2015/0128123 A1 | 5/2015 | Eling |
| 2015/0142244 A1 | 5/2015 | You et al. |
| 2015/0142262 A1 | 5/2015 | Lee |
| 2015/0149018 A1 | 5/2015 | Attard et al. |
| 2015/0149023 A1 | 5/2015 | Attard et al. |
| 2015/0149265 A1 | 5/2015 | Huntzicker et al. |
| 2015/0153733 A1 | 6/2015 | Ohmura et al. |
| 2015/0154711 A1* | 6/2015 | Christopulos .......... G06Q 40/08 705/7.29 |
| 2015/0158469 A1 | 6/2015 | Cheatham, III et al. |
| 2015/0158495 A1 | 6/2015 | Duncan et al. |
| 2015/0160653 A1 | 6/2015 | Cheatham, III et al. |
| 2015/0161738 A1* | 6/2015 | Stempora ............... G06Q 40/08 705/4 |
| 2015/0161893 A1 | 6/2015 | Duncan et al. |
| 2015/0161894 A1 | 6/2015 | Duncan et al. |
| 2015/0166069 A1 | 6/2015 | Engelman et al. |
| 2015/0169311 A1 | 6/2015 | Dickerson et al. |
| 2015/0170287 A1 | 6/2015 | Tirone et al. |
| 2015/0170522 A1 | 6/2015 | Noh |
| 2015/0178997 A1 | 6/2015 | Ohsaki |
| 2015/0178998 A1 | 6/2015 | Attard et al. |
| 2015/0185034 A1 | 7/2015 | Abhyanker |
| 2015/0187013 A1 | 7/2015 | Adams et al. |
| 2015/0187015 A1 | 7/2015 | Adams et al. |
| 2015/0187016 A1 | 7/2015 | Adams et al. |
| 2015/0187019 A1 | 7/2015 | Fernandes et al. |
| 2015/0189241 A1 | 7/2015 | Kim et al. |
| 2015/0193213 A1 | 7/2015 | Pandya et al. |
| 2015/0193220 A1 | 7/2015 | Rork et al. |
| 2015/0203113 A1 | 7/2015 | Duncan et al. |
| 2015/0221142 A1 | 8/2015 | Kim et al. |
| 2015/0229885 A1 | 8/2015 | Offenhaeuser |
| 2015/0232064 A1 | 8/2015 | Cudak et al. |
| 2015/0233719 A1 | 8/2015 | Cudak et al. |
| 2015/0235323 A1 | 8/2015 | Oldham |
| 2015/0235557 A1 | 8/2015 | Engelman et al. |
| 2015/0239436 A1 | 8/2015 | Kanai et al. |
| 2015/0241241 A1 | 8/2015 | Cudak et al. |
| 2015/0241853 A1 | 8/2015 | Vechart et al. |
| 2015/0242953 A1 | 8/2015 | Suiter |
| 2015/0246672 A1 | 9/2015 | Pilutti et al. |
| 2015/0253772 A1 | 9/2015 | Solyom et al. |
| 2015/0254955 A1 | 9/2015 | Fields et al. |
| 2015/0266489 A1 | 9/2015 | Solyom et al. |
| 2015/0266490 A1 | 9/2015 | Coelingh et al. |
| 2015/0274072 A1 | 10/2015 | Croteau et al. |
| 2015/0284009 A1 | 10/2015 | Cullinane et al. |
| 2015/0293534 A1 | 10/2015 | Takamatsu |
| 2015/0294422 A1 | 10/2015 | Carver et al. |
| 2015/0302719 A1 | 10/2015 | Mroszczak et al. |
| 2015/0307110 A1 | 10/2015 | Grewe et al. |
| 2015/0310742 A1 | 10/2015 | Albornoz |
| 2015/0310758 A1 | 10/2015 | Daddona et al. |
| 2015/0321641 A1 | 11/2015 | Abou Mahmoud et al. |
| 2015/0332407 A1 | 11/2015 | Wilson, II et al. |
| 2015/0336502 A1 | 11/2015 | Hillis et al. |
| 2015/0338852 A1 | 11/2015 | Ramanujam |
| 2015/0339777 A1 | 11/2015 | Zhalov |
| 2015/0343947 A1 | 12/2015 | Bernico et al. |
| 2015/0346727 A1 | 12/2015 | Ramanujam |
| 2015/0348335 A1 | 12/2015 | Ramanujam |
| 2015/0348337 A1 | 12/2015 | Choi |
| 2015/0356797 A1 | 12/2015 | McBride et al. |
| 2015/0382085 A1 | 12/2015 | Lawrie-Fussey et al. |
| 2016/0014252 A1 | 1/2016 | Biderman et al. |
| 2016/0019790 A1 | 1/2016 | Tobolski et al. |
| 2016/0026182 A1 | 1/2016 | Boroditsky et al. |
| 2016/0027276 A1 | 1/2016 | Freeck et al. |
| 2016/0036899 A1 | 2/2016 | Moody et al. |
| 2016/0042644 A1 | 2/2016 | Velusamy |
| 2016/0042650 A1 | 2/2016 | Stenneth |
| 2016/0055750 A1 | 2/2016 | Linder et al. |

(56) References Cited

U.S. PATENT DOCUMENTS

| | | |
|---|---|---|
| 2016/0068103 A1 | 3/2016 | McNew et al. |
| 2016/0071418 A1 | 3/2016 | Oshida et al. |
| 2016/0083285 A1 | 3/2016 | De Ridder et al. |
| 2016/0086285 A1 | 3/2016 | Jordan Peters et al. |
| 2016/0086393 A1 | 3/2016 | Collins et al. |
| 2016/0092962 A1 | 3/2016 | Wasserman et al. |
| 2016/0093212 A1 | 3/2016 | Barfield, Jr. et al. |
| 2016/0105365 A1 | 4/2016 | Droste et al. |
| 2016/0116293 A1 | 4/2016 | Grover et al. |
| 2016/0116913 A1 | 4/2016 | Niles |
| 2016/0117871 A1 | 4/2016 | McClellan et al. |
| 2016/0117928 A1 | 4/2016 | Hodges et al. |
| 2016/0125735 A1 | 5/2016 | Tuukkanen |
| 2016/0129917 A1 | 5/2016 | Gariepy et al. |
| 2016/0140783 A1 | 5/2016 | Catt et al. |
| 2016/0140784 A1 | 5/2016 | Akanuma et al. |
| 2016/0147226 A1 | 5/2016 | Akselrod et al. |
| 2016/0163217 A1 | 6/2016 | Harkness |
| 2016/0167652 A1 | 6/2016 | Slusar |
| 2016/0171521 A1 | 6/2016 | Ramirez et al. |
| 2016/0189303 A1 | 6/2016 | Fuchs |
| 2016/0189306 A1 | 6/2016 | Bogovich et al. |
| 2016/0189544 A1 | 6/2016 | Ricci |
| 2016/0200326 A1 | 7/2016 | Cullinane et al. |
| 2016/0203560 A1 | 7/2016 | Parameshwaran |
| 2016/0221575 A1 | 8/2016 | Posch et al. |
| 2016/0229376 A1 | 8/2016 | Abou Mahmoud et al. |
| 2016/0255154 A1 | 9/2016 | Kim et al. |
| 2016/0264132 A1 | 9/2016 | Paul et al. |
| 2016/0272219 A1 | 9/2016 | Ketfi-Cherif et al. |
| 2016/0275790 A1 | 9/2016 | Kang et al. |
| 2016/0277911 A1 | 9/2016 | Kang et al. |
| 2016/0282874 A1 | 9/2016 | Kurata et al. |
| 2016/0288833 A1 | 10/2016 | Heimberger et al. |
| 2016/0291153 A1 | 10/2016 | Mossau et al. |
| 2016/0301698 A1 | 10/2016 | Katara et al. |
| 2016/0304027 A1 | 10/2016 | Di Censo et al. |
| 2016/0304038 A1 | 10/2016 | Chen et al. |
| 2016/0304091 A1 | 10/2016 | Remes |
| 2016/0313132 A1 | 10/2016 | Larroy |
| 2016/0314224 A1 | 10/2016 | Wei et al. |
| 2016/0323233 A1 | 11/2016 | Song et al. |
| 2016/0327949 A1 | 11/2016 | Wilson et al. |
| 2016/0343249 A1 | 11/2016 | Gao et al. |
| 2016/0347329 A1 | 12/2016 | Zelman et al. |
| 2016/0370194 A1 | 12/2016 | Colijn et al. |
| 2017/0001146 A1 | 1/2017 | Van Baak et al. |
| 2017/0011465 A1* | 1/2017 | Anastassov ............ G06Q 40/08 |
| 2017/0015263 A1 | 1/2017 | Makled et al. |
| 2017/0017734 A1 | 1/2017 | Groh et al. |
| 2017/0017842 A1 | 1/2017 | Ma et al. |
| 2017/0023945 A1 | 1/2017 | Cavalcanti et al. |
| 2017/0024938 A1 | 1/2017 | Lindsay |
| 2017/0036678 A1 | 2/2017 | Takamatsu |
| 2017/0038773 A1 | 2/2017 | Gordon et al. |
| 2017/0072967 A1 | 3/2017 | Fendt et al. |
| 2017/0080900 A1 | 3/2017 | Huennekens et al. |
| 2017/0084175 A1 | 3/2017 | Sedlik et al. |
| 2017/0086028 A1 | 3/2017 | Hwang et al. |
| 2017/0106876 A1 | 4/2017 | Gordon et al. |
| 2017/0116794 A1 | 4/2017 | Gortsas |
| 2017/0120761 A1 | 5/2017 | Kapadia et al. |
| 2017/0136902 A1 | 5/2017 | Ricci |
| 2017/0147722 A1 | 5/2017 | Greenwood |
| 2017/0148324 A1 | 5/2017 | High et al. |
| 2017/0154479 A1 | 6/2017 | Kim |
| 2017/0168493 A1 | 6/2017 | Miller et al. |
| 2017/0169627 A1 | 6/2017 | Kim et al. |
| 2017/0176641 A1 | 6/2017 | Zhu et al. |
| 2017/0178422 A1* | 6/2017 | Wright ..................... G07C 5/02 |
| 2017/0178423 A1* | 6/2017 | Wright ..................... G07C 5/02 |
| 2017/0178424 A1* | 6/2017 | Wright ..................... G07C 5/02 |
| 2017/0234689 A1 | 8/2017 | Gibson et al. |
| 2017/0236210 A1 | 8/2017 | Kumar et al. |
| 2017/0249844 A1 | 8/2017 | Perkins et al. |
| 2017/0274897 A1 | 9/2017 | Rink et al. |
| 2017/0308082 A1 | 10/2017 | Ullrich et al. |
| 2017/0309092 A1 | 10/2017 | Rosenbaum |
| 2018/0046198 A1 | 2/2018 | Nordbruch et al. |
| 2018/0075538 A1 | 3/2018 | Konrardy et al. |
| 2018/0080995 A1 | 3/2018 | Heinen |
| 2018/0099678 A1 | 4/2018 | Absmeier et al. |
| 2018/0231979 A1 | 8/2018 | Miller et al. |

FOREIGN PATENT DOCUMENTS

| | | |
|---|---|---|
| EP | 700009 A2 | 3/1996 |
| EP | 3239686 A1 | 11/2017 |
| GB | 2268608 A | 1/1994 |
| GB | 2488956 A | 9/2012 |
| GB | 2494727 A | 3/2013 |
| JP | 2002-259708 A | 9/2002 |
| KR | 101515496 B1 | 5/2015 |
| WO | WO-2005/083605 A1 | 9/2005 |
| WO | WO-2010/034909 A1 | 4/2010 |
| WO | WO-2010/062899 A1 | 6/2010 |
| WO | WO-2012/145780 A2 | 11/2012 |
| WO | WO-2014/139821 A1 | 9/2014 |
| WO | WO-2014/148976 A1 | 9/2014 |
| WO | WO-2016/156236 A1 | 10/2016 |
| WO | WO-2017/142931 A1 | 8/2017 |

OTHER PUBLICATIONS

"Self-Driving Cars: The Next Revolution", KPMG, Center for Automotive Research (2012).

The Influence of Telematics on Customer Experience: Case Study of Progressive's Snapshot Program, J.D. Power Insights, McGraw Hill Financial (2013).

Alberi et al., A proposed standardized testing procedure for autonomous ground vehicles, Virginia Polytechnic Institute and State University, 63 pages (Apr. 29, 2008).

Broggi et al., Extensive Tests of Autonomous Driving Technologies, IEEE Trans on Intelligent Transportation Systems, 14(3):1403-15 (May 30, 2013).

Campbell et al., Autonomous Driving in Urban Environments: Approaches, Lessons, and Challenges, Phil. Trans. R. Soc. A, 368:4649-72 (2010).

Figueiredo et al., An Approach to Simulate Autonomous Vehicles in Urban Traffic Scenarios, University of Porto, 7 pages (Nov. 2009).

Gechter et al., Towards a Hybrid Real/Virtual Simulation of Autonomous Vehicles for Critical Scenarios, International Academy Research and Industry Association (IARIA), 4 pages (2014).

Hars, Autonomous Cars: The Next Revolution Looms, Inventivio GmbH, 4 pages (Jan. 2010).

Lee et al., Autonomous Vehicle Simulation Project, Int. J. Software Eng. and Its Applications, 7(5):393-402 (2013).

Miller, A simulation and regression testing framework for autonomous workers, Case Western Reserve University, 12 pages (Aug. 2007).

Pereira, An Integrated Architecture for Autonomous Vehicle Simulation, University of Porto., 114 pages (Jun. 2011).

Quinlan et al., Bringing Simulation to Life: A Mixed Reality Autonomous Intersection, Proc. IROS 2010—IEEE/RSJ International Conference on Intelligent Robots and Systems, Taipei Taiwan, 6 pages (Oct. 2010).

Reddy, The New Auto Insurance Ecosystem: Telematics, Mobility and the Connected Car, Cognizant (Aug. 2012).

Reifel et al., "Telematics: The Game Changer—Reinventing Auto Insurance", A.T. Kearney (2010).

Roberts, "What is Telematics Insurance?", MoneySupermarket (Jun. 20, 2012).

Stavens, Learning to Drive: Perception for Autonomous Cars, Stanford University, 104 pages (May 2011).

U.S. Appl. No. 13/844,090, Office Action, dated Dec. 4, 2013.

U.S. Appl. No. 14/057,408, Notice of Allowance, dated Sep. 25, 2014.

U.S. Appl. No. 14/057,419, Notice of Allowance, dated Oct. 5, 2015.

(56) References Cited

OTHER PUBLICATIONS

U.S. Appl. No. 14/057,435, Notice of Allowance, dated Apr. 1, 2016.
U.S. Appl. No. 14/057,447, Final Office Action, dated Jun. 20, 2016.
U.S. Appl. No. 14/057,447, Nonfinal Office Action, dated Dec. 11, 2015.
U.S. Appl. No. 14/057,447, Nonfinal Office Action, dated Sep. 28, 2016.
U.S. Appl. No. 14/057,456, Final Office Action, dated Jun. 16, 2016.
U.S. Appl. No. 14/057,456, Final Office Action, dated Mar. 17, 2015.
U.S. Appl. No. 14/057,456, Nonfinal Office Action, dated Dec. 3, 2015.
U.S. Appl. No. 14/057,456, Nonfinal Office Action, dated Mar. 9, 2017.
U.S. Appl. No. 14/057,467, Final Office Action, dated Dec. 7, 2016.
U.S. Appl. No. 14/057,467, Final Office Action, dated Mar. 16, 2016.
U.S. Appl. No. 14/057,467, Nonfinal Office Action, dated Jul. 1, 2016.
U.S. Appl. No. 14/057,467, Nonfinal Office Action, dated Nov. 12, 2015.
U.S. Appl. No. 14/208,626, Notice of Allowance, dated May 11, 2015.
U.S. Appl. No. 14/208,626, Notice of Allowance, dated Sep. 1, 2015.
U.S. Appl. No. 14/215,789, Final Office Action, dated Mar. 11, 2016.
U.S. Appl. No. 14/255,934, Notice of Allowance, dated May 27, 2015.
U.S. Appl. No. 14/339,652, Final Office Action, dated Apr. 22, 2016.
U.S. Appl. No. 14/339,652, Nonfinal Office Action, dated Sep. 24, 2015.
U.S. Appl. No. 14/511,712, Office Action, dated Dec. 26, 2014.
U.S. Appl. No. 14/528,424, Final Office Action, dated Apr. 22, 2016.
U.S. Appl. No. 14/528,424, Nonfinal Office Action, dated Dec. 3, 2015.
U.S. Appl. No. 14/528,642, Final Office Action, dated Mar. 9, 2016.
U.S. Appl. No. 14/713,184, Final Office Action, dated Jul. 15, 2016.
U.S. Appl. No. 14/713,184, Nonfinal office action, dated Mar. 10, 2017.
U.S. Appl. No. 14/713,184, Nonfinal Office Action, dated Feb. 1, 2016.
U.S. Appl. No. 14/713,188, Final Office Action, dated May 31, 2016.
U.S. Appl. No. 14/713,188, Nonfinal Office Action, dated Dec. 3, 2015.
U.S. Appl. No. 14/713,188, Nonfinal Office Action, dated Feb. 24, 2017.
U.S. Appl. No. 14/713,194, Final Office Action, dated Jan. 25, 2017.
U.S. Appl. No. 14/713,194, Nonfinal Office Action, dated Jul. 29, 2016.
U.S. Appl. No. 14/713,201, Final Office Action, dated Sep. 27, 2016.
U.S. Appl. No. 14/713,201, Nonfinal Office Action, dated May 19, 2016.
U.S. Appl. No. 14/713,206, Final Office Action, dated May 13, 2016.
U.S. Appl. No. 14/713,206, Nonfinal Office Action, dated Feb. 13, 2017.
U.S. Appl. No. 14/713,206, Nonfinal Office Action, dated Nov. 20, 2015.
U.S. Appl. No. 14/713,214, Final Office Action, dated Aug. 26, 2016.
U.S. Appl. No. 14/713,214, Nonfinal Office Action, dated Feb. 26, 2016.
U.S. Appl. No. 14/713,217, Final Office Action, dated Jul. 22, 2016.
U.S. Appl. No. 14/713,217, Nonfinal Office Action, dated Mar. 10, 2017.
U.S. Appl. No. 14/713,217, Nonfinal Office Action, dated Feb. 12, 2016.
U.S. Appl. No. 14/713,223, Final Office Action, dated Sep. 1, 2016.
U.S. Appl. No. 14/713,223, Nonfinal Office Action, dated Feb. 26, 2016.
U.S. Appl. No. 14/713,226, Final Office Action, dated May 26, 2016.
U.S. Appl. No. 14/713,226, Nonfinal Office Action, dated Jan. 13, 2016.
U.S. Appl. No. 14/713,226, Notice of Allowance, dated Sep. 22, 2016.
U.S. Appl. No. 14/713,226, Second Notice of Allowance, dated Jan. 12, 2017.
U.S. Appl. No. 14/713,230, Final Office Action, dated Mar. 22, 2016.
U.S. Appl. No. 14/713,230, Nonfinal Office Action, dated Feb. 10, 2017.
U.S. Appl. No. 14/713,237, Final Office Action, dated Sep. 9, 2016.
U.S. Appl. No. 14/713,237, Nonfinal Office Action, dated Apr. 18, 2016.
U.S. Appl. No. 14/713,240, Final Office Action, dated Sep. 12, 2016.
U.S. Appl. No. 14/713,240, Nonfinal Office Action, dated Apr. 7, 2016.
U.S. Appl. No. 14/713,249, Final Office Action, dated Jul. 12, 2016.
U.S. Appl. No. 14/713,249, Nonfinal Office Action, dated Mar. 7, 2017.
U.S. Appl. No. 14/713,249, Nonfinal Office Action, dated Jan. 20, 2016.
U.S. Appl. No. 14/713,254, Final Office Action, dated Mar. 16, 2016.
U.S. Appl. No. 14/713,254, Nonfinal Office Action, dated Jan. 30, 2017.
U.S. Appl. No. 14/713,261, Final Office Action, dated Apr. 1, 2016.
U.S. Appl. No. 14/713,261, Nonfinal Office Action, dated Feb. 23, 2017.
U.S. Appl. No. 14/713,266, Final Office Action, dated Sep. 12, 2016.
U.S. Appl. No. 14/713,266, Nonfinal Office Action, dated Mar. 23, 2016.
U.S. Appl. No. 14/713,271, Final Office Action, dated Jun. 17, 2016.
U.S. Appl. No. 14/713,271, Nonfinal Office Action, dated Feb. 28, 2017.
U.S. Appl. No. 14/713,271, Nonfinal Office Action, dated Nov. 6, 2015.
U.S. Appl. No. 14/718,338, Notice of Allowance, dated Nov. 2, 2015.
U.S. Appl. No. 14/887,580, Final Office Action, dated Mar. 21, 2017.
U.S. Appl. No. 14/887,580, Nonfinal Office Action, dated Apr. 7, 2016.
U.S. Appl. No. 14/887,580, Nonfinal Office Action, dated Oct. 18, 2016.
U.S. Appl. No. 14/934,326, filed Nov. 6, 2015, Fields et al., "Autonomous Vehicle Operating Status Assessment".
U.S. Appl. No. 14/934,333, filed Nov. 6, 2015, Fields et al., "Autonomous Vehicle Control Assessment and Selection".
U.S. Appl. No. 14/934,339, filed Nov. 6, 2015, Fields et al., "Autonomous Vehicle Operator Identification".
U.S. Appl. No. 14/934,343, filed Nov. 6, 2015, Fields et al., "Autonomous Vehicle Operating Style and Mode Monitoring".
U.S. Appl. No. 14/934,345, filed Nov. 6, 2015, Fields et al., "Autonomous Vehicle Feature Recommendations".
U.S. Appl. No. 14/934,347, filed Nov. 6, 2015, Fields et al., "Autonomous Vehicle Software Version Assessment".
U.S. Appl. No. 14/934,347, Nonfinal Office Action, dated Mar. 16, 2017.
U.S. Appl. No. 14/934,355, filed Nov. 6, 2015, Fields et al. "Autonomous Vehicle Insurance Based Upon Usage".
U.S. Appl. No. 14/934,357, filed Nov. 6, 2015, Fields et al. "Autonomous Vehicle Salvage and Repair".
U.S. Appl. No. 14/934,361, filed Nov. 6, 2015, Fields et al. "Autonomous Vehicle Infrastructure Communication Device".

(56) References Cited

OTHER PUBLICATIONS

U.S. Appl. No. 14/934,371, filed Nov. 6, 2015, Fields et al. "Autonomous Vehicle Accident and Emergency Response".
U.S. Appl. No. 14/934,381, filed Nov. 6, 2015, Fields et al. "Personal Insurance Policies".
U.S. Appl. No. 14/934,385, filed Nov. 6, 2015, Fields et al., "Autonomous Vehicle Operating Status Assessment".
U.S. Patent Application No. 14/934,388, filed Nov. 6, 2015, Fields et al., "Autonomous Vehicle Control Assessment and Selection".
U.S. Appl. No. 14/934,393, filed Nov. 6, 2015, Fields et al., "Autonomous Vehicle Control Assessment and Selection".
U.S. Appl. No. 14/934,400, filed Nov. 6, 2015, Fields et al., "Autonomous Vehicle Control Assessment and Selection".
U.S. Appl. No. 14/934,405, filed Nov. 6, 2015, Fields et al., "Autonomous Vehicle Automatic Parking".
U.S. Appl. No. 14/950,492, Final Office Action, dated May 3, 2016.
U.S. Appl. No. 14/950,492, Nonfinal Office Action, dated Jan. 22, 2016.
U.S. Appl. No. 14/950,492, Notice of Allowance, dated Aug. 3, 2016.
U.S. Appl. No. 14/951,798, Nonfinal Office Action, dated Jan. 27, 2017.
U.S. Appl. No. 14/951,803, "Accident Fault Determination for Autonomous Vehicles", Konrardy et al., filed Nov. 25, 2015.
U.S. Appl. No. 14/978,266, "Autonomous Feature Use Monitoring and Telematics", Konrardy et al., filed Dec. 22, 2015.
U.S. Appl. No. 15/229,926, "Advanced Vehicle Operator Intelligence System", filed Aug. 5, 2016.
U.S. Appl. No. 15/410,192, "Autonomous Vehicle Operation Feature Monitoring and Evaluation of Effectiveness", Konrardy et al., filed Jan. 19, 2017.
U.S. Appl. No. 15/421,508, "Autonomous Vehicle Operation Feature Monitoring and Evaluation of Effectiveness", Konrardy et al., filed Feb. 1, 2017.
U.S. Appl. No. 15/421,521, "Autonomous Vehicle Operation Feature Monitoring and Evaluation of Effectiveness", Konrardy et al., filed Feb. 1, 2017.
Wiesenthal et al., "The Influence of Music on Driver Stress," Journal of Applied Social Psychology 30(8):1709-19 (2000).
Zhou et al., A Simulation Model to Evaluate and Verify Functions of Autonomous Vehicle Based on Simulink, Tongji University, 12 pages (2009).
"Driverless Cars . . . The Future is Already Here", AutoInsurance Center, downloaded from the Internet at: <http://www.autoinsurancecenter.com/driverless-cars...the-future-is-already-here.htm> (2010; downloaded on Mar. 27, 2014).
"Integrated Vehicle-Based Safety Systems (IVBSS)", Research and Innovative Technology Administration (RITA), http://www.its.dot.gov/ivbss/, retrieved from the internet on Nov. 4, 2013, 3 pages.
Advisory Action dated Apr. 1, 2015 for U.S. Appl. No. 14/269,490, 4 pgs.
Carroll et al. "Where Innovation is Sorely Needed", http://www.technologyreview.com/news/422568/where-innovation-is-sorely-needed/?nlid, retrieved from the Internet on Nov. 4, 2013, 3 pages.
Davies, Avoiding Squirrels and Other Things Google's Robot Car Can't Do, downloaded from the Internet at: <http://www.wired.com/2014/05/google-self-driving-car-can-cant/ (downloaded on May 28, 2014).
Fields et al., U.S. Appl. No. 14/511,712, filed Oct. 10, 2014.
Fields et al., U.S. Appl. No. 14/511,750, filed Oct. 10, 2014.
Final Office Action, U.S. Appl. No. 14/255,934, dated Sep. 23, 2014.
Final Office Action, U.S. Appl. No. 14/269,490, dated Jan. 23, 2015.
Hancock, G.M., P.A. Hancock, and C.M. Janelle, "The Impact of Emotions and Predominant Emotion Regulation Technique on Driving Performance," pp. 5882-5885, 2012.
Levendusky, Advancements in automotive technology and their effect on personal auto insurance, downloaded from the Internet at: <http://www.verisk.com/visualize/advancements-in-automotive-technology-and-their-effect> (2013).
McCraty, R., B. Barrios-Choplin, M. Atkinson, and D. Tomasino. "The Effects of Different Types of Music on Mood, Tension, and Mental Clarity." Alternative Therapies in Health and Medicine 4.1 (1998): 75-84. NCBI PubMed. Web. Jul. 11, 2013.
Mui, Will auto insurers survive their collision with driverless cars? (Part 6), downloaded from the Internet at: <http://www.forbes.com/sites/chunkamui/2013/03/28/will-auto-insurers-survive-their-collision> (Mar. 28, 2013).
Nonfinal Office Action, U.S. Appl. No. 14/255,934, dated Jan. 15, 2015.
Nonfinal Office Action, U.S. Appl. No. 14/255,934, dated Jun. 18, 2014.
Nonfinal Office Action, U.S. Appl. No. 14/269,490, dated Sep. 12, 2014.
Notice of Allowance in U.S. Appl. No. 14/057,408 dated Sep. 25, 2014.
Notice of Allowance in U.S. Appl. No. 14/057,419 dated Oct. 5, 2015.
Notice of Allowance in U.S. Appl. No. 14/208,626 dated May 11, 2015.
Notice of Allowance in U.S. Appl. No. 14/208,626 dated Sep. 1, 2015.
Notice of Allowance in U.S. Appl. No. 14/255,934 dated May 27, 2015.
Notice of Allowance in U.S. Appl. No. 14/729,290 dated Aug. 5, 2015.
Office Action dated Dec. 26, 2014 for U.S. Appl. No. 14/511,712, 21 pgs.
Office Action in U.S. Appl. No. 13/844,090 dated Dec. 4, 2013.
Office Action in U.S. Appl. No. 14/057,419 dated Mar. 31, 2015.
Office Action in U.S. Appl. No. 14/057,456 dated Mar. 17, 2015.
Office Action in U.S. Appl. No. 14/201,491 dated Apr. 29, 2015.
Office Action in U.S. Appl. No. 14/201,491 dated Jan. 16, 2015.
Office Action in U.S. Appl. No. 14/201,491 dated Sep. 11, 2015.
Office Action in U.S. Appl. No. 14/201,491 dated Sep. 26, 2014.
Office Action in U.S. Appl. No. 14/215,789 dated Sep. 17, 2015.
Office Action in U.S. Appl. No. 14/255,934 dated Jan. 15, 2015.
Office Action in U.S. Appl. No. 14/255,934 dated Jun. 18, 2014.
Office Action in U.S. Appl. No. 14/255,934 dated Sep. 23, 2014.
Office Action in U.S. Appl. No. 14/269,490 dated Jan. 23, 2015.
Office Action in U.S. Appl. No. 14/269,490 dated Jun. 11, 2015.
Office Action in U.S. Appl. No. 14/269,490 dated Sep. 12, 2014.
Office Action in U.S. Appl. No. 14/511,712 dated Jun. 25, 2015.
Office Action in U.S. Appl. No. 14/511,712 dated Oct. 10, 2014.
Office Action in U.S. Appl. No. 14/511,750 dated Dec. 19, 2014.
Office Action in U.S. Appl. No. 14/511,750 dated Jun. 30, 2015.
Office Action in U.S. Appl. No. 14/057,408 dated Jan. 28, 2014.
Office Action in U.S. Appl. No. 14/057,408 dated May 22, 2014.
Office Action in U.S. Appl. No. 14/057,419 dated Jan. 28, 2014.
Office Action in U.S. Appl. No. 14/057,419 dated Jun. 18, 2014.
Office Action in U.S. Appl. No. 14/057,435 dated Jul. 23, 2014.
Office Action in U.S. Appl. No. 14/057,435 dated Mar. 20, 2014.
Office Action in U.S. Appl. No. 14/057,435 dated May 29, 2015.
Office Action in U.S. Appl. No. 14/057,435 dated Nov. 18, 2014.
Office Action in U.S. Appl. No. 14/057,447 dated Aug. 28, 2014.
Office Action in U.S. Appl. No. 14/057,447 dated Dec. 18, 2014.
Office Action in U.S. Appl. No. 14/057,447 dated Feb. 24, 2014.
Office Action in U.S. Appl. No. 14/057,447 dated Jul. 6, 2015.
Office Action in U.S. Appl. No. 14/057,456 dated Mar. 14, 2014.
Office Action in U.S. Appl. No. 14/057,456 dated Oct. 28, 2014.
Office Action in U.S. Appl. No. 14/208,626 dated Apr. 29, 2014.
Office Action in U.S. Appl. No. 14/208,626 dated Aug. 13, 2014.
Office Action in U.S. Appl. No. 14/339,652 dated May 15, 2015.
Office Action in U.S. Appl. No. 14/339,652 dated Oct. 23, 2014.
Office Action in U.S. Appl. No. 14/339,652 dated Sep. 24, 2015.
Office Action in U.S. Appl. No. 14/528,424 dated Feb. 27, 2015.
Office Action in U.S. Appl. No. 14/528,424 dated Jul. 30, 2015.
Office Action in U.S. Appl. No. 14/528,642 dated Jan. 13, 2015.
Office Action in U.S. Appl. No. 14/713,230 dated Oct. 9, 2015.
Office Action in U.S. Appl. No. 14/713,254 dated Oct. 9, 2015.
Office Action in U.S. Appl. No. 14/718,338 dated Jul. 7, 2015.
Office Action, U.S. Appl. No. 14/713,261, dated Oct. 21, 2015.

(56) References Cited

OTHER PUBLICATIONS

Read, Autonomous cars & the death of auto insurance, downloaded from the Internet at: <http://www.thecarconnection.com/news/1083266_autonomous-cars-the-death-of-auto-insurance> (Apr. 1, 2013).
Riley et al., U.S. Appl. No. 14/269,490, filed May 5, 2014.
Ryan, Can having safety features reduce your insurance premiums? (Dec. 15, 2010).
Search Report in EP Application No. 13167206.5 dated Aug. 13, 2013, 6 pages.
Sharma, Driving the future: the legal implications of autonomous vehicles conference recap, downloaded from the Internet at: <http://law.scu.edu/hightech/autonomousvehicleconfrecap2012> (2012).
Stienstra, Autonomous Vehicles & the Insurance Industry, 2013 CAS Annual Meeting—Minneapolis, MN (2013).
U.S. Appl. No. 14/215,789, filed Mar. 17, 2014, Baker et al., "Split Sensing Method".
U.S. Appl. No. 14/339,652, filed Jul. 24, 2014, Freeck et al., "System and Methods for Monitoring a Vehicle Operator and Monitoring an Operating Environment Within the Vehicle".
U.S. Appl. No. 14/528,424, filed Oct. 30, 2014, Christensen et al., "Systems and Methods for Processing Trip-Based Insurance Policies".
U.S. Appl. No. 14/528,642, filed Oct. 30, 2014, Christensen et al., "Systems and Methods for Managing Units Associated with Time-Based Insurance Policies".
U.S. Appl. No. 14/713,184, filed May 15, 2015, Konrardy et al., "Autonomous Vehicle Insurance Pricing".
U.S. Appl. No. 14/713,188, filed May 15, 2015, Konrardy et al., "Autonomous Feature Use Monitoring and Insurance Pricing".
U.S. Appl. No. 14/713,194, filed May 15, 2015, Konrardy et al., "Autonomous Communication Feature Use and Insurance Pricing".
U.S. Appl. No. 14/713,201, filed May 15, 2015, Konrardy et al., "Autonomous Vehicle Insurance Pricing and Offering Based Upon Accident Risk Factors".
U.S. Appl. No. 14/713,206, filed May 15, 2015, Konrardy et al., "Determining Autonomous Vehicle Technology Performance for Insurance Pricing and Offering".
U.S. Appl. No. 14/713,214, filed May 15, 2015, Konrardy et al., "Accident Risk Model Determination Using Autonomous Vehicle Operating Data".
U.S. Appl. No. 14/713,217, filed May 15, 2015, Konrardy et al., "Autonomous Vehicle Operation Feature Usage Recommendations".
U.S. Appl. No. 14/713,223, filed May 15, 2015, Konrardy et al., "Driver Feedback Alerts Based Upon Monitoring Use of Autonomous Vehicle Operation Features".
U.S. Appl. No. 14/713,226, filed May 15, 2015, Konrardy et al., "Accident Response Using Autonomous Vehicle Monitoring".
U.S. Appl. No. 14/713,230, filed May 15, 2015, Konrardy et al., "Accident Fault Determination for Autonomous Vehicles".
U.S. Appl. No. 14/713,237, filed May 15, 2015, Konrardy et al., "Autonomous Vehicle Technology Effectiveness Determination for Insurance Pricing".
U.S. Appl. No. 14/713,240, filed May 15, 2015, Konrardy et al., "Fault Determination with Autonomous Feature Use Monitoring".
U.S. Appl. No. 14/713,244, filed May 15, 2015, Konrardy et al., "Autonomous Vehicle Operation Feature Evaulation".
U.S. Appl. No. 14/713,249, filed May 15, 2015, Konrardy et al., "Autonomous Vehicle Operation Feature Monitoring and Evaluation of Effectiveness".
U.S. Appl. No. 14/713,254, filed May 15, 2015, Konrardy et al., "Accident Fault Determination for Autonomous Vehicles".
U.S. Appl. No. 14/713,261, filed May 15, 2015, Konrardy et al., "Accident Fault Determination for Autonomous Vehicles".
U.S. Appl. No. 14/713,266, filed May 15, 2015, Konrardy et al., "Autonomous Vehicle Operation Feature Monitoring and Evaluation of Effectiveness".
U.S. Appl. No. 14/713,271, filed May 15, 2015, Konrardy et al. "Fully Autonomous Vehicle Insurance Pricing".
U.S. Appl. No. 14/729,290, filed Jun. 3, 2015, Fields et al., "Advanced Vehicle Operator Intelligence System".
U.S. Appl. No. 14/857,242, filed Sep. 17, 2015, Fields et al., "Advanced Vehicle Operator Intelligence System".
Wiesenthal, David L., Dwight A. Hennessy, and Brad Totten, "The Influence of Music on Driver Stress," Journal of Applied Social Psychology 30, 8, pp. 1709-1719, 2000.
Young et al., "Cooperative Collision Warning Based Highway Vehicle Accident Reconstruction", Eighth International Conference on Intelligent Systems Design and Applications, Nov. 26-28, 2008, pp. 561-565.
"Biofeedback mobile app", Kurzweill Accelerating Intelligence, downloaded from the Internet at: ,http://www.kurzweilai.net/biofeedback-mobile-app> (Feb. 12, 2013).
"Intel Capital to Invest in Future of Automotive Technology", News Release, Intel Corp. (Feb. 29, 2012).
"MIT Spin-off Affectiva Raises $5.7 Million to Commercialize Emotion Technology", Business Wire (Jul. 19, 2011).
"Private Ownership Costs", RACQ, Wayback Machine, http://www.racq.com.au:80/~/media/pdf/racqpdfs/cardsanddriving/cars/0714_vehicle_running_costs.ashx/ (Oct. 6, 2014).
Al-Shihabi et al., A framework for modeling human-like driving behaviors for autonomous vehicles in driving simulators, Agents'01, pp. 286-291 (May 2001).
Beard et al., Autonomous vehicle technologies for small fixed-wing UAVs, J. Aerospace Computing Info. Commun. (Jan. 2005).
Birch, 'Mercedes-Benz' world class driving simulator complex enhances moose safety, SAE International, Automotive Engineering (Nov. 13, 2010).
Bondarev, Design of an Emotion Management System for a Home Reboot, Koninklijke Philips Electronics NV, 63 pp. (2002).
Bosker, Affectiva's Emotion Recognition Tech: When Machines Know What You're Feeling, www.HuffPost.com (Dec. 24, 2012).
Chan et al., The emotional side of cognitive distraction: implications for road safety, Accident Analysis and Prevention, 50:147-54 (2013).
Cutler, Using the IPhone's Front-Facing Camera, Cardiio Measures Your Heartrate, downloaded from the Internet at: <https://techcrunch.com/2012/08/09/cardiio/> (Aug. 9, 2012).
Davies, Here's How Mercedes-Benz Tests its New Self-Driving Car, Business Insider (Nov. 20, 2012).
Duffy et al., Sit, Stay, Drive: The Future of Autonomous Car Liability, SMU Science & Technology Law Review, vol. 16, pp. 101-123 (Winter 2013).
Foo et al., Three-dimensional path planning of unmanned aerial vehicles using particle swarm optimization, Sep. 2006, AIAA.
Franke et al., Autonomous Driving Goes Downtown, IEEE Intelligent Systems, (Nov. 1998).
Funkhouser, Paving the Road Ahead: Autonomous vehicles, products liability, and the need for a new approach, Utah Law Review, vol. 437, Issue 1 (2013).
Garza, "Look Ma, No Hands!" Wrinkles and Wrecks in the Age of Autonomous Vehicles, New England Law Review, vol. 46, pp. 581-616 (2012).
Goldmark, MIT is making a road frustration index to measure stresses of driving, Fast Company (Jul. 23, 2013).
Graham-Rowe, "A Smart Phone that Knows You're Angry", MIT Technology Review (Jan. 9, 2012).
Grifantini, Sensor detects emotions through the skin, MIT Technology Review (Oct. 26, 2010).
Gurney, Sue my car not me: Products liability and accidents involving autonomous vehicles, Journal of Law, Technology & Policy (2013).
Healy, Detecting Stress during Real-world Driving Tasks Using Physiological Sensors, IEEE Trans Intelligent Transportation Systems 6.2:156-66 (2005).
Kluckner et al., Image based building classification and 3D modeling with super-pixels, ISPRS Technical Commission II Symposium, PCV 2010, vol. XXXVIII, part 3A, pp. 233-238 (Sep. 3, 2010).
Kus, Implementation of 3D optical scanning technology for automotive applications, Sensors, 9:1967-79 (2009).

(56) References Cited

OTHER PUBLICATIONS

Laine et al., Behavioral triggers of skin conductance responses and their neural correlates in the primate amygdala, J. Neurophysiol., 101:1749-54 (2009).
Lee et al., What is stressful on the road? Analysis on aggression-inducing traffic situations through self-report, Proceedings of the Human Factors and Ergonomics Society Annual Meeting, 57(1):1500-1503 (Sep. 2013).
Lomas, Can an algorithm be empathetic? UK startup EI technologies is building software that's sensitive to tone of voice, downloaded from the Internet at: https://techcrunch.com/2013/08/04/empathy/ (Aug. 4, 2013).
Marchant et al., The coming collision between autonomous vehicles and the liability system, Santa Clara Law Review, 52(4): Article 6 (2012).
Mercedes-Benz, Press Information: Networked With All Sense, Mercedes-Benz Driving Simulator (Nov. 2012).
Merz et al., Beyond Visual Range Obstacle Avoidance and Infrastructure Inspection by an Autonomous Helicopter, Sep. 2011, IEEE.
Murph, Affectiva's Q Sensor Wristband Monitors and Logs Stress Levels, Might Bring Back the Snap Bracelet, Engadget.com (Nov. 2, 2010).
Nasoz et al., Emotion recognition from physiological signals using wireless sensors for presence technologies, Cogn. Tech. Work, 6:4-14 (2004).
Nass et al., Improving automotive safety by pairing driver emotion and car voice emotion. CHI 2005 Late Breaking Results: Short Papers, Portland, Oregon (Apr. 2-7, 2005).
Office Action dated Dec. 19, 2014 for U.S. Appl. No. 14/511,750, 18 pgs.
Office Action in U.S. Appl. No. 14/057,456 dated Mar. 9, 2017.
Office Action in U.S. Appl. No. 14/057,467 dated Feb. 23, 2015.
Office Action in U.S. Appl. No. 14/208,626 dated Dec. 23, 2014.
Office Action in U.S. Appl. No. 14/057,419 dated Oct. 9, 2014.
Office Action in U.S. Appl. No. 14/057,447 dated May 4, 2017.
Office Action in U.S. Appl. No. 14/057,456 dated Jun. 16, 2016.
Office Action in U.S. Appl. No. 14/057,456 dated Sep. 7, 2017.
Office Action in U.S. Appl. No. 14/057,467 dated Apr. 4, 2018.
Office Action in U.S. Appl. No. 14/057,467 dated Apr. 6, 2017.
Office Action in U.S. Appl. No. 14/057,467 dated Dec. 7, 2016.
Office Action in U.S. Appl. No. 14/057,467 dated Jan. 27, 2014.
Office Action in U.S. Appl. No. 14/057,467 dated Jul. 1, 2016.
Office Action in U.S. Appl. No. 14/057,467 dated Jun. 11, 2014.
Office Action in U.S. Appl. No. 14/057,467 dated Mar. 16, 2016.
Office Action in U.S. Appl. No. 14/057,467 dated Oct. 17, 2014.
Office Action in U.S. Appl. No. 14/057,467 dated Sep. 6, 2017.
Office Action in U.S. Appl. No. 14/887,580 dated Apr. 7, 2016.
Office Action in U.S. Appl. No. 14/887,580 dated Mar. 21, 2017.
Office Action in U.S. Appl. No. 14/887,580 dated May 31, 2018.
Office Action in U.S. Appl. No. 14/887,580 dated Oct. 18, 2016.
Office Action in U.S. Appl. No. 14/950,492 dated Jan. 22, 2016.
Office Action in U.S. Appl. No. 14/950,492 dated May 3, 2016.
Office Action in U.S. Appl. No. 15/145,993 dated May 1, 2017.
Office Action in U.S. Appl. No. 15/237,832 dated Jan. 12, 2018.
Office Action of Dec. 26, 2014 for U.S. Appl. No. 14/511,712, 21 pgs.
Peterson, New technology—old law: autonomous vehicles and California's insurance framework, Santa Clara Law Review, 52(4):Article 7 (Dec. 2012).
Philipson, Want to drive safely? Listen to Elton John, Aerosmith or S Club 7, The Telegraph (Jan. 8, 2013).
Pohanka et al., Sensors simulation environment for sensor data fusion, 14th International Conference on Information Fusion, Chicago, IL, pp. 1-8 (2011).
Saberi et al., An approach for functional safety improvement of an existing automotive system, IEEE (2015).
Shaya, "For Some, Driving Is More Stressful than Skydiving." AutomotiveNews.com. Automotive News, Jun. 12, 2013.
Sorrel, App Measures Vital Signs Using IPad Camera, wired.com (Nov. 18, 2011).
Talbot, "Wrist Sensor Tells You How Stressed Out You Are", MIT Technology Review (Dec. 20, 2012).
Toor, Valve looks to sweat levels and eye controls for future game design, downloaded from the Internet at: https://www.theverge.com/2013/5/7/4307750/valve-biometric-eye-tracking-sweat-left-4-dead-portal-2 (May 7, 2013).
U.S. Appl. No. 13/647,098, Final Office Action, dated Oct. 9, 2014.
U.S. Appl. No. 13/647,098, Nonfinal Office Action, dated Apr. 26, 2013.
U.S. Appl. No. 13/836,695, Final Office Action, dated Feb. 25, 2014.
U.S. Appl. No. 13/839,634, Final Office Action, dated Mar. 21, 2014.
U.S. Appl. No. 13/839,634, Nonfinal Office Action, dated Aug. 5, 2014.
U.S. Appl. No. 13/839,634, Nonfinal Office Action, dated Oct. 25, 2013.
U.S. Appl. No. 14/047,844, Notice of Allowance, dated Feb. 3, 2014.
U.S. Appl. No. 14/047,873, Notice of Allowance, dated Apr. 30, 2014.
U.S. Appl. No. 14/201,491, Nonfinal Office Action, dated Sep. 26, 2016.
U.S. Appl. No. 14/201,491, Notice of Allowance, dated Apr. 21, 2017.
U.S. Appl. No. 14/269,490, Final Office Action, dated Jan. 23, 2015.
U.S. Appl. No. 14/269,490, Nonfinal Office Action, dated Jun. 11, 2015.
U.S. Appl. No. 14/269,490, Nonfinal Office Action, dated Sep. 12, 2014.
U.S. Appl. No. 14/269,490, Notice of Allowance, dated Nov. 17, 2015.
U.S. Appl. No. 14/269,920, Final Office Action, dated Feb. 11, 2015.
U.S. Appl. No. 14/269,920, Nonfinal Office Action, dated Jul. 13, 2015.
U.S. Appl. No. 14/269,920, Nonfinal Office Action, dated Sep. 25, 2014.
U.S. Appl. No. 14/318,521, Nonfinal Office Action, dated Oct. 10, 2014.
U.S. Appl. No. 14/323,626, Nonfinal Office Action, dated Sep. 17, 2014.
U.S. Appl. No. 14/323,626, Notice of Allowance, dated Oct. 13, 2015.
U.S. Appl. No. 14/339,652, Final Office Action, dated Dec. 13, 2017.
U.S. Appl. No. 14/339,652, Final Office Action, dated Jan. 11, 2017.
U.S. Appl. No. 14/339,652, Nonfinal Office Action, dated Aug. 11, 2016.
U.S. Appl. No. 14/339,652, Nonfinal Office Action, dated Jun. 6, 2017.
U.S. Appl. No. 14/496,802, Nonfinal Office Action, dated Jan. 2, 2015.
U.S. Appl. No. 14/496,802, Notice of Allowance, dated Oct. 2, 2015.
U.S. Appl. No. 14/496,840, Final Office Action, dated May 5, 2015.
U.S. Appl. No. 14/496,840, Nonfinal Office Action, dated Jan. 5, 2015.
U.S. Appl. No. 14/496,840, Notice of Allowance, dated Nov. 23, 2015.
U.S. Appl. No. 14/528,424, Final Office Action, dated Feb. 23, 2017.
U.S. Appl. No. 14/528,424, Nonfinal Office Action, dated Sep. 12, 2016.
U.S. Appl. No. 14/528,642, Final Office Action, dated Jan. 30, 2017.
U.S. Appl. No. 14/528,642, Nonfinal Office Action, dated Jul. 5, 2016.
U.S. Appl. No. 14/631,558, Notice of Allowance, dated Jun. 10, 2015.
U.S. Appl. No. 14/631,568, Final Office Action, dated Sep. 10, 2015.

(56) References Cited

OTHER PUBLICATIONS

U.S. Appl. No. 14/631,568, Nonfinal Office Action, dated May 19, 2015.
U.S. Appl. No. 14/631,568, Notice of Allowance, dated Jan. 7, 2016.
U.S. Appl. No. 14/656,185, Final Office Action, dated Jun. 25, 2015.
U.S. Appl. No. 14/656,185, Nonfinal Office Action, dated Apr. 2, 2015.
U.S. Appl. No. 14/656,185, Notice of Allowance, dated Oct. 9, 2015.
U.S. Appl. No. 14/713,184, Final Office Action, dated Jun. 29, 2017.
U.S. Appl. No. 14/713,184 Notice of Allowance, dated Mar. 20, 2018.
U.S. Appl. No. 14/713,188, Advisory Action, dated Dec. 15, 2017.
U.S. Appl. No. 14/713,188, Final Office Action, dated Sep. 8, 2017.
U.S. Appl. No. 14/713,194, Nonfinal Office Action, dated Dec. 28, 2017.
U.S. Appl. No. 14/713,201, Notice of Allowance, dated Mar. 28, 2017.
U.S. Appl. No. 14/713,206, Final Office Action, dated Jun. 29, 2017.
U.S. Appl. No. 14/713,206, Notice of Allowance, dated May 17, 2018.
U.S. Appl. No. 14/713,214, Notice of Allowance, dated Sep. 11, 2017.
U.S. Appl. No. 14/713,217, Advisory Action, dated Dec. 15, 2017.
U.S. Appl. No. 14/713,217, Final Office Action, dated Sep. 8, 2017.
U.S. Appl. No. 14/713,223, Notice of Allowance, dated May 24, 2017.
U.S. Appl. No. 14/713,226, Notice of Allowance (second), dated Jan. 12, 2017.
U.S. Appl. No. 14/713,230, Final Office Action, dated Jun. 29, 2017.
U.S. Appl. No. 14/713,230, Nonfinal Office Action, dated May 3, 2018.
U.S. Appl. No. 14/713,237, Notice of Allowance, dated Aug. 30, 2017.
U.S. Appl. No. 14/713,240, Notice of Allowance, dated Jun. 30, 2017.
U.S. Appl. No. 14/713,244, Advisory Action, dated Sep. 6, 2018.
U.S. Appl. No. 14/713,244, Final Office Action, dated Jun. 27, 2018.
U.S. Appl. No. 14/713,244, Nonfinal Office Action, dated Dec. 13, 2017.
U.S. Appl. No. 14/713,249, Final Office Action, dated Sep. 8, 2017.
U.S. Appl. No. 14/713,249, Nonfinal Office Action, dated Sep. 7, 2018.
U.S. Appl. No. 14/713,254, Final Office Action, dated Jun. 29, 2017.
U.S. Appl. No. 14/713,254, Nonfinal Office Action, dated May 3, 2018.
U.S. Appl. No. 14/713,261, Notice of Allowance, dated Jul. 12, 2017.
U.S. Appl. No. 14/713,266, Notice of Allowance, dated May 5, 2017.
U.S. Appl. No. 14/713,271, Final Office Action, dated Jun. 29, 2017.
U.S. Appl. No. 14/713,271, Notice of Allowance, dated Jun. 6, 2018.
U.S. Appl. No. 14/716,999, Final Office Action, dated Mar. 29, 2016.
U.S. Appl. No. 14/716,999, Nonfinal Office Action, dated Sep. 1, 2015.
U.S. Appl. No. 14/798,609, Nonfinal Office Action, dated Aug. 23, 2018.
U.S. Appl. No. 14/798,615, Final Office Action, dated Aug. 3, 2018.
U.S. Appl. No. 14/798,615, Nonfinal Office Action, dated Feb. 7, 2018.
U.S. Appl. No. 14/798,633, Final Office Action, dated Sep. 19, 2018.
U.S. Appl. No. 14/798,633, Nonfinal Office Action, dated Apr. 27, 2018.
U.S. Appl. No. 14/798,741, Final Office Action, dated Jul. 17, 2018.
U.S. Appl. No. 14/798,741, Nonfinal Office Action, dated Jan. 29, 2018.
U.S. Appl. No. 14/798,741, Nonfinal Office Action, dated Nov. 9, 2018.
U.S. Appl. No. 14/798,745, Final Office Action, dated Aug. 30, 2018.
U.S. Appl. No. 14/798,745, Nonfinal Office Action, dated Apr. 17, 2018.
U.S. Appl. No. 14/798,750, Final Office Action, dated Aug. 29, 2018.
U.S. Appl. No. 14/798,750, Nonfinal Office Action, dated Mar. 5, 2018.
U.S. Appl. No. 14/798,757, Nonfinal Office Action, dated Jan. 17, 2017.
U.S. Appl. No. 14/798,757, Notice of Allowance, dated Jul. 12, 2017.
U.S. Appl. No. 14/798,763, Final Office Action, dated Jul. 12, 2018.
U.S. Appl. No. 14/798,763, Nonfinal Office Action, dated Feb. 5, 2018.
U.S. Appl. No. 14/798,763, Nonfinal Office Action, dated Oct. 25, 2018.
U.S. Appl. No. 14/798,769, Final Office Action, dated Mar. 14, 2017.
U.S. Appl. No. 14/798,769, Nonfinal Office Action, dated Oct. 6, 2016.
U.S. Appl. No. 14/798,769, Notice of Allowance, dated Jun. 27, 2017.
U.S. Appl. No. 14/798,770, Nonfinal Office Action, dated Nov. 2, 2017.
U.S. Appl. No. 14/798,770, Notice of Allowance, dated Jun. 25, 2018.
U.S. Appl. No. 14/820,328, Final Office Action, dated Feb. 17, 2016.
U.S. Appl. No. 14/820,328, Nonfinal Office Action, dated Sep. 24, 2015.
U.S. Appl. No. 14/887,580, Nonfinal Office Action, dated Oct. 23, 2017.
U.S. Appl. No. 14/934,326, Final Office Action, dated Aug. 14, 2018.
U.S. Appl. No. 14/934,326, Nonfinal Office Action, dated Mar. 30, 2018.
U.S. Appl. No. 14/934,333, Nonfinal Office Action, dated Oct. 5, 2018.
U.S. Appl. No. 14/934,339, Final Office Action, dated Aug. 10, 2018.
U.S. Appl. No. 14/934,339, Nonfinal Office Action, dated Mar. 14, 2018.
U.S. Appl. No. 14/934,343, Nonfinal Office Action, dated Mar. 19, 2018.
U.S. Appl. No. 14/934,343, Notice of Allowance, dated Aug. 10, 2018.
U.S. Appl. No. 14/934,345, Nonfinal Office Action, dated Sep. 13, 2018.
U.S. Appl. No. 14/934,347, Final Office Action, dated Sep. 22, 2017.
U.S. Appl. No. 14/934,347, Notice of Allowance, dated Dec. 15, 2017.
U.S. Appl. No. 14/934,352, filed Nov. 6, 2015, Fields et al., "Autonomous Vehicle Automatic Parking".
U.S. Appl. No. 14/934,352, Final Office Action, dated Sep. 19, 2018.
U.S. Appl. No. 14/934,352, Nonfinal Office Action, dated Apr. 18, 2018.
U.S. Appl. No. 14/934,355, Final Office Action, dated Jul. 26, 2018.
U.S. Appl. No. 14/934,355, Nonfinal Office Action, dated Mar. 22, 2018.
U.S. Appl. No. 14/934,357, Final Office Action, dated Jul. 20, 2018.
U.S. Appl. No. 14/934,357, Nonfinal Office Action, dated Feb. 28, 2018.
U.S. Appl. No. 14/934,361, Final Office Action, dated Jan. 29, 2018.
U.S. Appl. No. 14/934,361, Nonfinal Office Action, dated Jul. 10, 2017.
U.S. Appl. No. 14/934,361, Nonfinal Office Action, dated Jun. 29, 2018.
U.S. Appl. No. 14/934,371, Final Office Action, dated Oct. 31, 2017.

(56) References Cited

OTHER PUBLICATIONS

U.S. Appl. No. 14/934,371, Nonfinal Office Action, dated Jun. 1, 2017.
U.S. Appl. No. 14/934,371, Notice of Allowance, dated Feb. 23, 2018.
U.S. Appl. No. 14/934,381, Final Office Action, dated Jun. 20, 2018.
U.S. Appl. No. 14/934,381, Nonfinal Office Action, dated Feb. 1, 2018.
U.S. Appl. No. 14/934,385, Nonfinal Office Action, dated Apr. 9, 2018.
U.S. Appl. No. 14/934,385, Notice of Allowance, dated Sep. 7, 2018.
U.S. Appl. No. 14/934,388, Final Office Action, dated Aug. 31, 2018.
U.S. Appl. No. 14/934,388, Nonfinal Office Action, dated Apr. 4, 2018.
U.S. Appl. No. 14/934,393, Nonfinal Office Action, dated Jul. 27, 2018.
U.S. Appl. No. 14/934,400, Nonfinal Office Action, dated Jun. 28, 2018.
U.S. Appl. No. 14/934,405, Final Office Action, dated Oct. 31, 2017.
U.S. Appl. No. 14/934,405, Nonfinal Office Action, dated Apr. 20, 2017.
U.S. Appl. No. 14/934,405, Notice of Allowance, dated Jan. 23, 2018.
U.S. Appl. No. 14/951,774, filed Nov. 25, 2015, Konrardy et al., "Fully Autonomous Vehicle Insurance Pricing".
U.S. Appl. No. 14/951,774, Nonfinal Office Action, dated Feb. 6, 2018.
U.S. Appl. No. 14/951,798, filed Nov. 25, 2015, Konrardy et al., "Accident Fault Determination for Autonomous Vehicles".
U.S. Appl. No. 14/951,798, Final Office Action, dated Jul. 26, 2017.
U.S. Appl. No. 14/951,798, Notice of Allowance, dated Feb. 9, 2018.
U.S. Appl. No. 14/951,803, filed Nov. 25, 2015, Konrardy et al., "Accident Fault Determination for Autonomous Vehicles".
U.S. Appl. No. 14/951,803, Final Office Action, dated Sep. 20, 2018.
U.S. Appl. No. 14/951,803, Nonfinal Office Action, dated Feb. 6, 2018.
U.S. Appl. No. 14/966,226, Final Office Action, dated May 4, 2016.
U.S. Appl. No. 14/966,226, Nonfinal Office Action, dated Jan. 15, 2016.
U.S. Appl. No. 14/978,266, filed Dec. 22, 2015, Konrardy et al., "Autonomous Feature Use Monitoring and Telematics".
U.S. Appl. No. 14/978,266, Nonfinal Office Action, dated Feb. 7, 2018.
U.S. Appl. No. 14/997,154, Nonfinal Office Action, dated Mar. 24, 2016.
U.S. Appl. No. 15/005,300, Nonfinal Office Action, dated Oct. 5, 2017.
U.S. Appl. No. 15/005,300, Notice of Allowance, dated Apr. 18, 2018.
U.S. Appl. No. 15/005,300, Notice of Allowance, dated Jul. 30, 2018.
U.S. Appl. No. 15/005,300, Notice of Allowance, dated Jul. 5, 2018.
U.S. Appl. No. 15/145,993, Nonfinal Office Action, dated May 1, 2017.
U.S. Appl. No. 15/145,993, Notice of Allowance, dated Oct. 25, 2017.
U.S. Appl. No. 15/229,926, filed Aug. 5, 2016, Fields et al., "Advanced Vehicle Operator Intelligence System".
U.S. Appl. No. 15/229,926, Notice of Allowance, dated Aug. 15, 2017.
U.S. Appl. No. 15/237,832, filed Aug. 16, 2016, Binion et al., "Creating a Virtual Model of a Vehicle Event".
U.S. Appl. No. 15/241,769, filed Aug. 19, 2016, Fields et al., "Vehicular Traffic Alerts for Avoidance of Abnormal Traffic Conditions".
U.S. Appl. No. 15/241,769, Nonfinal Office Action, dated Feb. 10, 2017.
U.S. Appl. No. 15/241,769, Notice of Allowance, dated Jul. 7, 2017.
U.S. Appl. No. 15/241,812, filed Aug. 19, 2016, Fields et al., "Using Personal Telematics Data for Rental or Insurance Discounts".
U.S. Appl. No. 15/241,817, filed Aug. 19, 2016, Fields et al., "Vehicular Accident Risk Monitoring and Assessment".
U.S. Appl. No. 15/241,817, Nonfinal Office Action, dated Jun. 8, 2018.
U.S. Appl. No. 15/241,826, filed Aug. 19, 2016, Fields et al., "Shared Vehicle Usage, Monitoring and Feedback".
U.S. Appl. No. 15/241,826, Nonfinal Office Action, dated May 1, 2017.
U.S. Appl. No. 15/241,826, Notice of Allowance, dated Sep. 20, 2017.
U.S. Appl. No. 15/241,832, filed Aug. 19, 2016, Fields et al., "Vehicular Driver Evaluation".
U.S. Appl. No. 15/241,832, Nonfinal Office Action, dated Sep. 12, 2018.
U.S. Appl. No. 15/241,842, filed Aug. 19, 2016, Fields et al., "Vehicular Driver Warnings".
U.S. Appl. No. 15/241,842, Nonfinal Office Action, dated Feb. 22, 2018.
U.S. Appl. No. 15/241,842, Notice of Allowance, dated Sep. 17, 2018.
U.S. Appl. No. 15/241,849, filed Aug. 19, 2016, Fields et al., "Vehicular Warnings Based Upon Pedestrian or Cyclist Presence".
U.S. Appl. No. 15/241,849, Nonfinal Office Action, dated Jun. 1, 2017.
U.S. Appl. No. 15/241,849, Notice of Allowance, dated Sep. 29, 2017.
U.S. Appl. No. 15/241,859, filed Aug. 19, 2016, Fields et al., "Determination of Driver or Vehicle Discounts and Risk Profiles Based Upon Vehicular Travel Environment".
U.S. Appl. No. 15/241,916, filed Aug. 19, 2016, Fields et al., "Determination and Reconstruction of Vehicular Cause and Collision".
U.S. Appl. No. 15/241,922, filed Aug. 19, 2016, Fields et al., "Electric Vehicle Battery Conservation".
U.S. Appl. No. 15/241,922, Nonfinal Office Action, dated Aug. 29, 2018.
U.S. Appl. No. 15/241,932, filed Aug. 19, 2016, Fields et al., "Vehicular Driver Profiles and Discounts".
U.S. Appl. No. 15/241,932, Nonfinal Office Action, dated Jun. 4, 2018.
U.S. Appl. No. 15/255,538, filed Sep. 2, 2016, Fields et al., "Real-Time Driver Observation and Scoring for Driver's Education".
U.S. Appl. No. 15/285,001, filed Oct. 4, 2016, Fields et al., "Real-Time Driver Observation and Scoring for Driver's Education".
U.S. Appl. No. 15/409,092, filed Jan. 18, 2017, Konrardy et al., "Autonomous Vehicle Action Communications".
U.S. Appl. No. 15/409,099, filed Jan. 18, 2017, Konrardy et al., "Autonomous Vehicle Path Coordination".
U.S. Appl. No. 15/409,099, Nonfinal Office Action, dated Apr. 12, 2018.
U.S. Appl. No. 15/409,107, filed Jan. 18, 2017, Konrardy et al., "Autonomous Vehicle Signal Control".
U.S. Appl. No. 15/409,107, Nonfinal Office Action, dated Sep. 27, 2018.
U.S. Appl. No. 15/409,115, filed Jan. 18, 2017, Konrardy et al., "Autonomous Vehicle Application".
U.S. Appl. No. 15/409,115, Nonfinal Office Action, dated Oct. 3, 2017.
U.S. Appl. No. 15/409,115, Notice of Allowance, dated Jan. 26, 2018.
U.S. Appl. No. 15/409,136, filed Jan. 18, 2017, Konrardy et al., "Method and System for Enhancing the Functionality of a Vehicle".
U.S. Appl. No. 15/409,136, Nonfinal Office Action, dated Jul. 19, 2018.
U.S. Appl. No. 15/409,143, filed Jan. 18, 2017, Konrardy et al., "Autonomous Operation Suitability Assessment and Mapping".

(56) References Cited

OTHER PUBLICATIONS

U.S. Appl. No. 15/409,143, Final Office Action, dated Aug. 15, 2018.
U.S. Appl. No. 15/409,143, Nonfinal Office Action, dated Jan. 26, 2018.
U.S. Appl. No. 15/409,146, filed Jan. 18, 2017, Konrardy et al., "Autonomous Vehicle Routing".
U.S. Appl. No. 15/409,146, Nonfinal Office Action, dated Jul. 26, 2018.
U.S. Appl. No. 15/409,148, filed Jan. 18, 2017, Konrardy et al., "System and Method for Autonomous Vehicle Sharing Using Facial Recognition".
U.S. Appl. No. 15/409,148, Nonfinal Office Action, dated Aug. 28, 2018.
U.S. Appl. No. 15/409,149, filed Jan. 18, 2017, Konrardy et al., "Autonomous Vehicle Routing During Emergencies".
U.S. Appl. No. 15/409,149, Nonfinal Office Action, dated Apr. 10, 2018.
U.S. Appl. No. 15/409,149, Notice of Allowance, dated Aug. 15, 2018.
U.S. Appl. No. 15/409,159, filed Jan. 18, 2017, Konrardy et al., "Autonomous Vehicle Trip Routing".
U.S. Appl. No. 15/409,163, filed Jan. 18, 2017, Konrardy et al., "Autonomous Vehicle Parking".
U.S. Appl. No. 15/409,163, Nonfinal Office Action, dated Apr. 5, 2018.
U.S. Appl. No. 15/409,167, filed Jan. 18, 2017, Konrardy et al., "Autonomous Vehicle Retrieval".
U.S. Appl. No. 15/409,167, Nonfinal Office Action, dated Oct. 4, 2018.
U.S. Appl. No. 15/409,180, filed Jan. 18, 2017, Konrardy et al., "Method and System for Repairing a Malfunctioning Autonomous Vehicle".
U.S. Appl. No. 15/409,180, Nonfinal Office Action, dated Jul. 20, 2018.
U.S. Appl. No. 15/409,198, filed Jan. 18, 2017, Konrardy et al., "System and Method for Autonomous Vehicle Ride Sharing Using Facial Recognition".
U.S. Appl. No. 15/409,213, filed Jan. 18, 2017, Konrardy et al., "Coordinated Autonomous Vehicle Automatic Area Scanning".
U.S. Appl. No. 15/409,215, filed Jan. 18, 2017, Konrardy et al., "Autonomous Vehicle Sensor Malfunction Detection".
U.S. Appl. No. 15/409,215, Nonfinal Office Action, dated May 31, 2018.
U.S. Appl. No. 15/409,220, filed Jan. 18, 2017, Konrardy et al., "Autonomous Electric Vehicle Charging".
U.S. Appl. No. 15/409,220, Notice of Allowance, dated May 7, 2018.
U.S. Appl. No. 15/409,228, filed Jan. 18, 2017, Konrardy et al., "Operator-Specific Configuration of Autonomous Vehicle Operation".
U.S. Appl. No. 15/409,228, Nonfinal Office Action, dated Apr. 17, 2018.
U.S. Appl. No. 15/409,236, filed Jan. 18, 2017, Konrardy et al., "Autonomous Vehicle Operation Adjustment Based Upon Route".
U.S. Appl. No. 15/409,239, filed Jan. 18, 2017, Konrardy et al., "Autonomous Vehicle Component Maintenance and Repair".
U.S. Appl. No. 15/409,239, Nonfinal Office Action, dated Jul. 27, 2018.
U.S. Appl. No. 15/409,243, filed Jan. 18, 2017, Konrardy et al., "Anomalous Condition Detection and Response for Autonomous Vehicles".
U.S. Appl. No. 15/409,243, Nonfinal Office Action, dated Oct. 5, 2018.
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,271, Nonfinal Office Action, dated Apr. 6, 2018.
U.S. Appl. No. 15/409,271, Notice of Allowance, dated Sep. 18, 2018.
U.S. Appl. No. 15/409,305, filed Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,326, Nonfinal Office Action, dated Sep. 20, 2018.
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,340, Nonfinal Office Action, dated Feb. 12, 2018.
U.S. Appl. No. 15/409,340, Notice of Allowance, dated Jun. 6, 2018.
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,371, Nonfinal Office Action, dated Apr. 19, 2018.
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/410,192, filed Jan. 19, 2017, Konrardy et al., "Autonomous Vehicle Operation Feature Monitoring and Evaluation of Effectiveness".
U.S. Appl. No. 15/410,192, Nonfinal Office Action, dated Feb. 26, 2018.
U.S. Appl. No. 15/413,796, filed Jan. 24, 2017, Konrardy et al., "Autonomous Vehicle Refueling".
U.S. Appl. No. 15/413,796, Notice of Allowance, dated Apr. 19, 2018.
U.S. Appl. No. 15/421,508, filed Feb. 1, 2017, Konrardy et al., "Autonomous Vehicle Operation Feature Monitoring and Evaluation of Effectiveness".
U.S. Appl. No. 15/421,508, Nonfinal Office Action, dated Mar. 7, 2018.
U.S. Appl. No. 15/421,521, filed Feb. 1, 2017, Konrardy et al., "Autonomous Vehicle Operation Feature Monitoring and Evaluation of Effectiveness".
U.S. Appl. No. 15/472,813, filed Mar. 29, 2017, Konrardy et al., "Accident Response Using Autonomous Vehicle Monitoring".
U.S. Appl. No. 15/472,813, Nonfinal Office Action, dated Nov. 22, 2017.
U.S. Appl. No. 15/472,813, Notice of Allowance, dated Apr. 25, 2018.
U.S. Appl. No. 15/491,487, filed Apr. 19, 2017, Konrardy et al., "Autonomous Vehicle Insurance Pricing and Offering Based Upon Accident Risk Factors".
U.S. Appl. No. 15/600,125, filed May 19, 2017, Fields et al., "Vehicle Operator Emotion Management System and Method".
U.S. Appl. No. 15/600,125, Nonfinal Office Action, dated Jun. 15, 2017.
U.S. Appl. No. 15/600,125, Notice of Allowance, dated Dec. 4, 2017.
U.S. Appl. No. 15/606,049, filed May 26, 2017, Konrardy et al. "Autonomous Vehicle Operation Feature Monitoring and Evaluation of Effectiveness".
U.S. Appl. No. 15/627,596, filed Jun. 20, 2017, Konrardy et al., "Driver Feedback Alerts Based Upon Monitoring Use of Autonomous Vehicle Operation Features".
U.S. Appl. No. 15/676,355, Nonfinal Office Action, dated Nov. 17, 2017.
U.S. Appl. No. 15/676,355, Notice of Allowance, dated Mar. 21, 2018.

(56) References Cited

OTHER PUBLICATIONS

U.S. Appl. No. 15/676,460, Notice of Allowance, dated Oct. 5, 2017.
U.S. Appl. No. 15/676,470, Nonfinal Office Action, dated Apr. 24, 2018.
U.S. Appl. No. 15/676,470, Notice of Allowance, dated Sep. 17, 2018.
U.S. Appl. No. 15/689,374, filed Aug. 29, 2017, Konrardy et al., "Fault Determination With Autonomous Feature Use Monitoring".
U.S. Appl. No. 15/689,437, filed Aug. 29, 2017, Konrardy et al., "Accident Fault Determination for Autonomous Vehicles".
U.S. Appl. No. 15/806,784, filed Nov. 8, 2017, Konrardy et al., "Accident Risk Model Determination Using Autonomous Vehicle Operating Data".
U.S. Appl. No. 15/806,784, Nonfinal Office Action, dated Oct. 4, 2018.
U.S. Appl. No. 15/806,789, filed Nov. 8, 2017, Konrardy et al., "Autonomous Vehicle Technology Effectiveness Determination for Insurance Pricing".
U.S. Appl. No. 15/808,548, Nonfinal Office Action, dated Dec. 14, 2017.
U.S. Appl. No. 15/808,548, Notice of Allowance, dated Mar. 20, 2018.
U.S. Appl. No. 15/808,974, filed Nov. 10, 2017, Fields et al., "Vehicular Warnings Based Upon Pedestrian or Cyclist Presence".
U.S. Appl. No. 15/808,974, Nonfinal Office Action, dated Feb. 8, 2018.
U.S. Appl. No. 15/808,974, Notice of Allowance, dated Jul. 5, 2018.
U.S. Appl. No. 15/859,854, Notice of Allowance, dated Mar. 28, 2018.
U.S. Appl. No. 15/869,736, Fields et al., "Vehicle Operator Emotion Management System and Method", filed Jan. 12, 2018.
U.S. Appl. No. 15/869,777, Fields et al., "Autonomous Vehicle Software Version Assessment", filed Jan. 12, 2018.
U.S. Appl. No. 15/869,777, Nonfinal Office Action, dated Nov. 2, 2018.
U.S. Appl. No. 15/895,533, "Autonomous Vehicle Automatic Parking", filed Feb. 13, 2018.
U.S. Appl. No. 15/895,533, Nonfinal Office Action, dated Oct. 19, 2018.
U.S. Appl. No. 15/902,354, Nonfinal Office Action, dated Jun. 4, 2018.
U.S. Appl. No. 15/907,380, filed Feb. 28, 2018, Konrardy et al., "Accident Fault Determination for Autonomous Vehicles.".
U.S. Appl. No. 15/907,380, "Accident Fault Determination for Autonomous Vehicles", filed Feb. 28, 2018.
U.S. Appl. No. 15/907,380, Nonfinal Office Action, dated Sep. 27, 2018.
U.S. Appl. No. 15/908,060, Konrardy et al., "Autonomous Vehicle Application", filed Feb. 28, 2018.
U.S. Appl. No. 15/908,060, Nonfinal Office Action, dated Apr. 6, 2018.
U.S. Appl. No. 15/908,060, Notice of Allowance, dated Jul. 17, 2018.
U.S. Appl. No. 15/935,556, "Autonomous Vehicle Accident and Emergency Response" filed Mar. 26, 2018.
U.S. Appl. No. 15/958,134, filed Apr. 20, 2018, Konrardy et al., "Autonomous Vehicle Insurance Pricing".
U.S. Appl. No. 15/964,971, Nonfinal Office Action, dated Jun. 5, 2018.
U.S. Appl. No. 15/976,971, filed May 11, 2018, Konrardy et al., "Accident Response Using Autonomous Vehicle Monitoring."
U.S. Appl. No. 15/976,990, filed May 11, 2018, Konrardy et al., "Autonomous Vehicle Refueling.".
U.S. Appl. No. 15/995,183, filed Jun. 1, 2018, Fields et al., "Vehicular Traffic Alerts for Avoidance of Abnormal Traffic Conditions".
U.S. Appl. No. 15/995,183, Nonfinal Office Action, dated Sep. 5, 2018.
U.S. Appl. No. 15/995,191, filed Jun. 1, 2018, Fields et al., "Shared Vehicle Usage, Monitoring and Feedback".
U.S. Appl. No. 15/995,191, Nonfinal Office Action, dated Jul. 23, 2018.
U.S. Appl. No. 13/844,090, Fields et al., filed Mar. 15, 2013.
U.S. Appl. No. 13/844,090, Nonfinal Office Action, dated Dec. 4, 2013.
U.S. Appl. No. 13/844,090, Notice of Allowance, dated Jul. 8, 2014.
U.S. Appl. No. 13/897,650, "Risk Evaluation Based on Vehicle Operator Behavior", filed Sep. 18, 2014.
U.S. Appl. No. 14/201,491, Fields et al., filed Mar. 7, 2014.
U.S. Appl. No. 14/201,491, Final Office Action, dated Jan. 16, 2015.
U.S. Appl. No. 14/201,491, Final Office Action, dated Sep. 11, 2015.
U.S. Appl. No. 14/201,491, Nonfinal Office Action, dated Apr. 29, 2015.
U.S. Appl. No. 14/201,491, Nonfinal Office Action, dated Sep. 26, 2014.
U.S. Appl. No. 14/255,934, Fields et al., filed Apr. 17, 2014.
U.S. Appl. No. 14/255,934, Final Office Action, dated Sep. 23, 2014.
U.S. Appl. No. 14/255,934, Nonfinal Office Action, dated Jan. 15, 2015.
U.S. Appl. No. 14/255,934, Nonfinal Office Action, dated Jun. 18, 2014.
U.S. Appl. No. 14/255,934, Notice of Allowance, dated Apr. 28, 2015.
U.S. Appl. No. 14/269,490, Advisory Action, dated Apr. 1, 2015.
U.S. Appl. No. 14/469,490, Riley et al., filed May 5, 2014.
U.S. Appl. No. 14/511,712, Fields et al., filed Oct. 10, 2014.
U.S. Appl. No. 14/511,712, Final Office Action, dated Jun. 25, 2015.
U.S. Appl. No. 14/511,712, Notice of Allowance, dated Oct. 22, 2015.
U.S. Appl. No. 14/511,750, Fields et al., filed Oct. 10, 2014.
U.S. Appl. No. 14/511,750, Final Office Action, dated Jun. 30, 2015.
U.S. Appl. No. 14/511,750, Nonfinal Office Action, dated Dec. 19, 2014.
U.S. Appl. No. 14/511,750, Nonfinal Office Action, dated Nov. 3, 2015.
U.S. Appl. No. 14/511,750, Notice of Allowance, dated Mar. 4, 2016.
U.S. Appl. No. 14/592,265, "Risk Evaluation Based on Vehicle Operator Behavior", filed Jan. 8, 2015.
U.S. Appl. No. 14/592,265, Final Office Action, dated May 18, 2015.
U.S. Appl. No. 14/592,265, Final Office Action, dated Oct. 5, 2017.
U.S. Appl. No. 14/592,265, Nonfinal Office Action, dated Sep. 30, 2015.
U.S. Appl. No. 14/592,265, Nonfinal Office Action, dated Feb. 6, 2015.
U.S. Appl. No. 14/592,265, Nonfinal Office Action, dated Jun. 6, 2017.
U.S. Appl. No. 14/592,277, "Risk Evaluation Based on Vehicle Operator Behavior", filed Jan. 8, 2015.
U.S. Appl. No. 14/592,277, Final Office Action, dated Aug. 25, 2017.
U.S. Appl. No. 14/592,277, Final Office Action, dated Dec. 22, 2015.
U.S. Appl. No. 14/592,277, Final Office Action, dated May 15, 2015.
U.S. Appl. No. 14/592,277, Nonfinal Office Action, dated Apr. 13, 2017.
U.S. Appl. No. 14/592,277, Nonfinal Office Action, dated Feb. 6, 2015.
U.S. Appl. No. 14/592,277, Nonfinal Office Action, dated Sep. 1, 2015.
U.S. Appl. No. 14/729,290, Fields et al., filed Jun. 3, 2015.
U.S. Appl. No. 14/729,290, Notice of Allowance, dated Aug. 5, 2015.
U.S. Appl. No. 14/857,242, Fields et al., filed Sep. 17, 2015.
U.S. Appl. No. 14/857,242, Final Office Action, dated Apr. 20, 2016.
U.S. Appl. No. 14/857,242, Nonfinal Office Action, dated Jan. 22, 2016.
U.S. Appl. No. 14/857,242, Notice of Allowance, dated Jul. 1, 2016.

(56) References Cited

OTHER PUBLICATIONS

U.S. Appl. No. 15/005,300, Riley et al., filed Jan. 25, 2016.
U.S. Appl. No. 15/005,498, Fields et al., filed Jan. 25, 2016.
U.S. Appl. No. 15/005,498, Nonfinal Office Action, dated Mar. 31, 2016.
U.S. Appl. No. 15/005,498, Notice of Allowance, dated Aug. 2, 2016.
U.S. Appl. No. 15/076,142, Fields et al., filed Mar. 21, 2016.
U.S. Appl. No. 15/076,142, Nonfinal Office Action dated Aug. 9, 2016.
U.S. Appl. No. 15/076,142, Notice of Allowance, dated Sep. 19, 2016.
U.S. Appl. No. 15/229,926, Fields et al., filed Aug. 5, 2016.
U.S. Appl. No. 15/229,926, Notice of Allowance, dated Nov. 1, 2017.
U.S. Appl. No. 15/255,538, Fields et al., filed Sep. 2, 2016.
U.S. Appl. No. 15/285,001, Fields et al., filed Oct. 4, 2016.
U.S. Appl. No. 15/511,750, Final Office Action, dated Jun. 30, 2015.
U.S. Appl. No. 15/511,750, Nonfinal Office Action, dated Nov. 3, 2015.
U.S. Appl. No. 15/511,750, Notice of Allowance, dated Mar. 4, 2016.
U.S. Appl. No. 15/600,125, Fields et al., filed May 19, 2017.
U.S. Appl. No. 15/869,516, Nonfinal Office Action, dated Sep. 6, 2018.
UTC Spotlight: Superstorm Sandy LiDAR Damage Assessment to Change Disaster Recovery, Feb. 2013.
Vasudevan et al., Safe semi-autonomous control with enhanced driver modeling, 2012 American Control Conference, Fairmont Queen Elizabeth, Montreal, Canada (Jun. 27-29, 2012).
Villasenor, Products liability and driverless cars: Issues and guiding principles for legislation, Brookings Center for Technology Innovation, 25 pages (Apr. 2014).
Wang et al., Shader-based sensor simulation for autonomous car testing, 15th International IEEE Conference on Intelligent Transportation Systems, Anchorage, Alaska, pp. 224-229 (Sep. 2012).
Wardzinski, Dynamic risk assessment in autonomous vehicles motion planning, Proceedings of the 2008 1st International Conference on Information Technology, IT 2008, Gdansk, Poland (May 19-21, 2008).

\* cited by examiner

METHODS OF PROVIDING INSURANCE SAVINGS BASED UPON TELEMATICS AND USAGE-BASED INSURANCE

CROSS-REFERENCE TO RELATED APPLICATIONS

This claims the benefit of U.S. Provisional Application No. 62/027,021 (filed Jul. 21, 2014); U.S. Provisional Application No. 62/040,735 (filed Aug. 22, 2014); U.S. Provisional Application No. 62/145,022 (filed Apr. 9, 2015); U.S. Provisional Application No. 62/145,024 (filed Apr. 9, 2015); U.S. Provisional Application No. 62/145,027 (filed Apr. 9, 2015); U.S. Provisional Application No. 62/145,028 (filed Apr. 9, 2015); U.S. Provisional Application No. 62/145,029 (filed Apr. 9, 2015); U.S. Provisional Application No. 62/145,145 (filed Apr. 9, 2015); U.S. Provisional Application No. 62/145,228 (filed Apr. 9, 2015); U.S. Provisional Application No. 62/145,232 (filed Apr. 9, 2015); U.S. Provisional Application No. 62/145,234 (filed Apr. 9, 2015); U.S. Provisional Application No. 62/145,032 (filed Apr. 9, 2015); and U.S. Provisional Application No. 62/145,033 (filed Apr. 9, 2015). The entirety of each of the foregoing provisional applications is incorporated by reference herein.

Additionally, the present application is related to co-pending U.S. patent application Ser. No. 14/798,741 (filed Jul. 14, 2015); co-pending U.S. patent application Ser. No. 14/798,750 (filed Jul. 14, 2015); co-pending U.S. patent application Ser. No. 14/798,757 (filed Jul. 14, 2015); co-pending U.S. patent application Ser. No. 14/798,763 (filed Jul. 14, 2015); co-pending U.S. patent application Ser. No. 14/798,609 (filed Jul. 14, 2015); co-pending U.S. patent application Ser. No. 14/798,615 (filed Jul. 14, 2015); co-pending U.S. patent application Ser. No. 14/798,745 (filed Jul. 14, 2015); co-pending U.S. patent application Ser. No. 14/798,633 (filed Jul. 14, 2015); co-pending U.S. patent application Ser. No. 14/798,769 (filed Jul. 14, 2015); and co-pending U.S. patent application Ser. No. 14/798,770 (filed Jul. 14, 2015).

FIELD

The present embodiments relate generally to telematics data and/or insurance policies. More particularly, the present embodiments relate to performing certain actions, and/or adjusting insurance policies, based upon telematics and/or other data indicative of risk or insured behavior.

BACKGROUND

Conventional insurance techniques and policies may be subject to inaccuracies due to limited information and/or inadequate risk mitigation or prevention. For example, conventional automobile insurance policies are based upon risk estimates using the age, location, and reported driving history (e.g., reported accidents) of a an insured driver. When such a policy covers multiple drivers (e.g., family members), estimates of risks associated with each driver are used, based upon typical drivers having similar demographic characteristics. Thus, conventional automobile insurance fails to accurately account for different risk levels posed by personal risk preferences and/or driving styles, as well as different risks associated with different usage levels of insured drivers. Conventional insurance techniques may also suffer from the lack of incentivizing the preferred types of behaviors; failure to properly identify risks associated with an individual; inefficient or ineffective customer communications; inadequate or incorrect behavior-based policies; and/or other drawbacks. The present embodiments may overcome these and/or other deficiencies.

BRIEF SUMMARY

The present embodiments disclose systems and methods that may relate to the intersection of telematics and insurance. In some embodiments, for example, telematics and/or other data may be gathered and used to determine risks associated with an insured vehicle or person. The data may be gathered from one or more sources, such as mobile devices (e.g., smart phones, smart glasses, smart watches, smart wearable devices, smart contact lenses, and/or other devices capable of wireless communication); smart vehicles; smart vehicle or smart home mounted sensors; third party sensors or sources of data (e.g., other vehicles, public transportation systems, government entities, and/or the Internet); and/or other sources of information. The data may further be collected or gathered from other vehicles (either directly or indirectly through vehicle-to-vehicle communication), infrastructure components, and/or other road side equipment. Insurance claims, policies, premiums, rates, discounts, rewards, deductibles, limits, and/or programs may then be adjusted based upon the risks determined from the telematics and/or other collected data. The determined risks may be applied to automobile insurance and/or other types of insurance. In some embodiments, the data may be received, risks determined, and/or insurance policies adjusted at a remote server.

In accordance with the described embodiments, the disclosure herein generally addresses systems, methods, and computer-readable media for using anonymous driver data to adjust driving risk. The system, method, or media may include (1) collecting anonymous driver data associated with driving behavior of a plurality of drivers; (2) collecting insured driving behavior data associated with the driving behavior of an insured driver; (3) determining a driving risk score associated with the insured driver by comparing the anonymous driver data with the insured driving behavior data; (4) determining an adjustment to an insurance policy associated with the insured driver based upon the determined driving risk score; and/or (5) causing the adjustment to the insurance policy to be implemented.

The anonymous driver data may indicate anonymous driver behavior associated with one or more road segments. The insured driving behavior data may be associated with the one or more road segments and/or may include telematics data generated by one or more sensors. The one or more road segments may include one or more of the following: a specific road, a specific section of a road, and/or an intersection. In some aspects, comparing the anonymous driver data with the insured driving behavior data may include comparing one or more of the following associated with the one or more road segments for anonymous drivers and the insured driver: vehicle speed, vehicle braking, vehicle acceleration, vehicle turning, vehicle position in a lane, vehicle distance from other vehicles, use of safety equipment, and/or driver alertness.

In accordance with the described embodiments, the disclosure herein also generally addresses systems, methods, and computer-readable media for generating, adjusting, or updating an insurance policy using telematics data. The system, method, or media may include (1) collecting telematics data associated with driving behavior of an insured driver from one or more sensors; (2) determining one or more driving risk scores associated with the insured driver based upon the collected telematics data; (3) determining a risk aversion score associated with the insured driver based upon the one or more driving risk scores; (4) determining an adjustment to an insurance policy associated with the insured driver based upon the determined risk aversion score; and/or (5) causing the adjustment to the insurance policy to be implemented. In some aspects, the system, method, or media may further include transmitting information regarding the adjustment to the insurance policy to one or more insurance customers associated with the insurance policy for review and/or receiving a confirmation of the adjustment to the insurance policy from at least one of the one or more insurance customers.

The insurance policy may be an automobile insurance policy or another type of insurance policy, such as a life insurance policy, a health insurance policy, a disability insurance policy, an accident insurance policy, a homeowners insurance policy, a renters insurance policy, and/or an excess liability insurance policy.

Determining the one or more driving risk scores may include analyzing the collected telematics data to determine one or more of the following usage characteristics: (i) driving characteristics associated with the driving behavior of the insured driver (which may include one or more of the following: vehicle speed, vehicle braking, vehicle acceleration, vehicle turning, vehicle position in a lane, vehicle distance from other vehicles, use of safety equipment, and/or insured driver alertness), and/or (ii) driving environments associated with the driving behavior of the insured driver (which may include one or more of the following: geographic location, time of day, type of road, weather conditions, traffic conditions, construction conditions, route traveled, and/or a daily commute of the insured driver to and from a workplace). Determining the one or more driving risk scores may further include determining the one or more driving risk scores based upon the determined usage characteristics.

Additionally, or alternatively, the one or more driving risk scores may be determined based, at least in part, upon one or more of the following: biometric data associated with the insured driver, the identity and usage of an insured vehicle by one or more drivers, a location an insured vehicle is parked, an amount of time the insured vehicle is garaged, and/or vehicle maintenance records. The identity and usage of an insured vehicle by one or more drivers may be determined based upon determined identities of one or more drivers of one or more insured vehicles and/or usage characteristics of the one or more drivers associated with the one or more insured vehicles, which may include one or more of the following: (i) an amount that each of the one or more drivers uses each of the one or more insured vehicles, (ii) driving behavior characteristics of each of the one or more drivers with respect to each of the one or more insured vehicles, and/or (iii) the vehicle environments in which each of the one or more drivers operates the one or more insured vehicles.

In accordance with the described embodiments, the disclosure herein also generally addresses systems, methods, and computer-readable media for updating, adjusting, or generating an insurance policy associated with one or more insured vehicles based upon vehicle usage. The system, method, or media may include (1) collecting telematics data from one or more sensors associated with the one or more insured vehicles during one or more vehicle trips; (2) determining the identity of one or more drivers during each vehicle trip by analyzing the telematics data; (3) determining a summary of vehicle usage for the one or more insured vehicles over a plurality of vehicle trips; (4) determining an adjustment to the insurance policy based upon the determined summary of vehicle usage; and/or (5) causing the adjustment to the insurance policy to be implemented. In some aspects, the system, method, or media may further include transmitting information regarding the adjustment to the insurance policy to one or more insurance customers associated with the insurance policy for review and/or receiving a confirmation of the adjustment to the insurance policy from at least one of the one or more insurance customers.

The telematics data may include sensor data regarding the identity of the driver and driving behavior during each vehicle trip. The summary of vehicle usage may include one or more of the following: (1) an amount that each of the one or more drivers uses each of the one or more insured vehicles, (2) driving behavior characteristics of each of the one or more drivers with respect to each of the one or more insured vehicles, and/or (3) the vehicle environments in which each of the one or more drivers operates the one or more insured vehicles. The vehicle environment of each vehicle trip may include the following: geographic location, time of day, type of road, weather conditions, traffic conditions, construction conditions, and/or route traveled.

In accordance with the described embodiments, the disclosure herein also generally addresses systems, methods, and computer-readable media for providing insurance-based incentives or recommendations for vehicle insurance. The system, method, or media may include (1) collecting telematics data associated with driving behavior of an insured driver from one or more sensors; (2) analyzing the collected telematics data to determine one or more usage characteristics for the insured driver; (3) determining driving behavior summary for the insured driver based upon the determined usage characteristics; (4) determining one or more risky driving behaviors of the insured driver based upon the driving behavior summary; (5) determining one or more recommendations to the insured driver; and (6) causing the one or more recommendation to be transmitted to a computing device associated with the insured driver. The computing device may be a mobile device and/or a computer system of a vehicle associated with the insured driver.

The one or more recommendations may include one or more actions to be taken by the insured driver in order to reduce one or more risks associated with the determined one or more risky driving behaviors. In some aspects, the system, method, or media may further include determining an estimated cost savings on a vehicle insurance policy associated with the insured driver; and/or causing the estimated cost savings to be transmitted to a computing device associated with the insured driver. The estimated cost savings may be associated with the insured driver taking the one or more recommended actions. In further aspects, the system, method, or media may further include monitoring the driving behavior of the insured driver following transmission of the one or more recommendations; determining that the insured driver has taken some or all of the one or more recommended actions based upon the monitored driving behavior; and/or causing an adjustment to be made to an insurance policy associated with the insured driver based upon the determination that the driver has taken some or all of the one or more recommended actions based upon the monitored driving behavior.

In some aspects, the one or more usage characteristics may be determined based upon (i) driving characteristics associated with the driving behavior of the insured driver, and/or (ii) driving environments associated with the driving behavior of the insured driver. The driving characteristics may include one or more of a vehicle speed, vehicle braking, vehicle acceleration, vehicle turning, vehicle position in a lane, vehicle distance from other vehicles, use of safety equipment, and/or insured driver alertness. The driving environments may include one or more of a geographic location, time of day, type of road, weather conditions, traffic conditions, construction conditions, and/or route traveled. The driving environment may also include a daily commute of the insured driver to and from a workplace.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

The present embodiments may relate to, inter alia, collecting data, including telematics and/or other data. The data may be analyzed by an insurance provider server or processor to provide insurance-related benefits to an insured, and/or apply the insurance-related benefits to an insurance policy or premium of the insured. The insurance-related benefits may include: (1) more accurate cause of accident and/or fault determination; (2) accurate accident or accident scene reconstructions; (3) identifying misstated or inaccurate claims, which may lower individual premiums on the whole for those within a collective group or pool of insurance customers; (4) providing risk or loss mitigation or prevention services; (5) issuing or adjusting behavior or usage-based insurance; (6) insuring people (instead of their belongings per se); (7) insurance pertinent data collection and/or communication techniques; and/or (8) theft protection, mitigation, and/or avoidance.

The insurance-related benefits may further include other products and/or services. An insurance provider may: (9) incentivize low risk or less risky behavior for an insured; (10) provide recommendations that reduce risk and/or result in insurance savings for the insured; (11) provide intelligent vehicle routing in real-time that reduces the risk of a vehicle accident; (12) identify a level of risk or a driving behavior model for an insured based upon an analysis involving anonymous driver data; (13) apply driving behavior or a driving risk score for an insured to other types of insurance (home owners, renters, life, health, etc.); and/or provide other benefits, services, and/or products. The present embodiments may reward an insured for exhibiting risk-averse behavior in the form of lower insurance premiums or rates, or additional insurance discounts, points, and/or rewards.

I. Exemplary Telematics Data System

Figure 1:
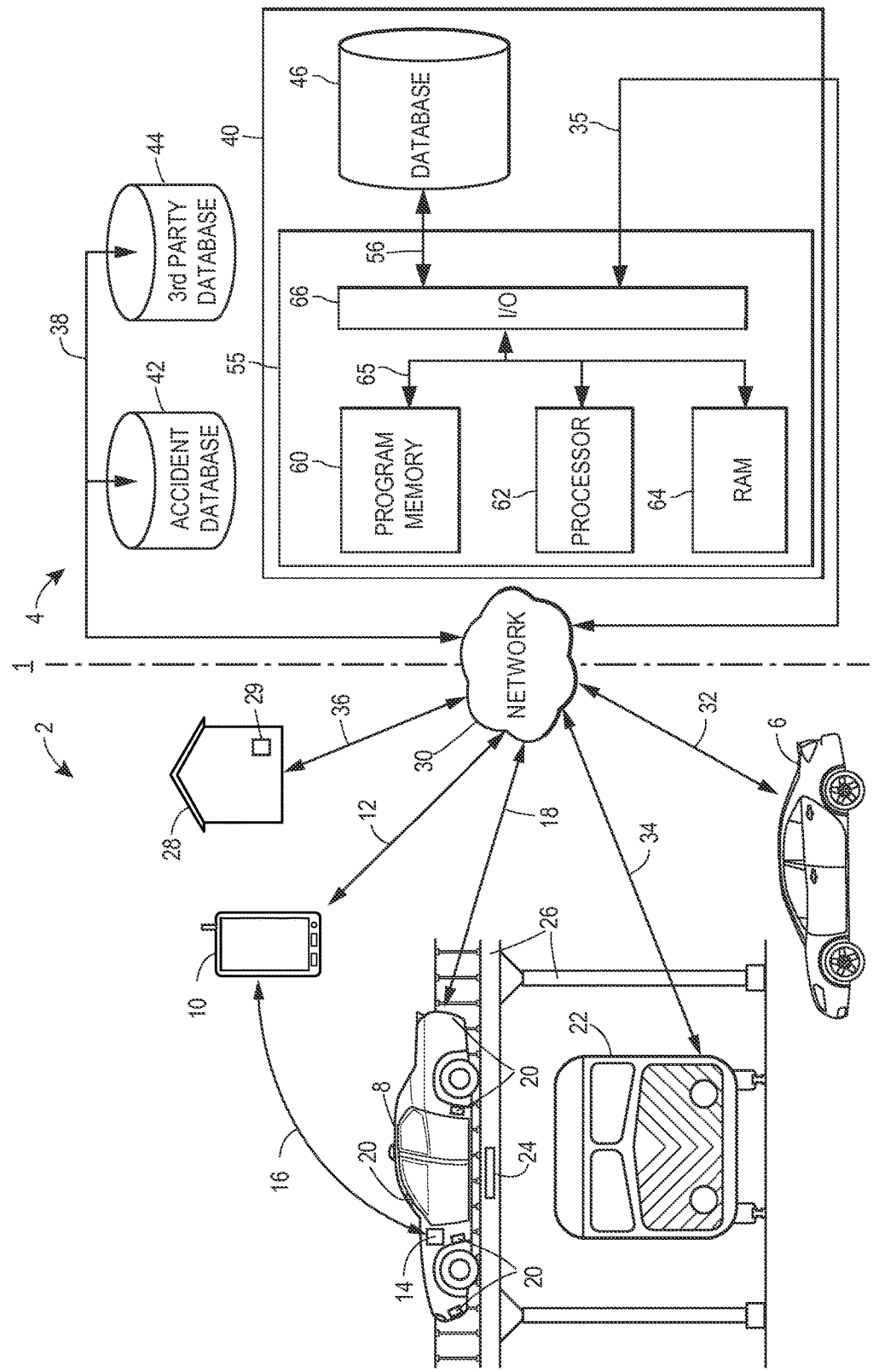
FIG. 1 illustrates an exemplary computer system for implementing the methods in accordance with the disclosure herein.

FIG. 1 illustrates a block diagram of an exemplary telematics system 1 on which the exemplary methods described herein may be implemented. The high-level architecture includes both hardware and software applications, as well as various data communications channels for communicating data between the various hardware and software components. The telematics system 1 may be roughly divided into front-end components 2 and back-end components 4.

The front-end components 2 may obtain information regarding a vehicle 8 (e.g., a car, truck, motorcycle, etc.) and/or the surrounding environment. Information regarding the surrounding environment may be obtained by one or more other vehicles 6, public transportation system components 22 (e.g., a train, a bus, a trolley, a ferry, etc.), infrastructure components 26 (e.g., a bridge, a stoplight, a tunnel, a rail crossing, etc.), smart homes 28 having smart home controllers 29, and/or other components communicatively connected to a network 30. Information regarding the vehicle 8 may be obtained by a mobile device 10 (e.g., a smart phone, a tablet computer, a special purpose computing device, etc.) and/or a smart vehicle controller 14 (e.g., an on-board computer, a vehicle diagnostic system, a vehicle control system or sub-system, etc.), which may be communicatively connected to each other and/or the network 30.

In some embodiments, telematics data may be generated by and/or received from sensors 20 associated with the vehicle 8. Such telematics data from the sensors 20 may be received by the mobile device 10 and/or the smart vehicle controller 14, in some embodiments. Other, external sensors 24 (e.g., sensors associated with one or more other vehicles 6, public transportation system components 22, infrastructure components 26, and/or smart homes 28) may provide further data regarding the vehicle 8 and/or its environment, in some embodiments. For example, the external sensors 24 may obtain information pertaining to other transportation components or systems within the environment of the vehicle 8, and/or information pertaining to other aspect so of that environment. The sensors 20 and the external sensors 24 are described further below, according to some embodiments.

In some embodiments, the mobile device 10 and/or the smart vehicle controller 14 may process the sensor data from sensors 20, and/or other of the front-end components 2 may process the sensor data from external sensors 24. The processed data (and/or information derived therefrom) may then be communicated to the back-end components 4 via the network 30. In other embodiments, the front-end components 2 may communicate the raw sensor data from sensors 20 and/or external sensors 24, and/or other telematics data, to the back-end components 4 for processing. In thin-client embodiments, for example, the mobile device 10 and/or the smart vehicle controller 14 may act as a pass-through communication node for communication with the back-end components 4, with minimal or no processing performed by the mobile device 10 and/or the smart vehicle controller 14. In other embodiments, the mobile device 10 and/or the smart vehicle controller 14 may perform substantial processing of received sensor, telematics, or other data. Summary information, processed data, and/or unprocessed data may be communicated to the back-end components 4 via the network 30.

The mobile device 10 may be a general-use personal computer, cellular phone, smart phone, tablet computer, or a dedicated vehicle use monitoring device. In some embodiments, the mobile device 10 may include a wearable device such as a smart watch, smart glasses, wearable smart technology, or a pager. Although only one mobile device 10 is illustrated, it should be understood that a plurality of mobile devices may be used in some embodiments. The smart vehicle controller 14 may be a general-use on-board computer capable of performing many functions relating to vehicle operation, an on-board computer system or subsystem, or a dedicated computer for monitoring vehicle operation and/or generating telematics data. Further, the smart vehicle controller 14 may be installed by the manufacturer of the vehicle 8 or as an aftermarket modification or addition to the vehicle 8. Either or both of the mobile device 10 and the smart vehicle controller 14 may communicate with the network 30 over link 12 and link 18, respectively. Additionally, the mobile device 10 and smart vehicle controller 14 may communicate with one another directly over link 16. In some embodiments, the mobile device 10 and/or the smart vehicle controller 14 may communicate with other of the front-end components 2, such as the vehicles 6, public transit system components 22, infrastructure components 26, and/or smart homes 28, either directly or indirectly (e.g., via the network 30).

The one or more sensors 20 referenced above may be removably or fixedly disposed within (and/or on the exterior of) the vehicle 8, within the mobile device 10, and/or within the smart vehicle controller 14, for example. The sensors 20 may include any one or more of various different sensor types, such as an ignition sensor, an odometer, a system clock, a speedometer, a tachometer, an accelerometer, a gyroscope, a compass, a geolocation unit (e.g., a GPS unit), a camera and/or video camera, a distance sensor (e.g., radar, LIDAR, etc.), and/or any other sensor or component capable of generating or receiving data regarding the vehicle 8 and/or the environment in which the vehicle 8 is located.

Some of the sensors 20 (e.g., radar, LIDAR, ultrasonic, infrared, or camera units) may actively or passively scan the vehicle environment for objects (e.g., other vehicles, buildings, pedestrians, etc.), traffic control elements (e.g., lane markings, signs, signals, etc.), external conditions (e.g., weather conditions, traffic conditions, road conditions, etc.), and/or other physical characteristics of the environment. Other sensors of sensors 20 (e.g., GPS, accelerometer, or tachometer units) may provide operational and/or other data for determining the location and/or movement of the vehicle 8. Still other sensors of sensors 20 may be directed to the interior or passenger compartment of the vehicle 8, such as cameras, microphones, pressure sensors, thermometers, or similar sensors to monitor the vehicle operator and/or passengers within the vehicle 8.

The external sensors 24 may be disposed on or within other devices or components within the vehicle's environment (e.g., other vehicles 6, infrastructure components 26, etc.), and may include any of the types of sensors listed above. For example, the external sensors 24 may include sensors that are the same as or similar to sensors 20, but disposed on or within some of the vehicles 6 rather than the vehicle 8.

To send and receive information, each of the sensors 20 and/or external sensors 24 may include a transmitter and/or a receiver designed to operate according to predetermined specifications, such as the dedicated short-range communication (DSRC) channel, wireless telephony, Wi-Fi, or other existing or later-developed communications protocols. As used herein, the terms "sensor" or "sensors" may refer to the sensors 20 and/or external sensors 24.

The other vehicles 6, public transportation system components 22, infrastructure components 26, and/or smart homes 28 may be referred to herein as "external" data sources. The other vehicles 6 may include any other vehicles, including smart vehicles, vehicles with telematics-capable mobile devices, autonomous vehicles, and/or other vehicles communicatively connected to the network 30 via links 32.

The public transportation system components 22 may include bus, train, ferry, ship, airline, and/or other public transportation system components. Such components may include vehicles, tracks, switches, access points (e.g., turnstiles, entry gates, ticket counters, etc.), and/or payment locations (e.g., ticket windows, fare card vending machines, electronic payment devices operated by conductors or passengers, etc.), for example. The public transportation system components 22 may further be communicatively connected to the network 30 via a link 34, in some embodiments.

The infrastructure components 26 may include smart infrastructure or devices (e.g., sensors, transmitters, etc.) disposed within or communicatively connected to transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. In some embodiments, the infrastructure components 26 may be communicatively connected to the network 30 via a link (not shown in FIG. 1).

The smart homes 28 may include dwellings or other buildings that generate or collect data regarding their condition, occupancy, proximity to a mobile device 10 or vehicle 8, and/or other information. The smart homes 28 may include smart home controllers 29 that monitor the local environment of the smart home, which may include sensors (e.g., smoke detectors, radon detectors, door sensors, window sensors, motion sensors, cameras, etc.). In some embodiments, the smart home controller 29 may include or be communicatively connected to a security system controller for monitoring access and activity within the environment. The smart home 28 may further be communicatively connected to the network 30 via a link 36, in some embodiments.

The external data sources may collect data regarding the vehicle 8, a vehicle operator, a user of an insurance program, and/or an insured of an insurance policy. Additionally, or alternatively, the other vehicles 6, the public transportation system components 22, the infrastructure components 26, and/or the smart homes 28 may collect such data, and provide that data to the mobile device 10 and/or the smart vehicle controller 14 via links not shown in FIG. 1.

In some embodiments, the front-end components 2 communicate with the back-end components 4 via the network 30. The network 30 may include a proprietary network, a secure public internet, a virtual private network and/or one or more other types of networks, such as dedicated access lines, plain ordinary telephone lines, satellite links, cellular data networks, or combinations thereof. In embodiments where the network 30 comprises the Internet, data communications may take place over the network 30 via an Internet communication protocol.

The back-end components 4 may use a remote server 40 to receive data from the front-end components 2, determine characteristics of vehicle use, determine risk levels, modify insurance policies, and/or perform other processing functions in accordance with any of the methods described herein. In some embodiments, the server 40 may be associated with an insurance provider, either directly or indirectly. The server 40 may include one or more computer processors adapted and configured to execute various software applications and components of the telematics system 1.

The server 40 may further include a database 46, which may be adapted to store data related to the operation of the vehicle 8 and/or other information. As used herein, the term "database" may refer to a single database or other structured data storage, or to a collection of two or more different databases or structured data storage components. Additionally, the server 40 may be communicatively coupled via the network 30 to one or more data sources, which may include an accident database 42 and/or a third party database 44. The accident database 42 and/or third party database 44 may be communicatively connected to the network via a communication link 38. The accident database 42 and/or the third party database 44 may be operated or maintained by third parties, such as commercial vendors, governmental entities, industry associations, nonprofit organizations, or others.

The data stored in the database 46 might include, for example, dates and times of vehicle use, duration of vehicle use, speed of the vehicle 8, RPM or other tachometer readings of the vehicle 8, lateral and longitudinal acceleration of the vehicle 8, incidents or near-collisions of the vehicle 8, communications between the vehicle 8 and external sources (e.g., other vehicles 6, public transportation system components 22, infrastructure components 26, smart homes 28, and/or external information sources communicating through the network 30), environmental conditions of vehicle operation (e.g., weather, traffic, road condition, etc.), errors or failures of vehicle features, and/or other data relating to use of the vehicle 8 and/or the vehicle operator. Prior to storage in the database 46, some of the data may have been uploaded to the server 40 via the network 30 from the mobile device 10 and/or the smart vehicle controller 14. Additionally, or alternatively, some of the data may have been obtained from additional or external data sources via the network 30. Additionally, or alternatively, some of the data may have been generated by the server 40. The server 40 may store data in the database 46 and/or may access data stored in the database 46 when executing various functions and tasks associated with the methods described herein.

The server 40 may include a controller 55 that is operatively connected to the database 46 via a link 56. It should be noted that, while not shown in FIG. 1, one or more additional databases may be linked to the controller 55 in a known manner. For example, separate databases may be used for sensor data, vehicle insurance policy information, and vehicle use information. The controller 55 may include a program memory 60, a processor 62 (which may be called a microcontroller or a microprocessor), a random-access memory (RAM) 64, and an input/output (I/O) circuit 66, all of which may be interconnected via an address/data bus 65. It should be appreciated that although only one microprocessor 62 is shown, the controller 55 may include multiple microprocessors 62. Similarly, the memory of the controller 55 may include multiple RAMs 64 and multiple program memories 60. Although the I/O circuit 66 is shown as a single block, it should be appreciated that the I/O circuit 66 may include a number of different types of I/O circuits. The RAM 64 and program memories 60 may be implemented as semiconductor memories, magnetically readable memories, or optically readable memories, for example. The controller 55 may also be operatively connected to the network 30 via a link 35.

The server 40 may further include a number of software applications stored in a program memory 60. The various software applications on the server 40 may include specific programs, routines, or scripts for performing processing functions associated with the methods described herein. Additionally, or alternatively, the various software application on the server 40 may include general-purpose software applications for data processing, database management, data analysis, network communication, web server operation, or other functions described herein or typically performed by a server. The various software applications may be executed on the same computer processor or on different computer processors. Additionally, or alternatively, the software applications may interact with various hardware modules that may be installed within or connected to the server 40. Such modules may implement part of all of the various exemplary methods discussed herein or other related embodiments.

In some embodiments, the server 40 may be a remote server associated with or operated by or on behalf of an insurance provider. The server 40 may be configured to receive, collect, and/or analyze telematics and/or other data in accordance with any of the methods described herein. The server 40 may be configured for one-way or two-way wired or wireless communication via the network 30 with a number of telematics and/or other data sources, including the accident database 42, the third party database 44, the database 46 and/or the front-end components 2. For example, the server 40 may be in wireless communication with mobile device 10; insured smart vehicles 8; smart vehicles of other motorists 6; smart homes 28; present or past accident database 42; third party database 44 operated by one or more government entities and/or others; public transportation system components 22 and/or databases associated therewith; smart infrastructure components 26; and/or the Internet. The server 40 may be in wired or wireless communications with other sources of data, including those discussed elsewhere herein.

Although the telematics system 1 is shown in FIG. 1 to include one vehicle 8, one mobile device 10, one smart vehicle controller 14, one other vehicle 6, one public transportation system component 22, one infrastructure component 26, one smart home 28, and one server 40, it should be understood that different numbers of each may be utilized. For example, the system 1 may include a plurality of servers 40 and hundreds or thousands of mobile devices 10 and/or smart vehicle controllers 14, all of which may be interconnected via the network 30. Furthermore, the database storage or processing performed by the server 40 may be distributed among a plurality of servers in an arrangement known as "cloud computing." This configuration may provide various advantages, such as enabling near real-time uploads and downloads of information as well as periodic uploads and downloads of information. This may in turn support a thin-client embodiment of the mobile device 10 or smart vehicle controller 14 discussed herein.

Figure 2:
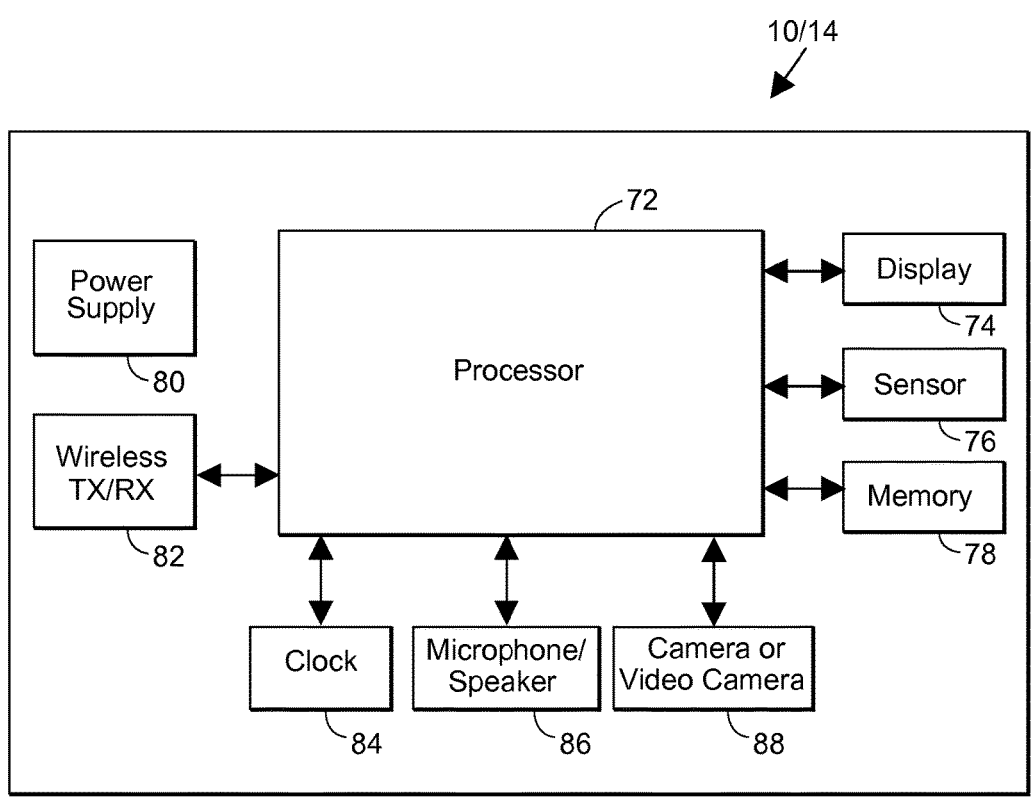
FIG. 2 illustrates an exemplary mobile device and/or smart vehicle controller.

FIG. 2 illustrates a block diagram of an exemplary mobile device 10 and/or smart vehicle controller 14. The mobile device 10 and/or smart vehicle controller 14 may include a processor 72, display 74, sensor 76, memory 78, power supply 80, wireless radio frequency transceiver 82, clock 84, microphone and/or speaker 86, and/or camera or video camera 88. In other embodiments, the mobile device and/or smart vehicle controller may include additional, fewer, and/or alternate components.

The sensor 76 may be able to record audio or visual information. If FIG. 2 corresponds to the mobile device 10, for example, the sensor 76 may be a camera integrated within the mobile device 10. The sensor 76 may alternatively be configured to sense speed, acceleration, directional, fluid, water, moisture, temperature, fire, smoke, wind, rain, snow, hail, motion, and/or other type of condition or parameter, and/or may include a gyro, compass, accelerometer, or any other type of sensor described herein (e.g., any of the sensors 20 described above in connection with FIG. 1). Generally, the sensor 76 may be any type of sensor that is currently existing or hereafter developed and is capable of providing information regarding the vehicle 8, the environment of the vehicle 8, and/or a person.

The memory 78 may include software applications that control the mobile device 10 and/or smart vehicle controller 14, and/or control the display 74 configured for accepting user input. The memory 78 may include instructions for controlling or directing the operation of vehicle equipment that may prevent, detect, and/or mitigate vehicle damage. The memory 78 may further include instructions for controlling a wireless or wired network of a smart vehicle, and/or interacting with mobile device 10 and remote server 40 (e.g., via the network 30).

The power supply 80 may be a battery or dedicated energy generator that powers the mobile device 10 and/or smart vehicle controller 14. The power supply 80 may harvest energy from the vehicle environment and be partially or completely energy self-sufficient, for example.

The transceiver 82 may be configured for wireless communication with sensors 20 located about the vehicle 8, other vehicles 6, other mobile devices similar to mobile device 10, and/or other smart vehicle controllers similar to smart vehicle controller 14. Additionally, or alternatively, the transceiver 82 may be configured for wireless communication with the server 40, which may be remotely located at an insurance provider location.

The clock 84 may be used to time-stamp the date and time that information is gathered or sensed by various sensors. For example, the clock 84 may record the time and date that photographs are taken by the camera 88, video is captured by the camera 88, and/or other data is received by the mobile device 10 and/or smart vehicle controller 14.

The microphone and speaker 86 may be configured for recognizing voice or audio input and/or commands. The clock 84 may record the time and date that various sounds are collected by the microphone and speaker 86, such as sounds of windows breaking, air bags deploying, tires skidding, conversations or voices of passengers, music within the vehicle 8, rain or wind noise, and/or other sound heard within or outside of the vehicle 8.

The present embodiments may be implemented without changes or extensions to existing communications standards. The smart vehicle controller 14 may also include a relay, node, access point, Wi-Fi AP (Access Point), local node, pico-node, relay node, and/or the mobile device 10 may be capable of RF (Radio Frequency) communication, for example. The mobile device 10 and/or smart vehicle controller 14 may include Wi-Fi, Bluetooth, GSM (Global System for Mobile communications), LTE (Long Term Evolution), CDMA (Code Division Multiple Access), UMTS (Universal Mobile Telecommunications System), and/or other types of components and functionality.

II. Telematics Data

Telematics data, as used herein, may include telematics data, and/or other types of data that have not been conventionally viewed as "telematics data." The telematics data may be generated by, and/or collected or received from, various sources. For example, the data may include, indicate, and/or relate to vehicle (and/or mobile device) speed; acceleration; braking; deceleration; turning; time; GPS (Global Positioning System) or GPS-derived location, speed, acceleration, or braking information; vehicle and/or vehicle equipment operation; external conditions (e.g., road, weather, traffic, and/or construction conditions); other vehicles or drivers in the vicinity of an accident; vehicle-to-vehicle (V2V) communications; vehicle-to-infrastructure communications; and/or image and/or audio information of the vehicle and/or insured driver before, during, and/or after an accident. The data may include other types of data, including those discussed elsewhere herein. The data may be collected via wired or wireless communication.

The data may be generated by mobile devices (smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication.

In some embodiments, the data collected may also derive from police or fire departments, hospitals, and/or emergency responder communications; police reports; municipality information; automated Freedom of Information Act requests; and/or other data collected from government agencies and officials. The data from different sources or feeds may be aggregated.

The data generated may be transmitted, via wired or wireless communication, to a remote server, such as a remote server and/or other processor(s) associated with an insurance provider. The remote server and/or associated processors may build a database of the telematics and/or other data, and/or otherwise store the data collected.

The remote server and/or associated processors may analyze the data collected and then perform certain actions and/or issue tailored communications based upon the data, including the insurance-related actions or communications discussed elsewhere herein. The automatic gathering and collecting of data from several sources by the insurance provider, such as via wired or wireless communication, may lead to expedited insurance-related activity, including the automatic identification of insured events, and/or the automatic or semi-automatic processing or adjusting of insurance claims.

In one embodiment, telematics data may be collected by a mobile device (e.g., smart phone) application. An application that collects telematics data may ask an insured for permission to collect and send data about driver behavior and/or vehicle usage to a remote server associated with an insurance provider. In return, the insurance provider may provide incentives to the insured, such as lower premiums or rates, or discounts. The application for the mobile device may be downloadable off of the internet.

In some embodiments, the telematics and/or other data generated, collected, determined, received, transmitted, analyzed, or otherwise utilized may relate to biometrics. For example, biometrics data may be used by an insurance provider to push wireless communications to a driver or an insured related to health and/or driving warnings or recommendations. In one aspect, a wearable electronics device may monitor various physical conditions of a driver to determine the physical, mental, and/or emotional condition of the driver, which may facilitate identification of a driver that may have a high risk of accident. Wearable electronics devices may monitor, for example, blood pressure or heart rate. Such data may be remotely gathered by an insurance provider remote server 40 for insurance-related purposes, such as for automatically generating wireless communications to the insured and/or policy and premium adjustments.

In some embodiments, the telematics and/or other data may indicate a health status of a driver. If biometrics data indicates that an insured is having a heart attack, for example, a recommendation or warning to stop driving and/or go to a hospital may be issued to the insured via the mobile device 10 or other means, and/or the insurance provider (or mobile device 10 or smart vehicle controller 14) may issue a request for immediate medical assistance.

The biometrics data may indicate the health or status of an insured immediately after an accident has occurred. The biometrics data may be automatically analyzed by the remote server 40 to determine that an ambulance should be sent to the scene of an accident. In the unfortunate situation that a death and/or a cause of death (e.g, severe auto accident) is indicated (from the telematics or other data, or from emergency responder wireless communication), an insurance provider may remotely receive that information at a remote server 40, and/or automatically begin processing a life insurance policy claim for the insured.

III. Risk-Averse Behavior-Based Insurance

The telematics and/or other data gathered may be analyzed for risk-averse or low risk behavior. The behavior may be used to identify low risk driving, living, and/or activities. An insurance provider may analyze actual accident information over a period of time, and/or build or train a data model of low risk behavior and/or characteristics. Comparing behavior or other data of individual insurance customers with the data model may identify low risk individuals.

A. Identifying Driving Behavior from Data Analysis

The telematics and/or other data gathered by an insurance provider remote server (such as server 40) may indicate excellent or good driving behavior. The data may lead to generating a best estimate of driving behavior for an insured. Such information may then be used by the insurance provider to adjust a risk score for the insured and/or associated insurance premiums or rates, and/or discounts, points, or rewards.

The telematics and/or other data may indicate the insured's behavior with respect to vehicle operations, such as the following: braking; speed; acceleration; deceleration; turning; average distance to the next vehicle—whether ahead, behind, or adjacent (i.e., traveling along side in the same direction of traffic); usage of vehicle technology (such as accident avoidance technology); usage of turn signals; usage of wireless communications from remote servers 40 or other vehicles 6 (i.e., vehicle-to-vehicle communication); and/or other driving characteristics. The data may also indicate whether an insured usually drives alone or in a car pool; the typical roads taken during a commute to and from work; time of day information; and/or other insured tendencies, including those discussed elsewhere herein.

The present embodiments may be configured to distinguish between good and bad driving behavior in order to not penalize good driving behavior. For example, the telematics and/or other data may involve both braking data and visual information, such as video from a dash camera. A hard braking event indicated from braking or speed information associated with vehicle deceleration may be verified as not being the fault of the driver, but rather indicative of responsible driving. Video from a dash camera may reveal that the hard braking event was caused by another vehicle, pedestrian, or child unexpectedly moving or jumping in front of the vehicle's path, and/or a traffic signal rapidly changing color. Alternatively, the video may indicate that the driver was following the vehicle ahead too closely. Also, an indicated sleeping event associated with gripping a steering wheel too tightly may be cancelled (or verified) by analyzing video or other telematics data showing driver alertness.

1. Individual Profile

A driving behavior profile for an insured may be developed based upon the telematics and/or other data. The data collected may indicate the speed at which an insured typically drives; the location(s) where the insured typically drives; the type of vehicle(s) that the insured typically drives; the type of roads or routes that the insured usually takes; the weather conditions that the insured will normally drive in; the time of day that the insured usually drives or drives the most at; the distance at which the insured typically trails other vehicles; whether the insured drives a large percentage of time adjacent to other vehicles traveling in the same direction (such as on a four-lane highway); whether the insured typically drives too slow or too fast in relation to the posted speed limit; and/or other driving characteristics of the insured.

The telematics and/or other data may reveal location information, i.e., where the insured drives. The risk for open road or highway driving may be less than the risk associated with downtown or city driving. Highway driving may indicate that a driver is not driving through a large amount of intersections, and/or typically driving greater distances from other vehicles on the road (i.e., less bumper-to-bumper driving). Driving over a certain speed, such as 45 mph, may also indicate that a driver or insured normally drives on the highway, and thus may have a lower risk of accident.

The data may include time and/or time of day information. The data may include a percentage of time that the vehicle spends on highways (which may be associated with a relatively low risk), and/or a percentage of time that the vehicle spends in parking lots (which may be associated with a relatively high risk). The data may also be used to determine normal traffic conditions associated with an insured, and/or the percentage of time that an insured vehicle is not being driven and/or parked in a public place (such as on the street), but rather is stored or housed inside and/or in a secure location (such as in the garage of the owner). Storing a vehicle inside may prevent theft and/or damage from the environment, such as wind or hail damage.

The telematics and/or other data may include the number of miles that an insured typically drives. More miles driven may indicate more risk, depending upon type of road traveled. The data may also indicate the type, make, or model of a vehicle that is driven by the insured. Certain vehicle types, makes, or models may have superior safety, equipment, or other vehicle ratings.

The data may facilitate driver mood detection in real-time or building an average mood profile for the insured. The mood of a driver or insured may impact driving behavior. Soft or light music may indicate that the driver or insured is relaxed and calm while driving. Conversely, loud music may indicate that the driver or insured is in an aggressive mood. A mobile device or smart vehicle application may detect the songs or type of music usually played on the vehicle sound system or radio, and/or loudness thereof.

2. Family Members

The telematics and/or other data gathered may be associated with a family that has multiple drivers driving a specific vehicle, such as parents and teenagers. The vehicle and/or mobile devices may be able to capture video, images, and/or audio information associated with, and/or of, the driver while driving an insured vehicle. The identification of the specific driver may be made by analysis of the video or images (e.g., via facial recognition software) and/or of audio data (e.g., via voice recognition software). Additionally or alternatively, the data collected from various sources may facilitate driver identification from fingerprints, a recognition of the driver's grip upon a smart steering wheel, and/or the driver's weight (such as from seat pressure sensors).

The telematics and/or other data may alert parents and/or police of risky driving behavior. Young or elderly drivers may exhibit high risk driving behavior, and that may be communicated to the parents, adult children, and/or the insured. On the other hand, telematics data may confirm that a young or elderly driver typically exhibits lower risk driving behavior as compared to those of the same age group. An insured or parent may submit, to an insurance provider, a telematics profile for their teenage driver to demonstrate low risk behavior, and thus obtain associated insurance savings.

Certain telematics devices may require data adjustments based upon movement of the data collection device (e.g., mobile device 10, smart vehicle controller 14, etc.) within the vehicle during data collection. If an insured moves a mobile device 10 during vehicle movement, for example, the data collected may need to be adjusted for a telematics algorithm to use and/or analyze the data. An insurance rating may be based upon the number of times that a mobile device 10 (collecting telematics data) was used, or moved, during driving.

Over or under reporting of vehicle usage by family members may impact risk and rates. For instance, undisclosed drivers may impact risk, such as teenagers driving a higher rated vehicle. The telematics and/or other data may determine which driver is actually driving an insured vehicle and/or how much. The data may also reveal over and/or under reporting of teenage and/or high-risk driver usage of, or miles driving, insured vehicles. Insurance rates may be adjusted to reflect actual, or a more accurate estimate of, vehicle usage by teenage and/or high-risk drivers determined from analysis of the telematics and/or other data. Alternatively, over reporting of teenage and/or high-risk driver usage by risk-averse customers may be similarly determined from analysis of the telematics and/or other data. Thus, telematics and/or other data may be analyzed as discussed herein to provide a technical solution to improve the accuracy of data regarding vehicle usage and/or risks associated therewith.

3. Road Conditions

The telematics and/or other data may reveal the amount of traffic lights and/or intersections that the vehicle and/or insured typically travels through on a daily, weekly, monthly, or other basis. Certain commuters may have mostly highway driving, with minimum stopping along the route from home to work. Such conditions may be associated with lower risk levels because fewer changes to the vehicle's operation need to be safely executed by the driver. Conversely, other commuters may have mainly congested or city driving, with frequent red lights or stop signs at which they must stop on the way to and from work, which may be associated with higher risk levels.

The data may reveal the percentage of time that the vehicle is driven in parking lots or ramps. Parking lot or ramp driving may be associated with a higher than normal risk of collision.

B. Applying Driver Behavior to Other Types of Insurance

The driving behavior may indicate an amount and/or type of risk behavior that the insured usually avoids, or alternatively, engages in. A risk behavior or driving score may be associated with, and/or otherwise attributed to, the insured. Low risk and/or risk-averse driving behavior may be applied to other types of insurance other than auto insurance to provide savings to the insured on premiums or rates associated with the other types of insurance.

An analysis of how well one drives a vehicle (i.e., how responsible a driver the insured is) may be indicative of how responsible and/or risk-averse a home owner the insured is. Also, maintenance records of the vehicle may be gathered. The maintenance records, like the driving behavior, may be indicative of how well an insured takes care of, maintains, and/or fixes their vehicle. This data, in turn, may be reflective of how well that same insured is likely to take care of and maintain their home. A risk factor may be determined from the vehicle or driving data that is subsequently applied to home owner insurance (as well as renters, life, or health insurance) premiums or rates, and/or discounts or rewards.

C. Recommendations & Incentives

An insurance provider may request that an insured permits the insurance provider to collect telematics and/or other data regarding certain behaviors of the insured. The insurance provider may ask the insured to opt into insurance programs that provide insurance related benefits to the insured that reflect low risk and/or risk-averse behavior of the insured and/or family members. From the data collected, the insurance provider may provide specific recommendations and/or incentivize insurance customer (and/or family) behavior. The behavior that is encouraged may benefit both the insured and insurance provider, and/or may reduce the risk associated with the insured and/or family members.

An application on a mobile device 10 (or smart vehicle controller 14) associated with an insured and/or a family member may display an up-to-date driving score for the insured. As the driving score for the insured and/or family member changes, the mobile device may show an amount of a discount and/or a reduced premium that the insured and/or family member has earned, and/or is entitled to receive from the insurance provider based upon lower risk and/or more risk-averse driving behavior.

The insurance provider may indicate that the insured and/or another family member is driving over the speed limit or tailgating too frequently. If the insured and/or other family member drives slower and/or more responsibly, the insurance provider may provide a discount and/or reduced premium on their auto insurance policy and/or other insurance policies.

The insurance provider may provide other insurance-related recommendations and/or incentives unrelated to driving. The insurance provider may monitor workout or fitness center habits of the insured and/or family members with their permission, and/or once they decide to opt into an insurance rewards or points program. For example, a personal activity monitor (e.g., a pedometer) may be used to determine exercise and/or fitness levels for an individual. The insurance provider may provide a discount or reduced premiums on health or life insurance if the insured and/or family members go to the gym and workout more often, and/or exercise a set amount times within a given period, such as a month or year.

Also with the insured's permission, eating habits may be determined from foodography and/or photographs of food or restaurants that the insured shares on social media or the internet. Additionally, or alternatively, the insured's location may be used to determine likely eating habits (e.g., by identifying the insured is located within a restaurant that may be associated with healthy or unhealthy food). If the insured (and/or a family member) is typically eating fast or unhealthy food, the insurance provider may provide a discount on a health or life insurance policy if the insured (and/or family member) agrees to eat healthier food. Also, if it is detected that the insured (and/or family member) is engaging in risky behavior, such as smoking cigarettes, the insurance provider may provide a discount on health or life insurance if the insured (and/or family member) reduces the frequency of that behavior. Again, location information from a mobile device 10 may be used to determine such behavior. For example, frequent five-minute trips to stand outside may be taken as an indication of smoking.

IV. Intelligent Routing

The present embodiments may facilitate generating intelligent routing recommendations and transmitting those to an insured via the mobile device 10 and/or smart vehicle controller 14. The intelligent routing may be based upon vehicle location, route, and/or destination information. The intelligent routing may also be based upon historical data and/or real-time data. The historical and/or real-time data may relate to past or current accidents, weather, traffic, traffic patterns, road conditions, and/or road construction. The intelligent routing functionality, and/or usage (or percentage of usage) thereof, may be used to adjust insurance premiums or rates, and/or discounts.

The intelligent routing may provide directions and/or route guidance to a driver or insured based upon traffic patterns and/or actual accident data. The intelligent routing may also take into consideration current weather, construction, traffic, and/or other current conditions.

The intelligent routing may provide real-time warnings or updates to drivers or insurance customers. The intelligent routing may lead to collision or accident avoidance; more efficient or quicker trips; driving through less traffic or construction; better gas mileage; and/or other benefits.

For instance, short-term or minor road construction projects that may occur with little or no notice may be promptly detected by an insured or the insured's smart vehicle controller 14. The GPS location of the minor road construction project (that may be temporarily shutting down a main traffic route or otherwise slowing down traffic) may be sent from the smart vehicle controller 14 of the insured to the insurance provider remote server 40. The remote server 40 may then estimate routes to divert traffic around the construction project and notify other insurance customers in the area of an alternate recommended route, such as via wireless communication to their mobile devices 10 and/or smart vehicle controllers 14.

The telematics and/or other data may be used to generate messages or alerts transmitted to a mobile device 10 or smart vehicle controller 14. A message may indicate that the driver is entering a danger zone associated with an above average risk. For instance, the area may have a lot of ongoing construction, and/or be associated with a higher than average number of accidents. A message may further indicate a recommendation, such as one or more alternate routes.

In one embodiment, the intelligent routing may utilize vehicle-to-vehicle (V2V) communication. The V2V communication may reveal that the other vehicles 6 ahead of an insured vehicle 8 are all braking, indicating an accident ahead. The V2V communication data may be sent directly from one vehicle 6 to an insured vehicle 8, or alternatively, from one vehicle 8 to a remote telematics or an insurance provider server 40 via the network 30. The remote server 40 may then send a message or warning to the insured or insured vehicle to slow down, or even exit a highway and take an alternate route. Access to the remote server 40 may be granted via a subscription service or as a customer service provided by the insurance provider. In some embodiments, messages may be determined in part based upon preferences or options selected or set by the insured.

V2V communication may include sending a message to a smart vehicle controller 14 or mobile device 10 directing the smart vehicle controller 14 or mobile device 10 to automatically start recording and/or transmitting telematics data. For instance, V2V communication may indicate that an accident has occurred or is likely to happen. In such situations, automatically recording telematics and/or other data may facilitate accident reconstruction and/or cause of accident determination. In some embodiments, the telematics and/or other data may include vehicle-to-infrastructure (V2I) communications.

In some embodiments, if an insured self-reports an accident location (e.g., via automatic wireless communication indicating GPS location information), other insurance customers or drivers may be able to promptly and effectively avoid the accident scene through intelligent routing recommendations. The intelligent routing may not only consider avoidance of the accident scene, but also other driving risk conditions, such as current traffic, construction, and/or weather conditions, to determine an overall lowest risk alternate route to each vehicle's respective destination.

V. Partner Data Collection with Other Functionality

A telematics application may partner with another (non-insurance related) application to increase usage. Telematics or insurance-based application functionality may be combined with another application functionality that is associated with social media websites, and/or virtual map or vehicle navigation services. The non-insurance based functionality may include points-of-interest, friend finder, entertainment event or concert-related, restaurant locator, internet or internet searching, and/or other functionality.

As an example, the non-insurance functionality may present a list of recommended restaurants for an upcoming town when the vehicle is traveling along a highway or on a long trip. The list of recommended restaurants may be read or displayed to the occupants of the vehicle. Additionally, the telematics and/or other data collected may indicate that an insured goes to a specific fitness center routinely. With the insured's permission, targeted ads may be sent to the insured associated with that fitness center and/or shops located nearby. The targeted ads may present local bargains or reduced prices for products and/or services, such as on a mobile device or vehicle display screen.

The non-insurance functionality may also relate to providing other benefits to the insured. For instance, the telematics or insurance-based application functionality may be combined with functionality that directs a driver to a nearest gas station or shopping mall, or to a parking spot. The parking spot, gas station, shopping mall, and/or other places/services recommended may be rated for safety, cost, and/or service. The use of additional or non-insurance functionality for the telematics or insurance-based mobile device applications may incentivize typical insurance customers into using telematics applications and/or usage-based insurance more often.

VI. Anonymous Driver Data

The telematics and/or other data gathered may be used to develop an anonymous or average driver profile or model associated with anonymous driver behavior. The anonymous driver profile may include information regarding typical or average driving behaviors for a specific driving environment and/or type of driving environment. The anonymous driver profile may be generated, developed, and/or determined based upon telematics and/or other data regarding driving behavior of a plurality or group of drivers and/or vehicles. For example, an anonymous driver profile may be determined from telematics data collected from hundreds or thousands of drivers and/or individual trips in an area and/or along a particular portion of a roadway (e.g., a city, a census tract, a parking lot, a block of a street, a highway section, an intersection, an entrance or exit ramp, etc.). The anonymous driver profile may be compared with the insured's driving behavior to analyze and/or determine a risk score for the insured.

For example, the telematics and/or other data gathered may indicate an average speed that the insured normally drives at as compared to typical drivers, and/or average drivers in a given community or geographical area. Anonymous speed data may be gathered that indicates the average speed of anonymous drivers in a given area or on a given stretch of road. The anonymous speed data may also indicate average braking events (e.g., number of braking events, whether such braking is hard or soft, deceleration rate during braking, distance to stop, etc.) or aggressive driving (or lack thereof) for anonymous drivers on a given stretch of road.

When the insured is on the same road as the road for which anonymous or average driver data is collected, data related to their specific vehicle speed and braking may be collected. If the insured's vehicle speed on that road is below the speed indicated for the average driver, it may indicate that the insured typically drives below the speed limit and/or in a low risk manner. Conversely, if the insured's vehicle speed on that road (or stretch of road or location) is above average, that may indicate the insured typically drives in a more risky manner.

If the insured's vehicle braking information indicates that the insured brakes a below average amount, that may be indicative that the insured trails other vehicles at a risk-averse distance, does not tailgate, and/or otherwise drives in a below risk manner. Conversely, if the vehicle braking information indicates that the insured brakes an excessive or above average amount, that may indicate that the insured is typically following other vehicles too closely and/or potentially driving in a manner associated with above average risk.

In one aspect, GPS data from a number of anonymous drivers may be gathered. A database of anonymous driver behavior on certain roads or areas may be built, such as demonstrating the speed and/or braking of the average driver on a specific section of road. Telematics and/or other data, including GPS data, associated with the insured may be collected and compared with the anonymous driver characteristics for specific sections of road. If lower than average risk is identified by the behavior exhibited by the insured (or other driver, such as a family member), the insurance provider may then provide the insured with insurance savings.

VII. Individual-Based Insurance

An insurance provider may determine a rating, risk profile, or risk score for individuals using telematics and/or other data. The vehicles available for use by an individual may impact or influence their personal insurance rate. The telematics and/or other data collected may indicate, or be used to estimate, a percentage of time that an insured or other person operates each vehicle within a household. The telematics and/or other data may be received by a remote server 40 from a mobile device 10, smart vehicle controller 14, and/or other sources described herein.

The telematics and/or other data may indicate, or be used to determine, driver behavior and characteristics for an individual. The type of car driven may impact safety, such as certain types of vehicles may be better or quicker at braking, which may lead to less rear-end collisions. More detailed data regarding vehicle usage and/or driving behavior may be used to determine more accurate risk level assessments associated with individuals, households, businesses, and/or vehicles.

A. Transportation Characteristics

To insure a specific individual, an insurance provider remote server 40 may consider and analyze a number of factors. The insurance provider remote server may develop a "transportation coverage" rating or score for an insured, and/or use telematics and/or other data to monitor or identify transportation characteristics of an individual. The data may be used to score individuals based upon their lifestyle and/or build individual profiles, which may take into consideration information and pictures available on social media and/or the internet.

The transportation coverage or characteristics may include information related to the types of roads and conditions (traffic, construction, weather, etc.) that the insured typically drives. This may allow the insurance provider remote server to estimate an insurance rate for the actual type of miles that the insured is driving, and not simply basing an insurance rate on an amount of generic or average miles driven. For example, a driver who drives fifty miles per week in daylight on infrequently trafficked rural roads may have a substantially lower risk than a driver who drives fifty miles per week during evenings on congested urban streets.

The transportation coverage or characteristics may include information related to the operation of one or more vehicles identified by the remote server 40 based upon analysis of the telematics and/or other data. Analysis of the data may reveal the amount and/or type of other forms of transportation an insured uses. Data collected (such as by the mobile device 10) may reveal that the insured takes a safer mode of transportation a certain percentage of the time. The data may indicate the amount or frequency that the insured takes public transportation, a bus system, a train system, travels via airplane, rides a bicycle, and/or even walks. The data may further be used to determine times and/or places in which generally safer forms of transportation may be particularly dangerous (e.g., bicycling in a business district of a major city during weekday rush hour).

If the insured commonly travels via modes of transportation other than automobile, that may indicate that the person is typically risk-averse. People who are risk-averse may in turn typically have less risk of accident or injury, such as from dangerous activities (e.g., sky diving, scuba diving, and/or skiing). Risk-averse people may also take greater precautions with their property, leading to lower risk levels associated with property theft, damage, and/or destruction.

Telematics and/or other data may monitor a mobile device 10 location and/or speed to determine the transportation tendencies of an individual. From determining that an insured traveled slowly to a known bus stop or train station, and then traveled at typical speed for a bus or train, for example, it may be gleaned by the remote server 40 that the insurance customer walked to a public transportation system component 22, and then traveled via public transportation, as opposed to driving their personal and/or insured vehicle.

With the insured's permission, the insurance provider may develop a transportation-related profile for an insured. The transportation-related profile may include when and where the insured is driving an insured or other vehicle; what type of vehicle the insured typically drives; when the insured is a passenger in another vehicle, such as a bus; a percentage of time that the insured travels during which the insured is not driving a vehicle but using alternate and/or safer modes of transportation; and/or other conditions or factors, including those discussed elsewhere herein.

To insure an individual, in addition to estimating a transportation-related coverage, other variables may be weighted and aggregated. For instance, insurance coverage or scores related to lifestyle, habits, hobbies, activities, health, home, fitness routine, finances, geographic area, marital status, age, sex, family members, education level, and/or other factors may be determined and/or combined.

B. Social Media

If a customer opts in to an insurance discount program, the customer may agree to allow the insurance provider remote server 40 to automatically analyze their pictures and/or comments posted on social media to determine a rating or score for individual-based insurance. For instance, a customer or insured may agree to share social networking information and/or an online profile for insurance-related purposes. In some embodiments, the server 40 may generate automatic messages and/or recommendations tailored for the customer or insured based upon social media content. For example, if a customer posts a message regarding looking for a new car, the server 40 may send a message to the customer (via social media or otherwise) with information regarding safety ratings of various cars.

Social media may reveal, among other things, that an insured lives in a safe neighborhood; typically walks to work; engages in certain recreational activities; exercises routinely; avoids risky activities; is generally in good physical health; and/or otherwise indicates that the insured leads a low risk of accident or injury life style. For example, an insured may frequently post messages on social media indicating fitness-related activities (e.g., marathons, triathlons, fitness classes, workouts, fitness tracker automated posts, etc.) that indicate frequent physical activity likely to result in or indicate good health. As another example, the insured may subscribe to a number of healthy cooking or eating sites, lists, etc., which may similarly indicate healthy behavior indicative of good health.

C. Limiting Distractions

The telematics and/or other data may control the vehicle, or allowable functionality thereof, in certain ways for specific operators/drivers. In one aspect, the data may facilitate automatically starting an insured vehicle 8 for an insured or other driver when their mobile device 10 gets within a certain distance of the vehicle 8, and/or automatically adjusting the vehicle air conditioning or heater to achieve a pre-determined temperature. Such automatic adjustments may limit distractions to the driver, thereby reducing risk levels associated with vehicle operation.

For other drivers that may be prone to distractions, such as beginning or teenage drivers, the data may be used to limit the vehicle functionality that may be used. For instance, a specific driver may be identified by the data, and then they may be prevented from adjusting windows or minors while they are driving or the vehicle is moving. Other types of distractions in the vehicle may also be alleviated. For example, mobile device 10 and/or vehicle entertainment system usage may be prevented or limited while driving, such as by preventing mobile device texting and/or limiting the vehicle radio to a certain volume.

VIII. Umbrella Insurance

The telematics and/or other data may be used for umbrella insurance, such as insurance coverage covering everyone in a household. A risk score or factor for a household and/or a number of family members, instead of an individual, may be generated from the data. The household risk score may make underwriting universal policies (e.g., auto/home/life/health) easier.

In one aspect, ride sharing data may be used. For those that carpool, carpooling with drivers that have demonstrated good driving behavior may be reflected or rewarded by the insurance provider with lower insurance premiums or rates, or discounts. Such discounts or adjustments may reflect the proportion of driving time, distance, trips, etc. that each driver in the car pool drives. Additionally, or alternatively, the discounts or adjustments may reflect the usage of different vehicles.

Vehicle tracking may be performed for a fleet of vehicles. A fleet of drivers for a company may be given a discount based upon their collective driving behavior that is determined from the data collected. Information regarding driving behavior of individuals or groups of drivers may be provided for fleet management and/or other purposes (e.g., verifying safe driving, logs, or routes).

The telematics and/or other data may be used to coach drivers on how to be safer, more efficient, and/or otherwise improve vehicle operation. For example, telematics and/or other data may be provided to drivers to help them achieve better gas mileage. For instance, better driving habits and taking better or more efficient routes may allow the driver to save money on gas. The insurance provider may provide tips and recommendations to the driver and/or insured via their mobile device or vehicle display.

The telematics and/or other data may be used with location services. For instance, data from one or more mobile devices 10 or other sources may be used to determine home occupancy. Vacant homes may be at a greater risk of theft and/or in need of yard work or repairs that are being left unattended to. Unoccupied properties may be subject to a variety of increased risks, from higher risk of theft to higher risks of fire or water damage (partially due to delay in observing and responding to hazardous conditions). For example, an unattended yard may indicate that the house is currently vacant, which in turn may increase the likelihood of a break in. If a home or vacation home is not occupied for 60 days, a message may be sent to the insured and/or insurance provider. The insurance provider may adjust the home owner insurance policy, premium, rate, or discount accordingly if an insured home is left unattended for too long a period.

Telematics and/or other data may be used to determine that a home is unoccupied from an insured vehicle 8 or mobile device 10 travel history (such as a travel history indicating movement to and from a second or vacation home), and/or a present location of the insured vehicle 8 or mobile device 10. Unattended homes may also be determined from a detected lack of use of a smart garage door or other smart doors on the home, and/or a smart home controller 29 of a smart home 28 that is in wireless communication with the insurance provider remote server 40 via the network 30.

Telematics and/or other data may also be used to determine pet behavior. For instance, dogs and/or cats may be timid, tame, or vicious. Images and audio data may be received and automatically analyzed by a remote server 40 to determine or characterize average pet behavior and/or identify overly aggressive animals. Home insurance may be adjusted to reflect an appropriate level of risk, or lack thereof, associated with the home owner's pet(s).

IX. Exemplary Use of Anonymous Data

Figure 3:
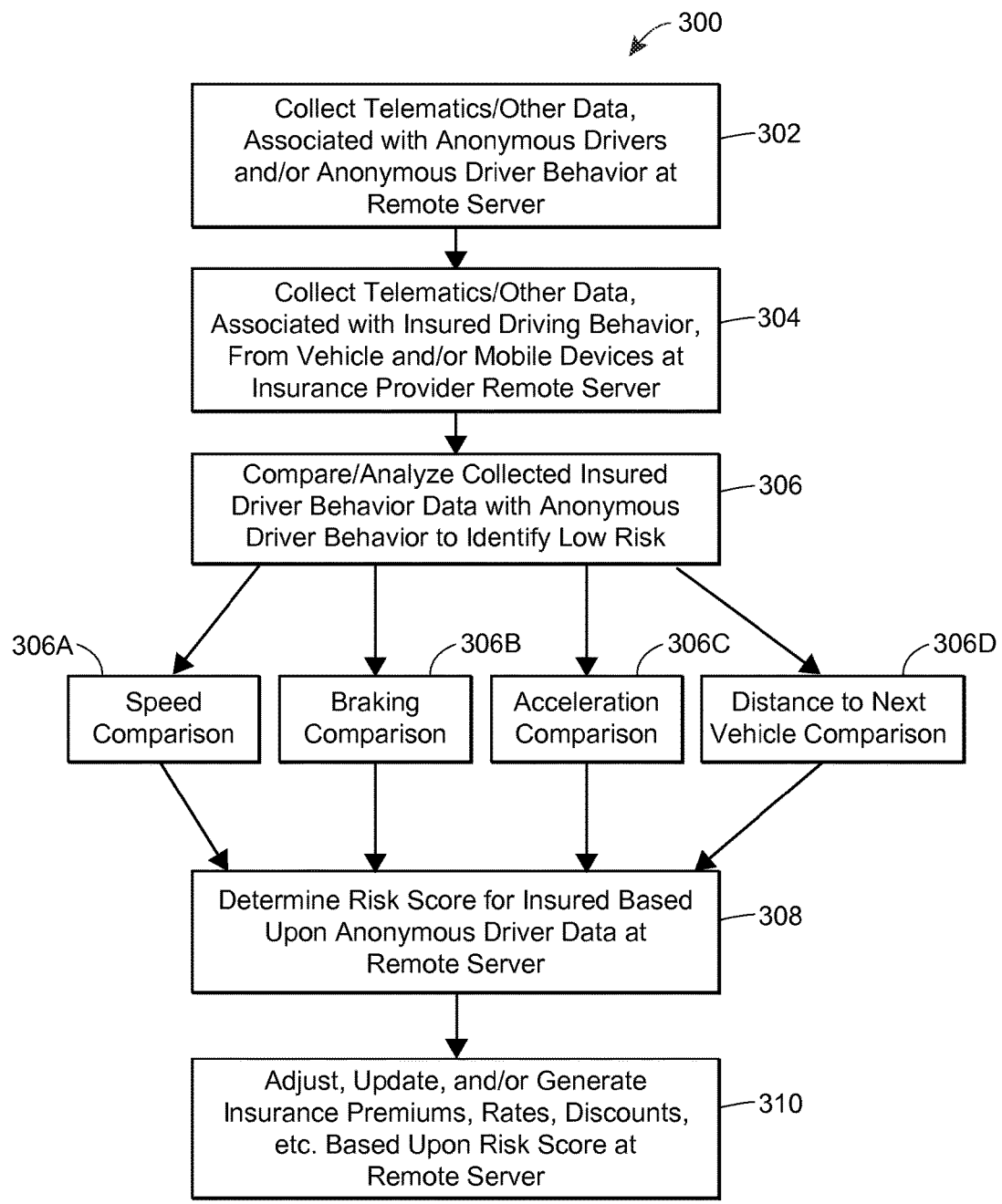
FIG. 3 illustrates an exemplary computer-implemented method of determining a driving or other risk score from anonymous driver data and/or anonymous driver behavior.

FIG. 3 illustrates an exemplary computer-implemented method 300 of determining a driving or other risk score from anonymous driver data and/or anonymous driver behavior. As used herein, an "anonymous driver" means either (i) an average (possibly fictitious) driver whose characteristics and/or behavior are determined from information regarding a plurality of drivers or (ii) each of a plurality of drivers for whom information regarding past driving behavior is available. Also as used herein, "anonymous driver data" means data regarding past vehicle operation associated with one or more anonymous drivers, and "anonymous driver behavior" means past driving behavior of one or more anonymous drivers. In some embodiments, the anonymous driver or anonymous drivers may be selected and/or determined based upon characteristics, such as driving experience, age, residency, etc., and information regarding the anonymous drivers may be anonymized by separating identifying information from the information regarding vehicle operation.

In some embodiments, the method 300 may be implemented in whole or in part by one or more components of the telematics system 1 depicted in FIG. 1. For example, the method 300 may be implemented by a server 40 remote from the front-end components 2 (e.g., sensors 20 or 24, vehicles 6 or 8, mobile devices 10, smart vehicle controllers 14, etc.) or another server (not shown). In some embodiments, the front-end components 2 may be used to generate and/or collect data relating to driving behavior of multiple drivers, including an insured driver of the vehicle 8. The method 300 is exemplary and may include additional, fewer, or alternate actions, including those discussed elsewhere herein.

At block 302, the method 300 may include collecting telematics and/or other data associated with anonymous drivers and/or anonymous driver behavior. The telematics and/or other data may include information regarding vehicle operation, such as driving speed, braking, acceleration, distance from other vehicles, turns, lane changes, and/or other aspects of vehicle operation. Such data may be collected at or via a server 40, such as an insurance provider remote server. In some embodiments, the telematics and/or other data may be generated by sensors associated with a plurality of vehicles 6 and/or an infrastructure component 26 (e.g., a traffic camera, a speed radar device, etc.). The telematics and/or other data may also be generated by or include information related to vehicle-to-vehicle (V2V) communications and/or vehicle-to-infrastructure (V2I) communications.

At block 304, the method 300 may include collecting telematics and/or other data associated with insured driving behavior. Insured driving behavior may include driving behavior of an insured driver, who may be associated with one or more insurance policies issued by the insurance provider. Data associated with the insured driving behavior may be collected at or via the remote server 40 or other remote server. The telematics and/or other data may be directly or indirectly generated and/or received from the mobile device 10 and/or smart vehicle controller 14 via the network 30. In some embodiments, the data may be generated and/or received by the sensors 20 or 24. In various embodiments, the data may be associated with a driver and/or a vehicle.

At block 306, the method 300 may include comparing and/or analyzing the insured driver behavior data with the anonymous driver behavior to identify low risk driving, high risk driving, or risk levels associated with the driving behavior. This may include determining and/or identifying (at the server 40 or at another server or computing device) high or low risk behavior, relative to the anonymous driver behavior. In some embodiments, this may include a comparison of telematics data regarding a plurality of driving behaviors and/or risk-indicating behaviors. For example, the method 300 may include comparisons related to speed in block 306A, braking in block 306B, acceleration or deceleration in block 306C, and/or average distance to the next vehicle in block 306D. Other comparison of driver characteristics and/or behavior may also be made using the insured and anonymous driver behavior data sets.

At block 308, the method 300 may include determining a risk score for the insured based upon the comparison of the insured's driving behavior with the anonymous driver behavior. The remote server 40 may be used to determine one or more risk scores or levels based upon the one or more driver behaviors identified and/or determined in blocks 306 and/or 306A-D. The one or more risk scores may indicate an absolute risk level associated with the vehicle and/or driver, or the one or more risk scores may indicate relative risk levels in comparison with one or more risk levels associated with the anonymous drivers and/or driver behavior. In some embodiments, multiple score levels may be combined into one risk score, which may be a weighted combination of the multiple scores. Where a weighted combination is determined, the weights may be determined manually or automatically by known or later-developed computer-learning methods (e.g., support vector machines, random forests, artificial neural networks, etc.). In some embodiments, the risk score may also include one or more risk aversion scores indicating a general risk preference profile or level of the insured driver.

At block 310, the method 300 may include adjusting, updating, and/or generating insurance premiums, rates, discounts, etc. based upon the risk score for the insured determined at block 308. Thus, the remote server 40 may determine change to an insurance policy based upon the risk score. For example, a discount may be generated for an insurance policy when a determined risk score indicates that a driver operates a vehicle in a risk averse manner or in a manner that results in lower risk than the average risk associated with the anonymous drivers. In some embodiments, an insurance customer, insured driver, and/or other party may be notified or warned regarding the risk levels, adjustment, and/or update.

In one aspect, a computer-implemented method of using anonymous driver data to adjust a driving risk score may be provided. The method may include (1) collecting anonymous driver data associated with anonymous driver behavior (at or via a remote server associated with an insurance provider), the data indicating anonymous driver behavior for specific roads, sections of roads, and/or intersections; (2) collecting insured driving behavior data (at or via the remote server) associated with a specific driver and/or insured that has an auto insurance policy with the insurance provider, the insured driving behavior data including telematics related data; (3) comparing the anonymous driver data with the insured driving behavior data (via the remote server) to determine a driving risk score for the insured; and/or (4) generating, adjusting, and/or updating an insurance policy, premium, rate, discount, and/or reward for the insured based upon the comparison of the anonymous driver data with the insured driving behavior data and/or the driving risk score generated for the insured.

The comparison of the anonymous driver data with the insured driving behavior data may include one or more of the following: a comparison of anonymous driver speed with an insured driving speed for a specific road, section of road, and/or individual intersection; a comparison of anonymous driver braking with insured braking for a specific road, section of road, and/or individual intersection; a comparison of anonymous driver acceleration with insured acceleration for a specific road, section of road, and/or individual intersection; and/or a comparison of anonymous driver following distance with an insured driving following distance for a specific road, section of road, and/or individual intersection.

In one aspect, the telematics and/or other data may include data associated with, or generated by, mobile devices, such as smart phones, smart glasses, and/or smart wearable electronic devices capable of wireless communication. The telematics and/or other data may include data associated with, or generated by, an insured vehicle or a computer system of the insured vehicle. The telematics and/or other data may include data associated with, or generated by, (i) a vehicle other than the insured vehicle; (ii) vehicle-to-vehicle (V2V) communication; and/or (iii) road side equipment or infrastructure. The method may include additional, fewer, or alternative actions.

X. Exemplary Application of Driving Score

Figure 4:
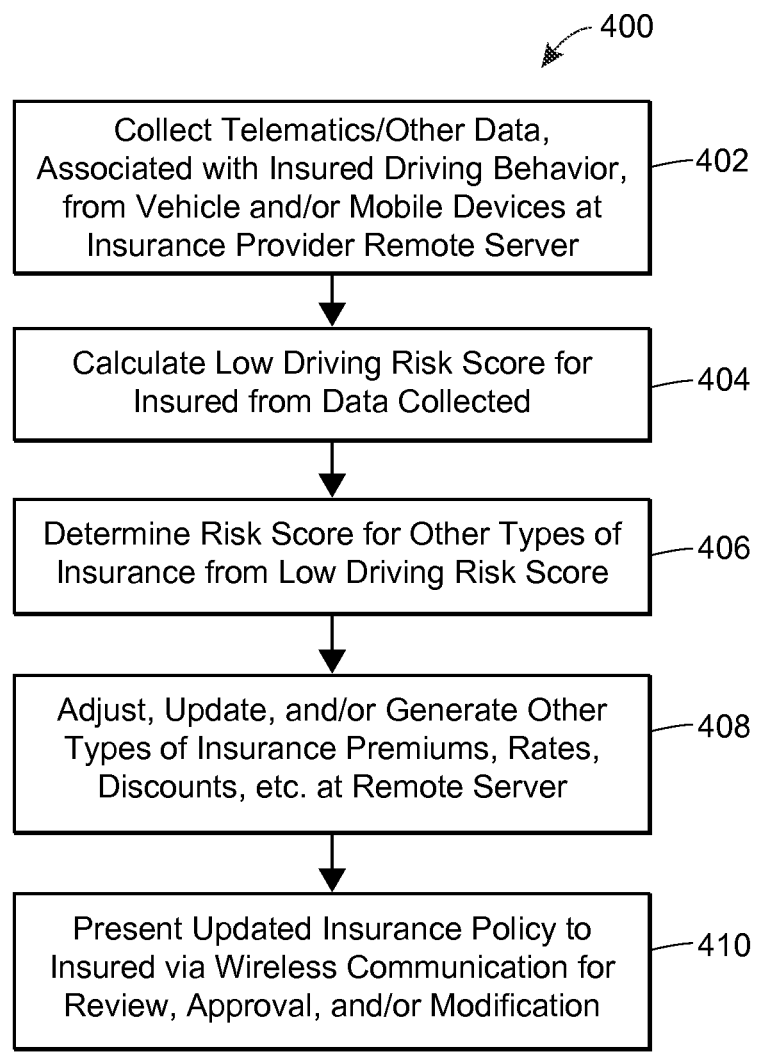
FIG. 4 illustrates an exemplary computer-implemented method of applying a driving risk score to types of insurance other than auto insurance.

FIG. 4 illustrates an exemplary computer-implemented method 400 of applying a driving risk score to types of insurance other than auto insurance. In some embodiments, the method 400 may be implemented in whole or in part by one or more components of the telematics system 1 depicted in FIG. 1. For example, the method 400 may be implemented by a server 40 remote from the front-end components 2 (e.g., sensors 20 or 24, vehicles 6 or 8, mobile devices 10, smart vehicle controllers 14, etc.) or another server (not shown). In some embodiments, the front-end components 2 may be used to generate and/or collect data relating to driving behavior of one or more drivers, including an insured driver of the vehicle 8. The method 400 is exemplary and may include additional, fewer, or alternate actions, including those discussed elsewhere herein.

At block 402, the method 400 may include collecting telematics and/or other data associated with driving behavior of an insured at or via an insurance provider remote server 40. The telematics and/or other data may be received from a smart vehicle 8 (or other vehicle) or mobile device 10. Such data may include any of the data discussed herein, but data regarding vehicle operation by an insured may be particularly useful in determining risks in method 400. In some embodiments, the data may also include data from an accident database 42 and/or a third-party database 44 via the network 30, which data may supplement, verify, and/or contradict some or all of the other collected data.

At block 404, the method 400 may include calculating, at or via the remote server, a low or other driving risk or risk score for the insured from the data collected and/or received. This may include determining and/or identifying (at the server 40 or at another server or computing device) high or low risk behavior. This may also include determining associations and/or correlations between the data and risk preferences and/or levels associated with one or more insurance customers and/or insured persons. For example, data indicating an insured driver maintains a greater distance from vehicles traveling ahead of the driver may be used to determine risk scores or levels for either or both of a driving risk and/or general risk preferences of the insured. In some embodiments, data relating to anonymous driver behavior may be used to determine risk scores and/or levels. In some embodiments, this may include a comparison of telematics data regarding a plurality of driving behaviors and/or risk-indicating behaviors.

At block 406, the method 400 may include determining (at or via the remote server 40) a risk score for one or more types of insurance other than auto insurance (e.g., home owners, renters, health, life, excess liability, etc.) for the insured based upon the low or other driver risk for the insured. For example, the server 40 may determined a risk score for homeowners' insurance, based upon determined risk preferences and/or property care levels of the insured. If the insured demonstrates low risk levels while driving, this may indicate general risk aversion, responsibility, or forethought that may similarly indicate lower risks to property. For example, if the telematics and/or other data indicate that the insured regularly parks a safe distance from other vehicles and always ensures the vehicle is locked, the insured may be determined by server 40 to be more likely to ensure all windows are closed when leaving home. As another example, if data from the smart vehicle controller 14 indicated that an insurance customer performs routine maintenance on the vehicle 8 on a regular schedule, the customer may be determined by server 40 to be more likely to perform routine maintenance on a dwelling (e.g., cleaning gutters, trimming dead branches from trees, etc.) in a timely manner. In some embodiments, the risk score may also include one or more risk aversion scores indicating a general risk preference profile or level of the insured driver.

At block 408, the method 400 may include adjusting, updating, and/or generating (at or via the remote server 40) one or more other types of insurance policies based upon one or more of (i) the driving risk or risk score determined at block 404, and/or (ii) the risk score for the other types of insurance determined at block 406. This may include adjusting, updating, determining, applying, and/or implementing premiums, rates, discounts, surcharges, deductibles, limits, and/or other terms of one or more insurance policies, which terms may be related to price and/or coverage. Such changes to the one or more insurance policies may cause the policies to more accurately reflect the risk levels associated with the policies by utilizing the telematics and/or other data. To this end, the server 40 may weight the driving risk scores and/or other risk scores based upon the type of insurance policy to be adjusted.

At block 410, the server 40 may cause information regarding the adjusted, updated, and/or generated one or more other types of insurance policies to be presented the insured and/or insurance customer for their review, approval, and/or modification. The information may include all or part of the one or more insurance policies. In some embodiments, the information may be presented to the insured and/or insurance customer via wireless communication with the mobile device 10 and/or smart vehicle controller 14. The information may then be presented to the user via the display 74 or otherwise. The insured and/or insurance customer may further be presented with one or more options pertaining to insurance policies (e.g., coverage levels, payment options, etc.), which the insured and/or insurance customer may select. Upon selection of options and/or approval from the insured and/or insurance customer, the server 40 may cause adjustments, changes, and/or updates to be implemented regarding the one or more other insurance policies.

XI. Exemplary Application of Driving Risk

Figure 5:
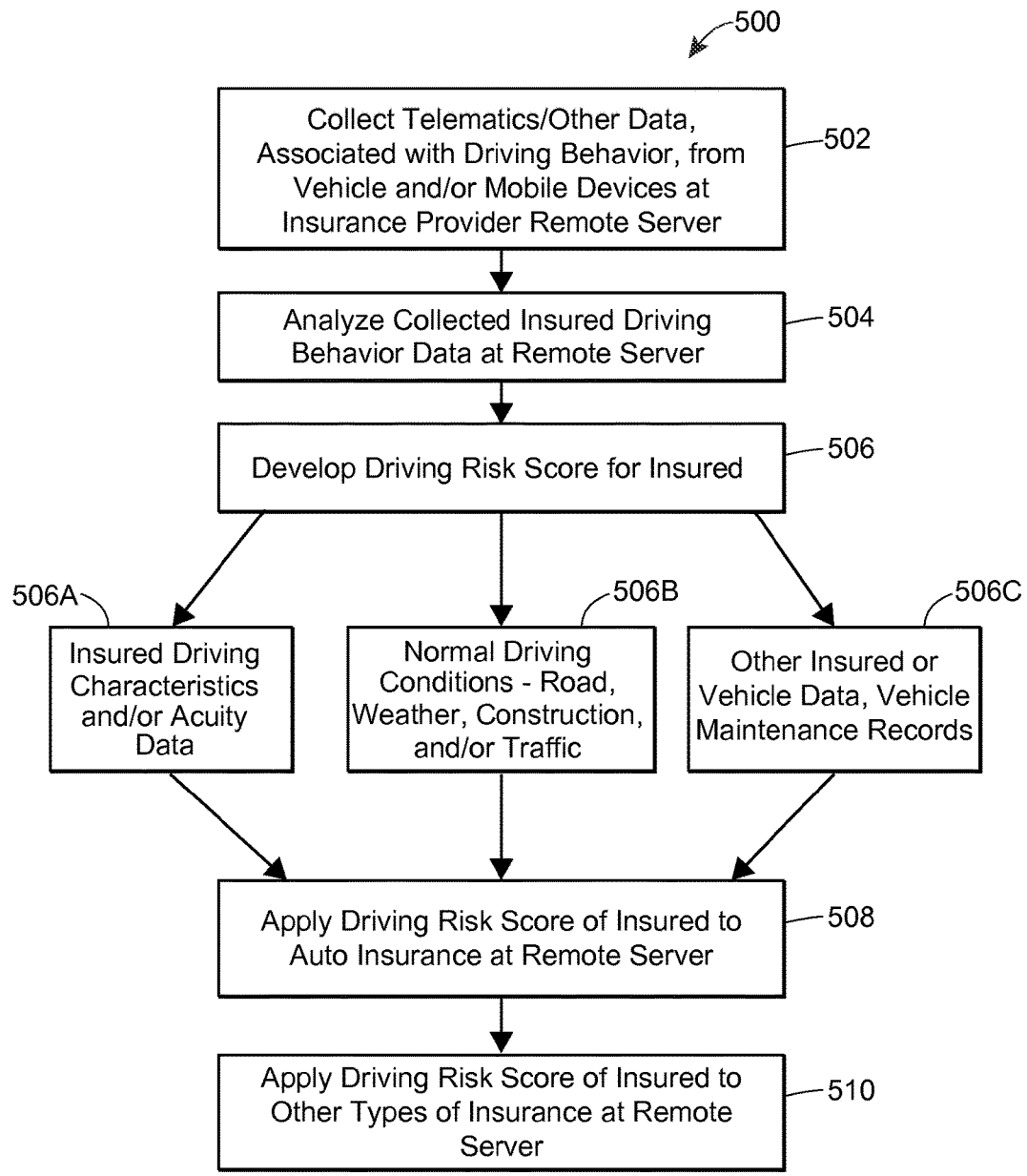
FIG. 5 illustrates another exemplary computer-implemented method of applying a driving risk score to types of insurance other than auto insurance.

FIG. 5 illustrates an exemplary computer-implemented method 500 of applying driving risk to non-automobile insurance. In some embodiments, the method 500 may be implemented in whole or in part by one or more components of the telematics system 1 depicted in FIG. 1. For example, the method 500 may be implemented by a server 40 remote from the front-end components 2 (e.g., sensors 20 or 24, vehicles 6 or 8, mobile devices 10, smart vehicle controllers 14, etc.) or another server (not shown). In some embodiments, the front-end components 2 may be used to generate and/or collect data relating to driving behavior of one or more drivers, including an insured driver of the vehicle 8. The method 500 is exemplary and may include additional, fewer, or alternate actions, including those discussed elsewhere herein.

At block 502, the method 500 may include collecting telematics and/or other data associated with driving behavior of an insured at or via an insurance provider remote server 40. The telematics and/or other data may be received from a smart vehicle 8 (or other vehicle) or mobile device 10. Such data may include any of the data discussed herein, but data regarding vehicle operation by an insured may be particularly useful in determining risks in method 500. In some embodiments, the data may also include data from an accident database 42 and/or a third-party database 44 via the network 30, which data may supplement, verify, and/or contradict some or all of the other collected data.

At block 504, the method 500 may include analyzing the collected insured driver driving behavior data at or via the remote server 40. Analysis of the data may include determining driving characteristics and/or driving environments. Information regarding driving characteristics may include indicators of aggressive or conservative driving, such as speed, braking (hard, soft, frequency, etc.), acceleration, lane centering, distance from other vehicles, attentiveness, distraction, fatigue, impairment, and/or use of vehicle options or equipment. Information regarding driving environments may include time, location, type of road, traffic or congestion, weather conditions, construction, and/or other relevant information regarding the operating environment of the vehicle 8. The driving characteristic and/or driving environment information may be classified in categories and/or scored (e.g., by determining probabilities or likelihoods of salient features). In some embodiments, machine learning techniques may be used to determine driving characteristics and/or driving environments.

At block 506, the method 500 may include developing a driving risk or a driving risk score for the insured from analysis of the insured driver driving behavior data, similar to risk or score determination discussed elsewhere herein. To determine the driving risk or driving risk score, the remote server 40 may further analyze and/or process the insured driver driving behavior data to determine insured driver driving characteristics and/or typical acuity at block 506A, normal driving conditions for the insured (including road, weather, construction, and/or traffic) at block 506B, and/or other insured or vehicle characteristics (including vehicle maintenance records) at block 506C. In some embodiments, a plurality of driving risk scores may be determined, which may be associated with different driving environments, different insured drivers, and/or different vehicles. In some embodiments, the driving risk or driving risk score may also include one or more risk aversion scores indicating a general risk preference profile or level of the insured driver.

At block 508, the method 500 may include applying the driving risk or driving risk score of the insured to an automobile insurance policy and/or premiums for the insured at or via the remote server 40. This may include adjusting, updating, and/or generating automobile or automotive insurance policies based upon the determined driving risks or driving risk scores, which may further include adjusting, updating, determining, applying, and/or implementing premiums, rates, discounts, surcharges, deductibles, limits, and/or other terms of one or more insurance policies, which terms may be related to price and/or coverage.

At block 510, the method 500 may include applying the driving risk or driving risk score of the insured to one or more non-auto insurance (e.g., health, life, home owners, renters, etc.) policies, premiums, rates, discounts, rewards, and/or points for the insured at the remote server 40. This may include determining associations and/or correlations between the data and risk preferences and/or levels associated with one or more insurance customers and/or insured persons. For example, driving risk scores may be indicative of general risk preferences, which may further affect risk levels relating to health, life, or property insurance policies. Changes to the one or more non-automobile insurance policies may cause the policies to more accurately reflect the risk levels associated with the policies by utilizing the telematics and/or other data. To this end, the server 40 may weight the driving risk scores and/or other risk scores based upon the type of insurance policy to be adjusted.

The method 500 may include presenting information regarding the non-auto insurance policies, or portions thereof, generated from the driving risk or driving risk score for the insured to the insured for their review, approval, and/or modification. In some embodiments, the information may be presented to the insured and/or insurance customer via wireless communication with the mobile device 10 and/or smart vehicle controller 14. The information may then be presented to the user via the display 74 or otherwise. The insured and/or insurance customer may further be presented with one or more options pertaining to insurance policies (e.g., coverage levels, payment options, etc.), which the insured and/or insurance customer may select. Upon selection of options and/or approval from the insured and/or insurance customer, the server 40 may cause adjustments, changes, and/or updates to be implemented regarding the one or more other insurance policies.

XII. Exemplary Usage-Based Insurance

Figure 6:
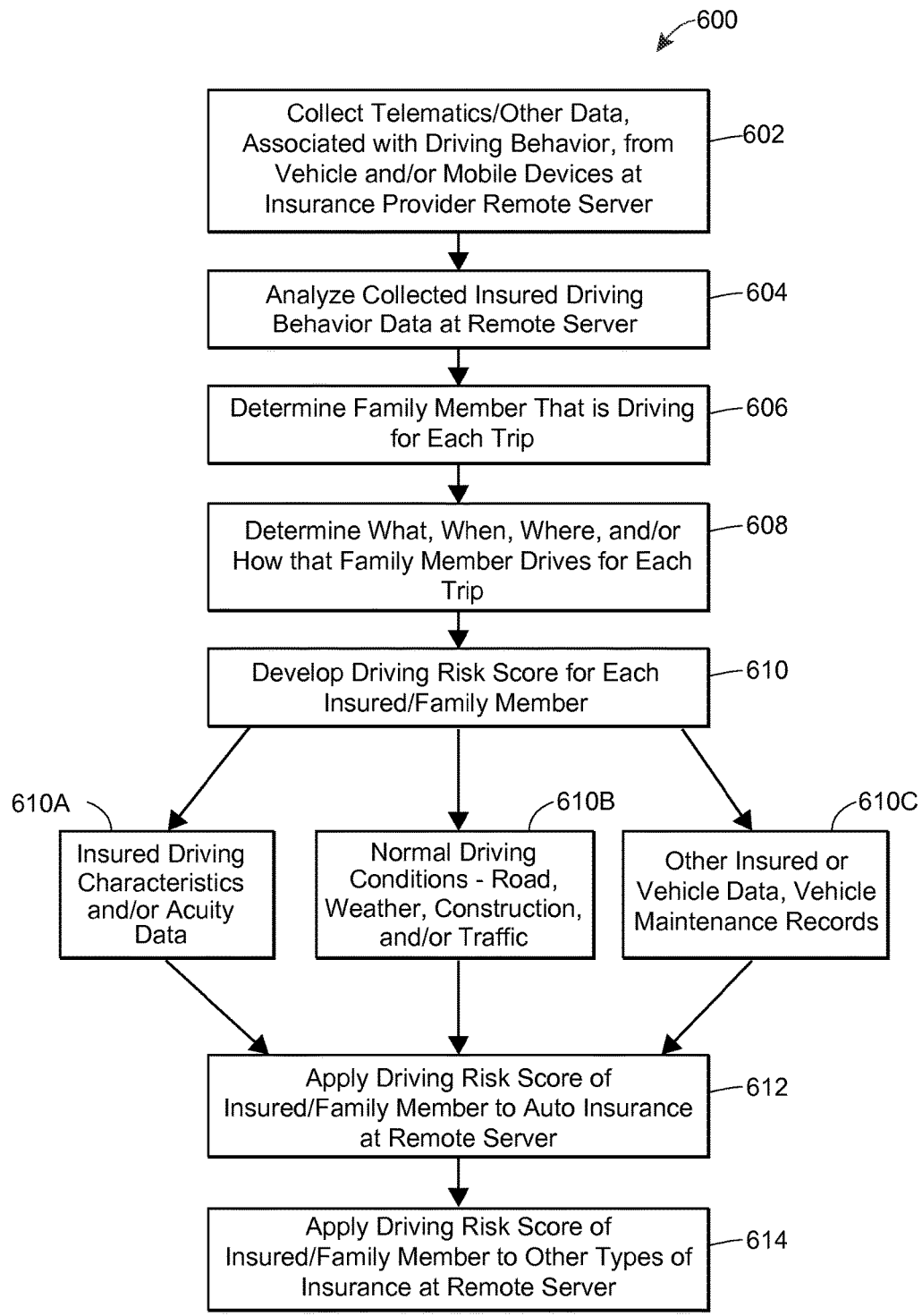
FIG. 6 illustrates an exemplary computer-implemented method of providing more accurate usage-based insurance.

FIG. 6 illustrates an exemplary computer-implemented method 600 of improving accuracy usage-based insurance. In some embodiments, the method 600 may be implemented in whole or in part by one or more components of the telematics system 1 depicted in FIG. 1. For example, the method 600 may be implemented by a server 40 remote from the front-end components 2 (e.g., sensors 20 or 24, vehicles 6 or 8, mobile devices 10, smart vehicle controllers 14, etc.)

or another server (not shown). In some embodiments, the front-end components 2 may be used to generate and/or collect data relating to driving behavior of multiple drivers, including an insured driver of the vehicle 8. The method 600 is exemplary and may include additional, fewer, or alternate actions, including those discussed elsewhere herein.

At block 602, the method 600 may include collecting telematics and/or other data associated with driving behavior of one or more insured drivers at or via an insurance provider remote server 40. The telematics and/or other data may be received from a smart vehicle 8 (or other vehicle) or mobile device 10. Such data may include any of the data discussed herein, but data regarding vehicle operation by insured drivers may be particularly useful in determining risks in method 600. In some embodiments, the data may also include data from an accident database 42 and/or a third-party database 44 via the network 30, which data may supplement, verify, and/or contradict some or all of the other collected data.

At block 604, the method 600 may include analyzing the telematics and/or other data collected at or via the remote server 40. Analysis of the data may include determining driving characteristics and/or driving environments for one or more vehicles 8 and/or one or more drivers, in a manner similar to that discussed elsewhere herein.

At block 606, the method 600 may include determining, from analysis of the telematics and/or other data, a specific insured driver who is driving a specific insured vehicle for each trip that the insured vehicle is driven at or via the remote server 40. For example, a family may include multiple family members who are insured on each of a number of vehicles (and who may have different risk profiles and/or driving behavior). The method 600 may determine which family member is driving each vehicle during each vehicle trip in order to determine risk levels associated with each family member and/or to determine a total risk level based upon relative usage of the vehicles by the family members. In some embodiments, the identity of the driver for each trip may be determined by communication between a mobile device 10 associated with the driver and a smart vehicle controller 14 of the vehicle 8.

At block 608, the method 600 may include determining information regarding each vehicle trip at or via the remote server 40 from analysis of the telematics and/or other data. This may include determining what insured vehicle was used for the trip. This may also include when, where, and/or how the identified driver drives for each trip (that they drive the insured vehicle). For example, the server 40 may determined that (for a particular vehicle trip) a specific family member is driving the insured vehicle, as well as the time and location of the trip. The server 40 may further determine driving characteristics and/or driving environments (as discussed elsewhere herein) for the vehicle trip.

At block 610, the method 600 may include developing a driving risk or driving risk score for each insured driver (e.g., for each family member) based upon the analysis of the telematics and/or other data at or via the remote server 40. This may be developed based upon the identified driver determined at block 606 and the information regarding each vehicle trip determined at block 608. Determining the driving risk or score may include analyzing various data types (which may be received from a plurality of sources). These may include information regarding insured driving characteristics (insured driver behavior and/or acuity data) at block 610A, driving environments (road, weather, construction, and/or traffic conditions) at block 610B, and/or other vehicle and/or other driver behavior or action data at block 610C. In some embodiments, the driving risk or driving risk score may also include one or more risk aversion scores indicating a general risk preference profile or level of the insured driver. The driving risk or driving risk scores may be determined using weighted models, computer learning techniques, and/or in a manner similar to any of the methods described herein.

At block 612, the method 600 may include applying the driving risk or driving risk score of one or more of the insured drivers to an automobile insurance policy and/or premiums for the insured at or via the remote server 40. In some embodiments, this may include determining a weighted risk profile including multiple insured drivers (such as family members). This may include adjusting, updating, and/or generating automobile or automotive insurance policies based upon the determined driving risks or driving risk scores, which may further include adjusting, updating, determining, applying, and/or implementing premiums, rates, discounts, surcharges, deductibles, limits, and/or other terms of one or more insurance policies, which terms may be related to price and/or coverage.

At block 614, the method 600 may include applying the driving risk or driving risk scores of one or more of the insured drivers to one or more other (non-automobile) types of insurance policies (e.g., health, life, home owners, renters, etc.) at the remote server 40. Applying the driving risk or driving risk scores may include adjusting, updating, and/or generating one or more of premiums, rates, discounts, rewards, and/or points. This may further include determining associations and/or correlations between the data and risk preferences and/or levels associated with one or more insured persons, as discussed elsewhere herein.

The method may provide a more accurate picture of which family member is driving which type of vehicle (e.g., a higher or lower rated vehicle), when and where they are driving that vehicle (such as on what type of roads, in what type of traffic or weather, and/or the actual mileage (and not estimated mileage) that each family member drives each insured vehicle), and thus more accurate insurance or usage-based insurance may be provided to the insured or family members of the insured.

In one aspect, a computer-implemented method of updating, adjusting, or generating an insurance policy for an insured based upon vehicle usage may be provided. The method may include: (1) collecting or receiving telematics and/or other data at or via a remote server associated with an insurance provider, the telematics and/or other data being associated with driver identification and/or driving behavior of a driver driving an insured vehicle during a specific trip or a group of trips, the insured vehicle being covered by an insurance policy issued by the insurance provider; (2) analyzing the telematics and/or other data, at or via the remote server, to determine who the driver of the insured vehicle was during each trip, such as a specific family member (e.g., either an insured parent or insured teenager); (3) determining over time, at or via the remote server, a summary of vehicle usage for the insured vehicle, the summary of vehicle usage may include (a) an amount that each family member drives the insured vehicle, (b) the driving behavior of each family member for the insured vehicle, and/or (c) when and where (i.e., on what types of roads and/or in what weather, construction, traffic, or road conditions) each family member drives the insured vehicle; and/or (4) updating, adjusting, and/or generating, at or via the remote server, an insurance policy, premium, rate, discount, and/or reward for the insured vehicle and/or for an individual family member based upon the summary of vehicle usage. Determining a summary of vehicle usage may improve operation of the computer system by allowing efficient storage, processing, and/or transmission of information relating to the operation of the vehicle by one or more drivers. In some embodiments, the summary may further be limited to one or more types or classes of data, thereby reducing computing resources required to store data in database 46, process data by the server 40, and/or transmit data via the network 30. The method may further include transmitting, via wireless communication, the updated, adjusted, or generated insurance policy from the remote server to an insured or owner of the insured vehicle for their review, approval, and/or modification; and/or receiving from the insured or owner of the insured vehicle, at the remote server, a wireless communication associated with rejection, approval, or modification of the insurance policy by the insured or owner.

The telematics and/or other data may include data associated with, or generated by, mobile devices, such as smart phones, smart glasses, and/or smart wearable electronic devices capable of wireless communication. The telematics and/or other data may include data associated with, or generated by, an insured vehicle or a computer system of the insured vehicle. The telematics and/or other data may include data associated with, or generated by, (i) a vehicle other than the insured vehicle; (ii) vehicle-to-vehicle (V2V) communication; and/or (iii) road side equipment or infrastructure. The method may include additional, fewer, or alternate actions, including those discussed elsewhere herein.

XIII. Exemplary Incentives & Recommendations

Figure 7:
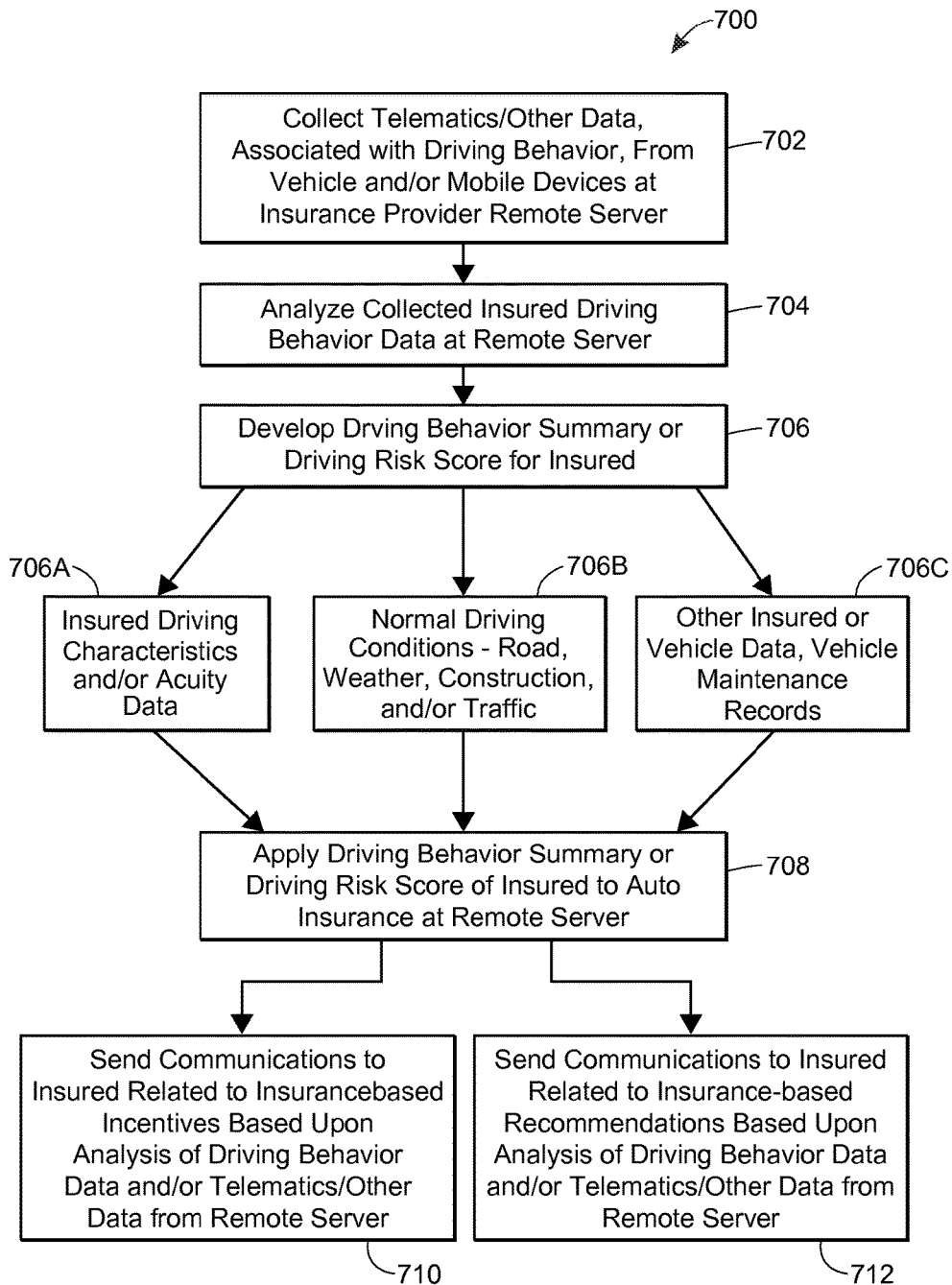
FIG. 7 illustrates an exemplary computer-implemented method of providing insurance-related incentives and/or recommendations.

FIG. 7 illustrates an exemplary computer-implemented method 700 of providing insurance-related incentives and/or recommendations. In some embodiments, the method 700 may be implemented in whole or in part by one or more components of the telematics system 1 depicted in FIG. 1. For example, the method 700 may be implemented by a server 40 remote from the front-end components 2 (e.g., sensors 20 or 24, vehicles 6 or 8, mobile devices 10, smart vehicle controllers 14, etc.) or another server (not shown). In some embodiments, the front-end components 2 may be used to generate and/or collect data relating to driving behavior of multiple drivers, including an insured driver of the vehicle 8. In further embodiments, the front-end components 2 may be used to present information, such as recommendations, to the driver of the vehicle 8. The method 700 is exemplary and may include additional, fewer, or alternate actions, including those discussed elsewhere herein.

At block 702, the method 700 may include collecting telematics and/or other data associated with driving behavior of an insured at or via an insurance provider remote server 40. The telematics and/or other data may be received from a smart vehicle 8 (or other vehicle) or mobile device 10. Such data may include any of the data discussed herein, but data regarding vehicle operation by an insured may be particularly useful in determining risks and/or recommendations in method 700. In some embodiments, the data may also include data from an accident database 42 and/or a third-party database 44 via the network 30, which data may supplement, verify, and/or contradict some or all of the other collected data.

At block 704, the method 700 may include analyzing the telematics and/or other data collected at or via the remote server 40. Analysis of the data may include determining driving characteristics and/or driving environments for the vehicle 8 and/or insured driver, in a manner similar to that discussed elsewhere herein.

At block 706, the method 700 may include determining a driving risk score or driving behavior summary for an insured driver at or via the remote server 40. The driving risk score or driving behavior summary may be determined based upon analysis of the telematics and/or other data received or collected at block 702. In some embodiments, one or more driving risk scores may be determined by analyzing information regarding driving characteristics (insured vehicle data, and/or insured driver behavior and/or acuity data) at block 706A, driving environments (road, weather, construction, and/or traffic conditions or data) at block 706B, and/or other vehicle and/or other driver behavior or action data at block 706C. The driving behavior summary may include information regarding risk levels for an insured driver and/or insured vehicle. In some embodiments, the driving behavior summary may include a driver profile or information regarding recommended changes to the insured driver's operation of the vehicle. In some embodiments, the driving risk score or driving behavior summary may also include one or more risk aversion scores indicating a general risk preference profile or level of the insured driver. The driving risk scores or driving behavior summary may be determined using weighted models, computer learning techniques, and/or in a manner similar to any of the methods described herein.

At block 708, the method 700 may include applying the driving risk or driving risk score of the insured to an automobile insurance policy and/or premiums for the insured at or via the remote server 40. This may include adjusting, updating, and/or generating automobile or automotive insurance policies based upon the determined driving risks or driving risk scores, which may further include adjusting, updating, determining, applying, and/or implementing premiums, rates, discounts, surcharges, deductibles, limits, and/or other terms of one or more insurance policies, which terms may be related to price and/or coverage.

At block 710, the method 700 may include generating and/or sending communications related to insurance-based incentives and/or cost savings from the remote server 40 to the insured and/or insurance customer. The insurance-based incentives and/or cost savings may be determined by the server 40 based upon the driving behavior summary and/or analysis of the driving behavior or driving risk score of the insured determined at block 704 based upon the telematics and/or other data. In some embodiments, the insurance-based incentives may include discounts, surcharges, credits, points, and/or other price or non-price adjustments to an insurance policy that are related to driver behavior and/or vehicle usage in certain driving environment. For example, the server 40 may determined that the insured driver engages in low-risk driving behavior by following other vehicles at a suitable distance, resulting in less braking. The server 40 may determine a discount and send a communication to the driver indicating both the discount and the reason therefore.

At block 712, the method 700 may include generating and/or sending communications related to insurance-based recommendation from the remote server 40 to the insured and/or insurance customer. The recommendations may be determined by the server 40 based upon the driving behavior summary and/or analysis of the driving behavior or driving risk score of the insured determined at block 704 based upon the telematics and/or other data. The recommendations may include instructions or actions the insured driver may take to reduce the risk associated with driving the vehicle. Such actions may include changing speed, following a recommended route, increasing distance from other vehicles, turning on headlights, etc. In some embodiments, the recommendations may also include indications of discounts, surcharges, credits, points, and/or other price or non-price adjustments to an insurance policy that may result from the insured driver implementing or not implementing the recommendations. For example, the server 40 may determine that the insured driver engages in high-risk driving behavior by following other vehicles too closely, resulting in excess braking. The server 40 may determine a recommendation regarding increasing following distance and send a communication to the driver indicating the recommendation. The server 40 may further determine a possible discount the driver may achieve by increasing following distance, which may be included in the communication to the driver. In some embodiments, the server 40 may further receive data from the mobile device 10 and/or smart vehicle controller 14 indicating whether the insured driver has taken actions to implement the recommendation by increasing following distance. If the data indicate that following distance has increased, the server 40 may then determine and apply an appropriate discount or implement other appropriate adjustments to the insurance policy.

In some embodiments, the communications sent from the server 40 at block 710 and/or block 712 may be presented to the insured for their review and/or action. In some embodiments, the information may be presented to the insured and/or insurance customer via wireless communication with the mobile device 10 and/or smart vehicle controller 14. The information may then be presented to the user via the display 74 or otherwise. In some embodiments, the insured and/or insurance customer may further be presented with one or more options pertaining to insurance policies (e.g., coverage levels, payment options, etc.), which the insured and/or insurance customer may select.

In one aspect, a computer-implemented method of providing insurance-based incentives (e.g., cost savings) and/or recommendations for auto insurance may be provided. The method may include: (1) collecting telematics and/or other data associated with driving behavior of an insured, at or via a remote server associated with an insurance provider, the insured having an auto insurance policy with the insurance provider; (2) determining a risk aversion score and/or driving behavior summary for the insured, at or via the remote server, based upon analysis of the telematics and/or other data collected, the analysis of the telematics and/or other data may include identifying, at or via the remote server: (i) insured driving characteristics (e.g., speed, braking, acceleration, turning, and/or other driving characteristics); (ii) types of roads that the insured typically drives on (e.g., intersections, city streets, and/or highways) and/or types of conditions that the insured typically drives in (e.g., weather, traffic, construction, or road conditions); and/or (iii) a daily commute to and from work for the insured; (3) identifying, at or via the remote server, risky driving behavior of the insured based upon the risk aversion score and/or driving behavior summary; (4) identifying, at or via the remote server, recommendations for the insured to take or follow to reduce driving risk associated with the risky driving behavior identified; and/or (5) transmitting the recommendations for the insured to take or follow to reduce driving risk from the remote server to a mobile or computing device of the insured. The method may include estimating, at or via the remote server, cost savings on auto insurance that the insured may or could receive if the insured followed the recommendations to reduce driving risk; and/or transmitting the cost savings on auto insurance from the remote server to the mobile or computing device of the insured. The method may include monitoring, at or via the remote server, whether the insured followed all or some of the recommendations to reduce driving risk; and/or if so, updating or adjusting an insurance policy, premium, rate, or discount for the insured based upon the insured following all or some of the recommendations to reduce driving risk.

In addition or alternatively to the foregoing, determining a risk aversion score and/or a driving behavior summary for the insured, at or via the remote server, from analysis of the telematics and/or other data collected may include analysis of driving speed (whether too fast, too slow, or proper for conditions); hard braking events and/or verifying the accuracy of hard braking events indicated by some telematics data or determining or assigning fault for the hard braking events to the insured, drivers other than insured, pedestrians, traffic, congestion, weather, construction, or other factors or conditions; acceleration or acceleration events; sleeping events and/or verifying the accuracy of sleeping events indicated by some telematics data; time of day driving; closeness to other vehicles (e.g., analysis for potential tailgating); lane analysis (e.g., analysis of driving or staying within a correct lane); type of weather, traffic, construction, and/or roads in or on which the insured typically drives; and/or proper use of safety equipment, including headlights, turn signals, and wiper blades.

The telematics and/or other data may include data associated with, or generated by, mobile devices, such as smart phones, smart glasses, and/or smart wearable electronic devices capable of wireless communication. The telematics and/or other data may include data associated with, or generated by, an insured vehicle or a computer system of the insured vehicle. The telematics and/or other data may include data associated with, or generated by, (i) a vehicle other than the insured vehicle; (ii) vehicle-to-vehicle (V2V) communication; and/or (iii) road side equipment or infrastructure. The method may include additional, fewer, or alternate actions, including those discussed elsewhere herein.

XIV. Exemplary Individual-Based Insurance

Figure 8:
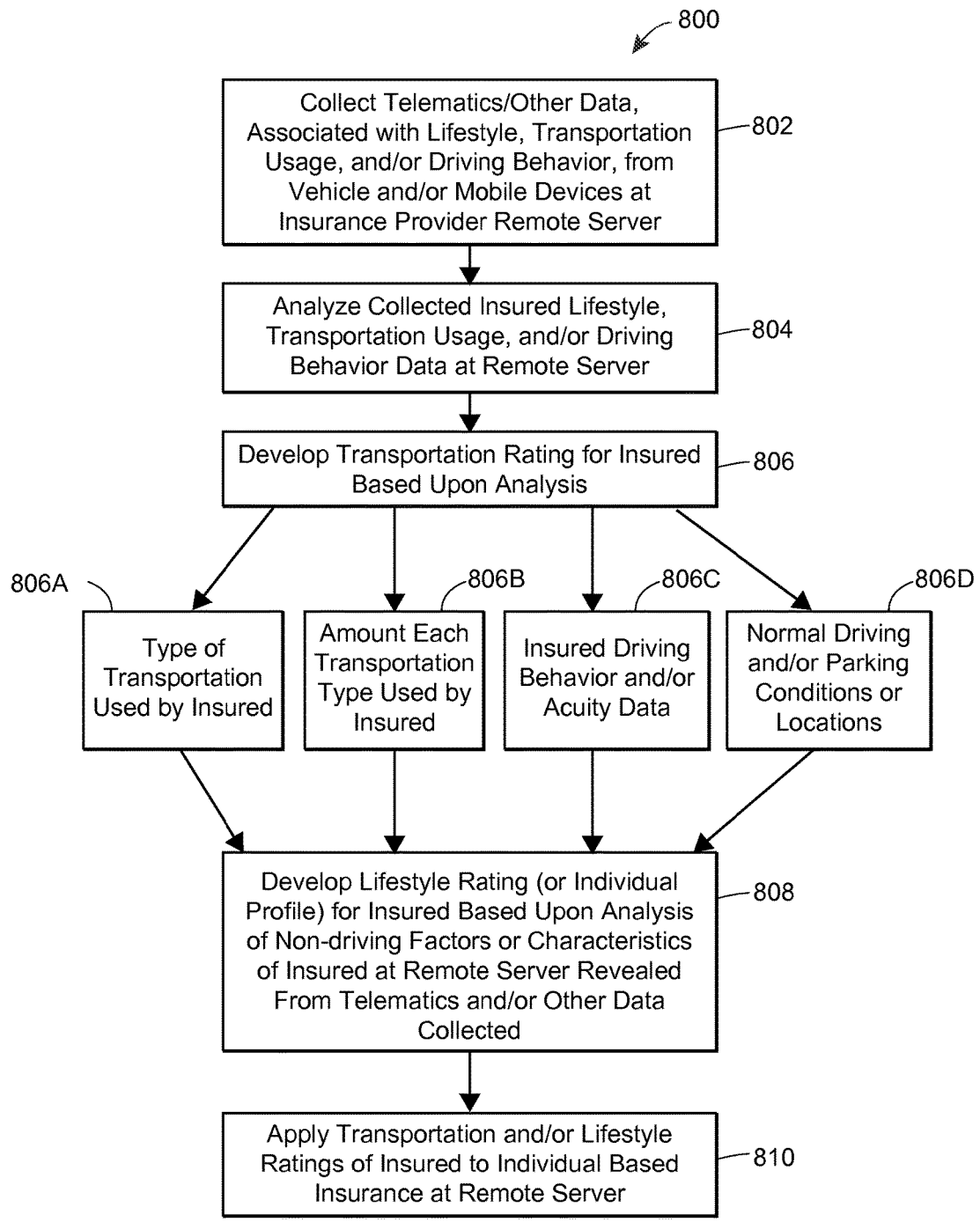
FIG. 8 illustrates an exemplary computer-implemented method of generating an individual-based insurance product.

FIG. 8 illustrates an exemplary computer-implemented method of generating an individual-based insurance product. In some embodiments, the method 800 may be implemented in whole or in part by one or more components of the telematics system 1 depicted in FIG. 1. For example, the method 800 may be implemented by a server 40 remote from the front-end components 2 (e.g., sensors 20 or 24, vehicles 6 or 8, mobile devices 10, smart vehicle controllers 14, etc.) or another server (not shown). In some embodiments, the front-end components 2 may be used to generate and/or collect data relating to driving behavior of multiple drivers, including an insured driver of the vehicle 8. The method 800 is exemplary and may include additional, fewer, or alternate actions, including those discussed elsewhere herein.

At block 802, the method 800 may include collecting and/or receiving telematics and/or other data associated with an insured at the remote server 40 from one or more front-end components 2, such as the mobile device 10, the smart vehicle controller 14, and/or the smart home controller 29. The data may include information related to the lifestyle, transportation usage, and/or driving behavior of the insured, including any of the information described elsewhere herein. For example, data collected from the insured's mobile device 10 and/or a wearable device may be collected for the purpose of determining when the insured has chosen to walk or take public transportation (for which data from a public transportation system component 22 may also be collected). In some embodiments, additional information from accident database 42, third-party database 44, and/or other database 46 may be collected and/or received by the server 40.

At block 804, the method 800 may include analyzing the telematics and/or other data collected at or via the remote server 40. Analysis of the data may include determining driving characteristics and/or driving environments for the vehicle 8 and/or insured driver, in a manner similar to that discussed elsewhere herein. Additionally, or alternatively, analysis of the data may include determining risk preferences of the insured with respect to one or more types of risks (e.g., transportation, health, financial, etc.). Additionally, or alternatively, analysis of the data may include determining one or more other types of scores, risk levels, or metrics regarding other aspects of the insured's lifestyle, activities, or behavior that may affect risk coverage under one or more insurance policies.

At block 806, the method 800 may include determining, from the analysis of the telematics and/or other data, a transportation rating for the insured at or via the remote server 40. The transportation rating may include a transportation coverage rating, which may include information regarding transportation options available to or utilized by the insured, transportation conditions or environments in which the insured typically travels, and/or other information relating to typical circumstances or conditions of transportation used by or available to the insured. In some embodiments, determining the transportation rating may include determining a plurality of ratings or scores, which may include analyzing the type of transportation typically used by the insured at block 806A, analyzing an amount or frequency each type of transportation is used by the insured at block 806B, analyzing driving characteristics (insured vehicle data, and/or insured driver behavior and/or acuity data) at block 806C, analyzing normal driving environment or conditions for the insured (which may include information about where, when, and how a vehicle 8 is used and/or normal parking conditions or locations) at block 806D. Determining the normal driving environment or conditions may further include determining driving behavior for the insured, where or when the insured typically drives, the conditions in which the insured typically drives (e.g., roads, weather, construction, and/or traffic), where the insured typically parks the insured vehicle (e.g., inside a garage, in a driveway, on busy street, etc.), and/or when the insured typically parks the insured vehicle in types of locations (e.g., street parking during the day or at night).

At block 808, the method 800 may also include developing or determining a lifestyle rating or individual profile at or via the remote server 40. The lifestyle rating or individual profile may be based upon analysis of non-driving factors or characteristics of the insured determined from analysis of the telematics and/or other data. The lifestyle rating or individual profile may take into consideration risky or risk-averse behaviors or activities of the insured. This may include non-driving activities that the insured engages or non-driving factors (such as sports, workout routine, outdoor activities, eating habits, age, sex, marital status, etc.). Some non-driving activities or factors may nonetheless be related to transportation, such as walking, bicycling, or utilizing public transportation. As discussed elsewhere herein, data from mobile devices 10, wearable devices, social media, third-party databases 44, and/or other sources may be used in developing or determining the lifestyle rating or individual profile.

At block 810, the method 800 may include may include applying (a) the transportation rating for the insured, (b) the lifestyle rating for the insured, and/or (c) the individual profile for the insured to determine an aspect of an insurance policy for the insured at or via the remote server 40. This may include adjusting, updating, and/or generating one or more of premiums, rates, discounts, limits, deductibles, rewards, and/or points of an insurance policy. The insurance policy may cover specific types or risks (e.g., automobile, health, life, home owners, renters, etc.) or may cover general risks associated with the insured (i.e., an individual-based insurance policy). In some embodiments, the remote server 40 may further cause information regarding the insurance policy or changes thereto to be presented to the insured and/or an insurance customer, as discussed elsewhere herein.

In one aspect, a computer-implemented method of generating or adjusting an individual-based or other insurance product may be provided. The method may include: (1) collecting or receiving telematics and/or other data at or via a remote server associated with an insurance provider, the telematics and/or other data being associated with a lifestyle, transportation usage, and/or driving behavior of an insured, the insured being an insured driver that drives an insured vehicle and the insured vehicle being covered by an insurance policy issued by the insurance provider; (2) analyzing, at or via the remote server, the telematics and/or other data received; and/or (3) determining, at or via the remote server, a transportation rating for the insured from the analysis of the telematics and/or other data, the transportation rating being determined based upon at least (a) an identification of each type of transportation that the insured typically uses within a given period of time; (b) an identification of an amount or frequency that each type of transportation is typically used by the insured within the given period of time; and/or (c) the driving behavior of the insured. The method may include (4) updating, adjusting, or generating, at or via the remote server, a premium, rate, discount, or reward for an insurance policy of the insured based upon the transportation rating for the insured. The method may include additional, fewer, or alternate actions, including those discussed elsewhere herein.

For instance, the insurance policy that is updated, adjusted, or generated may be an individual-based insurance policy that provides insurance and/or coverage for the insured (as opposed to providing coverage for property), or an auto or other insurance policy. The transportation rating may take into consideration where the insured typically parks the insured vehicle, such as inside or outside. The type of transportation that the insured takes or uses may include public transportation, trains, buses, airplanes, automobiles, car pools, bicycles, boats, running, and/or walking.

The method may include determining, at or via the remote server, a lifestyle rating or individual profile based upon (i) non-driving activities that the insured engages in, and/or (ii) non-driving factors or conditions as determined from the analysis of the telematics and/or other data. Each non-driving activity or factor may be assigned or associated with a risk factor corresponding to a risk of engaging in that non-driving activity or associated with the non-driving factors or conditions. The method may also include updating, adjusting, or generating, at or via the remote server, a premium, rate, discount, or reward for an insurance policy of the insured based upon (a) the transportation rating, and (b) the lifestyle rating or individual profile for the insured. The non-driving activities may include sporting activities, workout routine, outdoor activities, and/or eating habits of the insured. The non-driving factors may include age, sex, marital status, and/or health conditions of the insured.

The telematics and/or other data may include data associated with, or generated by, mobile devices, such as smart phones, smart glasses, and/or smart wearable electronic devices capable of wireless communication. The telematics and/or other data may include data associated with, or generated by, an insured vehicle or a computer system of the insured vehicle. The telematics and/or other data may include data associated with, or generated by, (i) a vehicle other than the insured vehicle; (ii) vehicle-to-vehicle (V2V) communication; and/or (iii) road side equipment or infrastructure.

While the preferred embodiments have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

XV. Exemplary Driver Risk Score for Auto Insurance

In one aspect, a computer-implemented method of applying a driving risk score to auto insurance may be provided. The method may include collecting telematics and/or other data associated with driving behavior of an insured, at or via a remote server associated with an insurance provider. The insured may have an auto insurance policy with the insurance provider. The method may include determining a risk aversion score for the insured, at or via the remote server, based upon analysis of the telematics and/or other data collected. The analysis of the telematics and/or other data may include identifying, at or via the remote server: (i) insured driving characteristics (e.g., speed, braking, and acceleration characteristics); (ii) types of roads that the insured typically drives on (e.g., intersections, city streets, and/or highways); and/or (iii) a daily commute to and from work for the insured. The method may include estimating, at or via the remote server, an insurance premium, rate, and/or discount associated with an auto insurance policy for the insured based upon the risk aversion score; and/or generating, adjusting, and/or updating the auto insurance policy for the insured based upon the risk aversion score at or via the remote server. The method may include additional, fewer, or alternate actions, including those discussed elsewhere herein.

For instance, the analysis of the telematics and/or other data may include identification of which family member is driving a vehicle, as well as when and where that family member is driving. The analysis of the telematics and/or other data may include using biometric data associated with the insured to determine the risk aversion score. The analysis of the telematics and/or other data may include identification of where an insured vehicle is typically parked, and/or a percentage of time that the insured vehicle is garaged. The analysis of the telematics and/or other data may include analysis of vehicle maintenance records. The telematics and/or other data may include data associated with, or generated by, mobile devices, such as smart phones, smart glasses, and/or smart wearable electronic devices capable of wireless communication. The telematics and/or other data may include data associated with, or generated by, an insured vehicle or a computer system of the insured vehicle. The telematics and/or other data may include data associated with, or generated by, (i) a vehicle other than the insured vehicle; (ii) vehicle-to-vehicle (V2V) communication; and/or (iii) road side equipment or infrastructure.

The method may include estimating, at or via the remote server, an insurance premium, rate, and/or discount associated with a home insurance policy for the insured based upon the risk aversion score; and/or generating, adjusting, and/or updating the home insurance policy for the insured based upon the risk aversion score at or via the remote server. The method may additionally or alternatively include estimating, at or via the remote server, an insurance premium, rate, and/or discount associated with a home insurance policy for the insured based upon the risk aversion score; and/or generating, adjusting, and/or updating the home insurance policy for the insured based upon the risk aversion score at or via the remote server. The method may additionally or alternatively include transmitting an estimated insurance premium, rate, and/or discount based upon the risk aversion score from the remote server to a mobile device associated with the insured to facilitate a presentation of the estimated insurance premium, rate, and/or discount, and/or a portion thereof, to the insured for their review, approval, and/or modification.

In addition or alternatively to the foregoing, determining a risk aversion score and/or a driving risk score for the insured, at or via the remote server, from analysis of the telematics and/or other data collected may include analysis of driving speed (whether too fast, too slow, or proper for conditions or posted speed limit); hard braking events and/or verifying the accuracy of hard braking events indicated by some telematics data or determining or assigning fault for the hard braking events to the insured, drivers other than insured, pedestrians, traffic, congestion, weather, construction, or other factors or conditions; acceleration or acceleration events; sleeping events and/or verifying the accuracy of sleeping events indicated by some telematics data; time of day driving; closeness or proximity of the insured vehicle to other vehicles traveling on the road (e.g., analysis for potential tailgating or otherwise driving too closely to other vehicles); lane analysis (e.g., analysis of driving or staying within a correct lane); type of weather, traffic, construction, and/or roads in or on which the insured typically drives; and/or proper use of safety equipment, including headlights, turn signals, and wiper blades.

XVI. Exemplary Driver Risk Score for Other Insurance

In one aspect, a computer-implemented method of applying a driving risk score to insurance other than auto insurance may be provided. The method may include collecting driving behavior data associated with driving behavior of an insured, at or via a remote server associated with an insurance provider, the insured having an auto insurance policy with the insurance provider, and the driving behavior data including telematics related and/or other data, including the data discussed elsewhere herein. The method may include calculating a driving risk score for the insured, at or via the remote server, based upon the driving behavior data collected. The method may include determining a risk aversion score for the insured, at or via the remote server, based upon analysis of the driver behavior data collected. The analysis of the driver behavior data may include identifying, at or via the remote server, may include: (i) insured driving characteristics (e.g., speed, braking, acceleration, time of day, and/or other driving characteristics, including those discussed elsewhere herein); (ii) types of roads that the insured normally drives on (e.g., intersections, city streets, and/or highways); and/or (iii) a daily commute to and from work for the insured. The method may include estimating, at or via the remote server, an insurance premium, rate, and/or discount associated with a life, health, renters, and/or home owners insurance policy for the insured based upon the risk aversion score; and/or generating, adjusting, and/or updating the life, health, renters, and/or home owners insurance policy for the insured based upon the risk aversion score at or via the remote server. The method may include additional, fewer, or alternate actions, including those discussed elsewhere herein.

For instance, the method may also include estimating, at or via the remote server, an insurance premium, rate, and/or discount associated with an auto insurance policy for the insured based upon the risk aversion score; and/or generating, adjusting, and/or updating the auto insurance policy for the insured based upon the risk aversion score at or via the remote server. The method may also include transmitting an estimated insurance premium, rate, and/or discount based upon the risk aversion score from the remote server to a mobile device associated with the insured to facilitate a presentation of the estimated insurance premium, rate, and/or discount, and/or a portion thereof, to the insured for their review, approval, and/or modification.

The analysis of the driver behavior data may include identification of which family member is driving a vehicle, as well as when and where that family member is driving. The analysis of the driver behavior data may include using biometric data associated with the driver to determine the risk aversion score. The analysis of the driver behavior data may include identification of where an insured vehicle is typically parked, and/or a percentage of time that the insured vehicle is garaged (protecting the vehicle from the environment).

In addition or alternatively to the foregoing, determining a risk aversion score and/or a driving risk score for the insured, at or via the remote server, from analysis of the telematics and/or other data collected may include analysis of driving speed (whether too fast, too slow, or proper for conditions or posted speed limit); hard braking events and/or verifying the accuracy of hard braking events indicated by some telematics data, or determining or assigning fault for the hard braking events to (a) the insured, (b) drivers other than insured, (c) pedestrians, (d) traffic, (e) congestion, (f) weather, (g) construction, or other factors or conditions; acceleration or acceleration events; sleeping events and/or verifying the accuracy of sleeping events indicated by some telematics data (such as steering wheel sensors); time of day driving; closeness or proximity (or average closeness or proximity) of the insured vehicle to other vehicles traveling on the road (e.g., analysis for potential tailgating and/or otherwise traveling to close to other vehicles on the road— whether ahead, behind, or alongside the insured vehicle); lane analysis (e.g., analysis of driving or staying within a correct lane); type of weather, traffic, construction, and/or roads in or on which the insured typically drives; and/or proper use of safety equipment, including headlights, turn signals, and wiper blades. Additionally, or alternatively, calculating the driving risk score for the insured may include analysis of the same factors.

XVII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and systems disclosed herein without departing from the spirit and scope defined in the appended claims. Finally, the patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for updating, adjusting, or generating an insurance policy associated with one or more insured vehicles based upon vehicle usage, comprising:
   collecting, at one or more processors, telematics data from one or more sensors associated with the one or more insured vehicles during a plurality of vehicle trips;
   determining, by one or more processors, the identity of a driver from a plurality of drivers during each vehicle trip by analyzing the telematics data, wherein the identity of the driver is automatically determined by identifying a communication connection between a mobile device of such driver and an on-board computer of the vehicle;

determining, by one or more processors, a summary of vehicle usage for the one or more insured vehicles over the plurality of vehicle trips based upon the telematics data, the summary of vehicle usage including the following:
(1) an amount of time or distance that each of the plurality of drivers uses each of the one or more insured vehicles,
(2) driving behavior characteristics of each of the plurality of drivers with respect to each of the one or more insured vehicles,
(3) the vehicle environments in which each of the plurality of drivers operates the one or more insured vehicles, wherein each vehicle environment includes a location associated with a frequency index indicating an amount of time the insured driver spends driving in the location, and wherein the summary of vehicle usage is weighted for each of the one or more insured vehicles according to the frequency index, and
(4) one or more recommended changes to at least one of the plurality of drivers' operation of the one or more insured vehicles;

determining, by one or more processors, an adjustment to the insurance policy based upon the determined summary of vehicle usage; and causing, by one or more processors, the adjustment to the insurance policy to be implemented.

2. The computer-implemented method of claim 1, wherein the adjustment to the insurance policy includes one or more of the following: a premium, a rate, a discount, a reward, a deductible, or a limit.

3. The computer-implemented method of claim 1, wherein the telematics data includes sensor data regarding the identity of the driver and driving behavior during each vehicle trip.

4. The computer-implemented method of claim 1, wherein the vehicle environment of each vehicle trip includes the following: geographic location, time of day, type of road, weather conditions, traffic conditions, construction conditions, or route traveled.

5. The computer-implemented method of claim 1, further comprising:
transmitting, via a wireless communication network, information regarding the adjustment to the insurance policy to one or more insurance customers associated with the insurance policy for review; and
receiving, at the one or more processors, a confirmation of the adjustment to the insurance policy from at least one of the one or more insurance customers.

6. The computer-implemented method of claim 1, wherein the one or more sensors are disposed within or communicatively connected to a mobile device.

7. The computer-implemented method of claim 1, wherein the one or more sensors are disposed within or communicatively connected to a computer system of at least one of the one or more insured vehicles.

8. The computer-implemented method of claim 1, wherein the telematics data further includes data generated by one or more of the following: (i) a vehicle other than the one or more insured vehicles; (ii) the one or more insured vehicle, based upon vehicle-to-vehicle communication with one or more other vehicles; (iii) an infrastructure component; or (iv) road side equipment.

9. A computer system for updating, adjusting, or generating an insurance policy associated with one or more insured vehicles based upon vehicle usage, comprising:
one or more processors;
one or more communication modules adapted to communicate data; and
a program memory coupled to the one or more processors and storing executable instructions that when executed by the one or more processors cause the computer system to:
collect telematics data from one or more sensors associated with the one or more insured vehicles during a plurality of vehicle trips via the one or more communication modules;
determine the identity of a driver from a plurality of drivers during each vehicle trip by analyzing the telematics data, wherein the identity of the driver is automatically determined by identifying a communication connection between a mobile device of such driver and an on-board computer of the vehicle;
determine a summary of vehicle usage for the one or more insured vehicles over the plurality of vehicle trips based upon the telematics data, the summary of vehicle usage including the following:
(1) an amount of time or distance that each of the plurality of drivers uses each of the one or more insured vehicles,
(2) driving behavior characteristics of each of the plurality of drivers with respect to each of the one or more insured vehicles,
(3) the vehicle environments in which each of the plurality of drivers operates the one or more insured vehicles, wherein each vehicle environment includes a location associated with a frequency index indicating an amount of time the insured driver spends driving in the location, and wherein the summary of vehicle usage is weighted for each of the one or more insured vehicles according to the frequency index, and
(4) one or more recommended changes to at least one of the plurality of drivers' operation of the one or more insured vehicles;
determine an adjustment to the insurance policy based upon the determined summary of vehicle usage; and
cause the adjustment to the insurance policy to be implemented.

10. The computer system of claim 9, wherein the adjustment to the insurance policy includes one or more of the following: a premium, a rate, a discount, a reward, a deductible, or a limit.

11. The computer system of claim 9, wherein the vehicle environment of each vehicle trip includes the following: geographic location, time of day, type of road, weather conditions, traffic conditions, construction conditions, or route traveled.

12. The computer system of claim 9, wherein the executable instructions further cause the computer system to:
transmit, via the one or more communication modules, information regarding the adjustment to the insurance policy to one or more insurance customers associated with the insurance policy for review; and
receive, via the one or more communication modules, a confirmation of the adjustment to the insurance policy from at least one of the one or more insurance customers.

13. The computer system of claim 9, wherein the one or more sensors are disposed within or communicatively connected to one or more of the following: a mobile device or a computer system of at least one of the one or more insured vehicles.

14. The computer system of claim 9, wherein the telematics data further includes data generated by one or more of the following: (i) a vehicle other than the one or more insured vehicles; (ii) the one or more insured vehicle, based upon vehicle-to-vehicle communication with one or more other vehicles; (iii) an infrastructure component; or (iv) road side equipment.

15. A tangible, non-transitory computer-readable medium storing instructions for updating, adjusting, or generating an insurance policy associated with one or more insured vehicles based upon vehicle usage that, when executed by one or more processors of a computer system, cause the computer system to:

collect telematics data from one or more sensors associated with the one or more insured vehicles during a plurality of vehicle trips;

determine the identity of a driver from a plurality of drivers during each vehicle trip by analyzing the telematics data, wherein the identity of the driver is automatically determined by identifying a communication connection between a mobile device of such driver and an on-board computer of the vehicle;

determine a summary of vehicle usage for the one or more insured vehicles over the plurality of vehicle trips based upon the telematics data, the summary of vehicle usage including the following:

(1) an amount of time or distance that each of the plurality of drivers uses each of the one or more insured vehicles, (2) driving behavior characteristics of each of the plurality of drivers with respect to each of the one or more insured vehicles, (3) the vehicle environments in which each of the plurality of drivers operates the one or more insured vehicles, wherein each vehicle environment includes a location associated with a frequency index indicating an amount of time the insured driver spends driving in the location, and wherein the summary of vehicle usage is weighted for each of the one or more insured vehicles according to the frequency index, and (4) one or more recommended changes to at least one of the plurality of drivers' operation of the one or more insured vehicles;

determine an adjustment to the insurance policy based upon the determined summary of vehicle usage; and cause the adjustment to the insurance policy to be implemented.

16. The tangible, non-transitory computer-readable medium of claim 15, wherein the adjustment to the insurance policy includes one or more of the following: a premium, a rate, a discount, a reward, a deductible, or a limit.

17. The tangible, non-transitory computer-readable medium of claim 15, wherein the vehicle environment of each vehicle trip includes the following: geographic location, time of day, type of road, weather conditions, traffic conditions, construction conditions, or route traveled.

18. The tangible, non-transitory computer-readable medium of claim 15, further comprising executable instructions that cause the computer system to:

transmit information regarding the adjustment to the insurance policy to one or more insurance customers associated with the insurance policy for review; and receive a confirmation of the adjustment to the insurance policy from at least one of the one or more insurance customers.

19. The tangible, non-transitory computer-readable medium of claim 15, wherein the one or more sensors are disposed within or communicatively connected to one or more of the following: a mobile device or a computer system of at least one of the one or more insured vehicles.

20. The tangible, non-transitory computer-readable medium of claim 15, wherein the telematics data further includes data generated by one or more of the following: (i) a vehicle other than the one or more insured vehicles; (ii) the one or more insured vehicle, based upon vehicle-to-vehicle communication with one or more other vehicles; (iii) an infrastructure component; or (iv) road side equipment.

* * * * *